United States Patent
Frank

(10) Patent No.: US 12,516,973 B2
(45) Date of Patent: Jan. 6, 2026

(54) METER CALIBRATION

(71) Applicant: Precision Planting LLC, Tremont, IL (US)

(72) Inventor: William Frank, Manito, IL (US)

(73) Assignee: Precision Planting LLC, Tremont, IL (US)

( * ) Notice: Subject to any disclaimer, the term of this patent is extended or adjusted under 35 U.S.C. 154(b) by 143 days.

(21) Appl. No.: 18/248,590

(22) PCT Filed: Nov. 17, 2021

(86) PCT No.: PCT/IB2021/060638
§ 371 (c)(1),
(2) Date: Apr. 11, 2023

(87) PCT Pub. No.: WO2022/130061
PCT Pub. Date: Jun. 23, 2022

(65) Prior Publication Data
US 2023/0384143 A1    Nov. 30, 2023

Related U.S. Application Data

(60) Provisional application No. 63/190,278, filed on May 19, 2021, provisional application No. 63/127,229, (Continued)

(51) Int. Cl.
*G01F 25/00* (2022.01)
*A01C 7/08* (2006.01)
(Continued)

(52) U.S. Cl.
CPC .......... *G01F 25/0092* (2013.01); *A01C 7/081* (2013.01); *A01C 7/105* (2013.01); *A01C 7/107* (2013.01); *G01F 13/005* (2013.01)

(58) Field of Classification Search
CPC ... G01F 13/005; G01F 25/0092; A01C 7/105; A01C 7/107; A01C 7/081; A01C 7/082; A01C 7/084
See application file for complete search history.

(56) References Cited

U.S. PATENT DOCUMENTS

| | | | |
|---|---|---|---|
| 9,936,626 B2 * | 4/2018 | Chahley | A01C 7/107 |
| 10,609,858 B2 * | 4/2020 | Garner | A01C 7/105 |

(Continued)

FOREIGN PATENT DOCUMENTS

| | | |
|---|---|---|
| CA | 2311698 A1 | 12/2001 |
| CA | 3007174 A1 | 11/2019 |

(Continued)

OTHER PUBLICATIONS

European Patent Office, International Search Report related to International Patent Application No. PCT/IB2021/060638, mail date Feb. 14, 2022, 11 pages.

(Continued)

*Primary Examiner* — Justin N Olamit

(57) ABSTRACT

A method of calibrating a meter module wherein the meter module comprises: an opening; a bottom opening; a metering mechanism disposed in the meter module; a bottom plate to selectively open and close the bottom opening; and a load cell for measuring a mass of material in the meter module, the method comprising: starting the metering mechanism to flow material through the meter module; at any time before counting, closing the bottom opening with the bottom plate; during a counting time, counting a number of metering units of the metering mechanism and measuring an amount of material with the load cell; and calculating an amount of mass per metering unit.

5 Claims, 35 Drawing Sheets

Related U.S. Application Data filed on Dec. 18, 2020, provisional application No. 63/127,370, filed on Dec. 18, 2020, provisional application No. 63/127,456, filed on Dec. 18, 2020, provisional application No. 63/127,327, filed on Dec. 18, 2020, provisional application No. 63/127,482, filed on Dec. 18, 2020, provisional application No. 63/127,473, filed on Dec. 18, 2020, provisional application No. 63/127,277, filed on Dec. 18, 2020, provisional application No. 63/127,300, filed on Dec. 18, 2020, provisional application No. 63/127,437, filed on Dec. 18, 2020.

(51) Int. Cl.
    *A01C 7/10*     (2006.01)
    *G01F 13/00*     (2006.01)

(56) References Cited

U.S. PATENT DOCUMENTS

| | | | |
|---|---|---|---|
| 11,032,965 B2 * | 6/2021 | Klein | A01C 7/107 |
| 11,191,207 B2 * | 12/2021 | Harmon | A01C 7/105 |
| 2009/0271136 A1 | 10/2009 | Beaujot et al. | |
| 2010/0116974 A1 | 5/2010 | Liu et al. | |
| 2011/0179984 A1 | 7/2011 | Beaujot et al. | |
| 2012/0036914 A1 | 2/2012 | Landphair et al. | |
| 2012/0042815 A1 | 2/2012 | Wonderlich | |
| 2014/0076217 A1 | 3/2014 | Liu et al. | |
| 2014/0261116 A1 | 9/2014 | Redman et al. | |
| 2014/0261810 A1 | 9/2014 | Bent et al. | |
| 2016/0120107 A1 | 5/2016 | Chahley et al. | |
| 2016/0169724 A1 | 6/2016 | Hossain et al. | |
| 2016/0169725 A1 | 6/2016 | Hossain et al. | |
| 2016/0205867 A1 | 7/2016 | Montag et al. | |
| 2016/0207016 A1 | 7/2016 | Montag et al. | |
| 2016/0219781 A1 | 8/2016 | Henry et al. | |
| 2017/0118905 A1 | 5/2017 | Bent et al. | |
| 2019/0033895 A1 | 1/2019 | Thompson et al. | |
| 2019/0082583 A1 | 3/2019 | Garner et al. | |
| 2019/0082586 A1 | 3/2019 | Harmon et al. | |
| 2019/0200514 A1 | 7/2019 | Stark | |
| 2019/0230848 A1 | 8/2019 | Forrest et al. | |
| 2020/0037495 A1 | 2/2020 | Klein et al. | |

FOREIGN PATENT DOCUMENTS

| | | |
|---|---|---|
| DE | 10037713 A1 | 2/2002 |
| DE | 102019000047 A1 | 7/2020 |
| FR | 3050093 A1 | 10/2017 |

OTHER PUBLICATIONS

South Africa Intellectual Property Office, Pretoria, Search Report related to ZA Application No. 2023/03567, completion date Jul. 10, 2024, 2 pages.

* cited by examiner

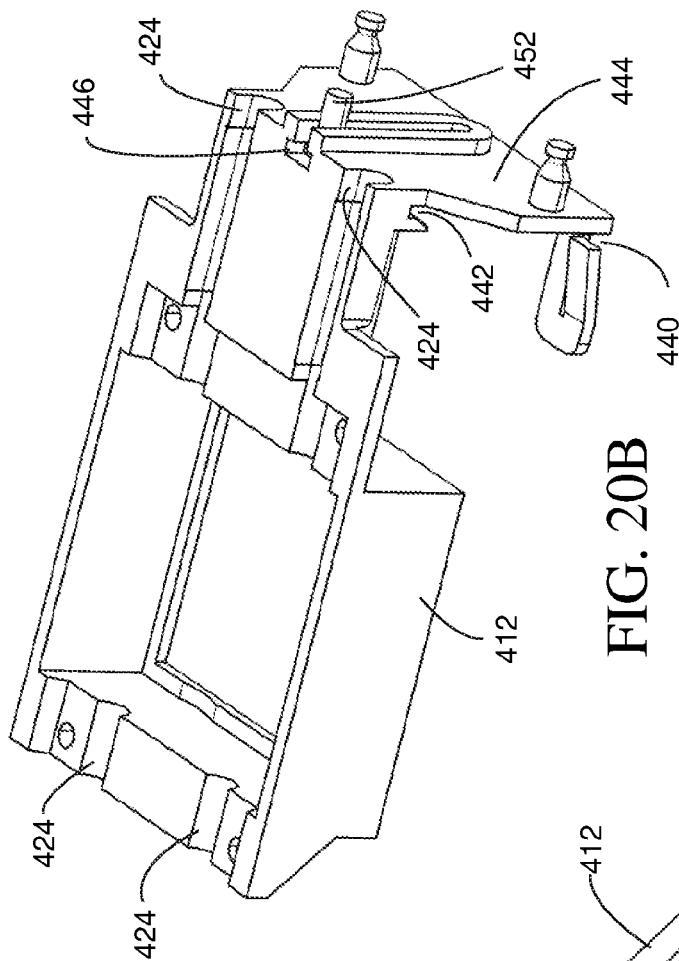
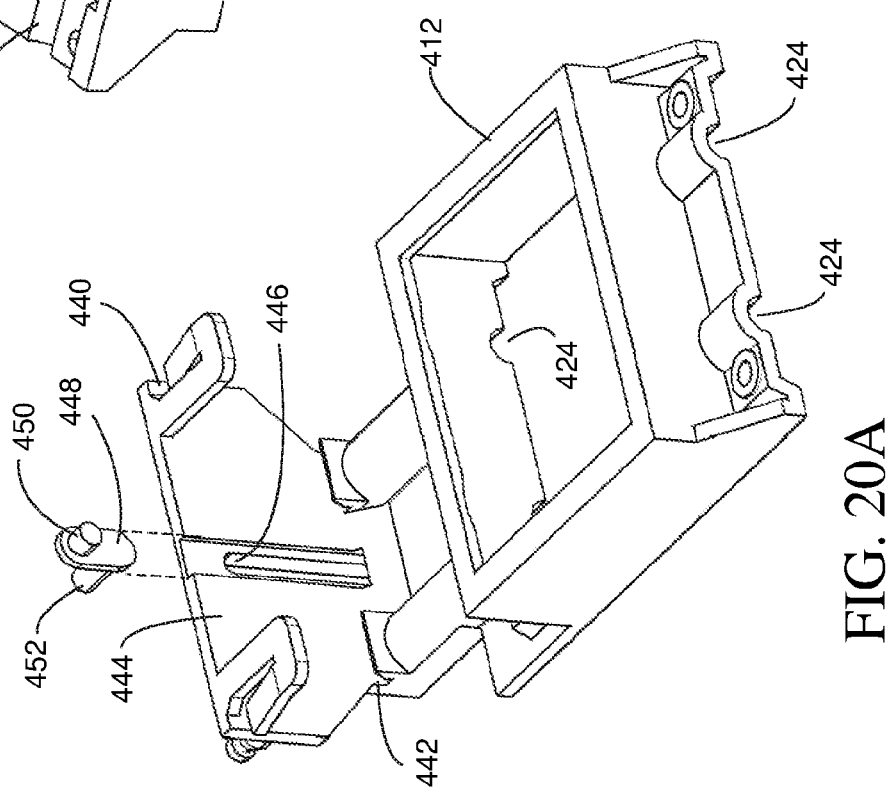
FIG. 20B
FIG. 20A

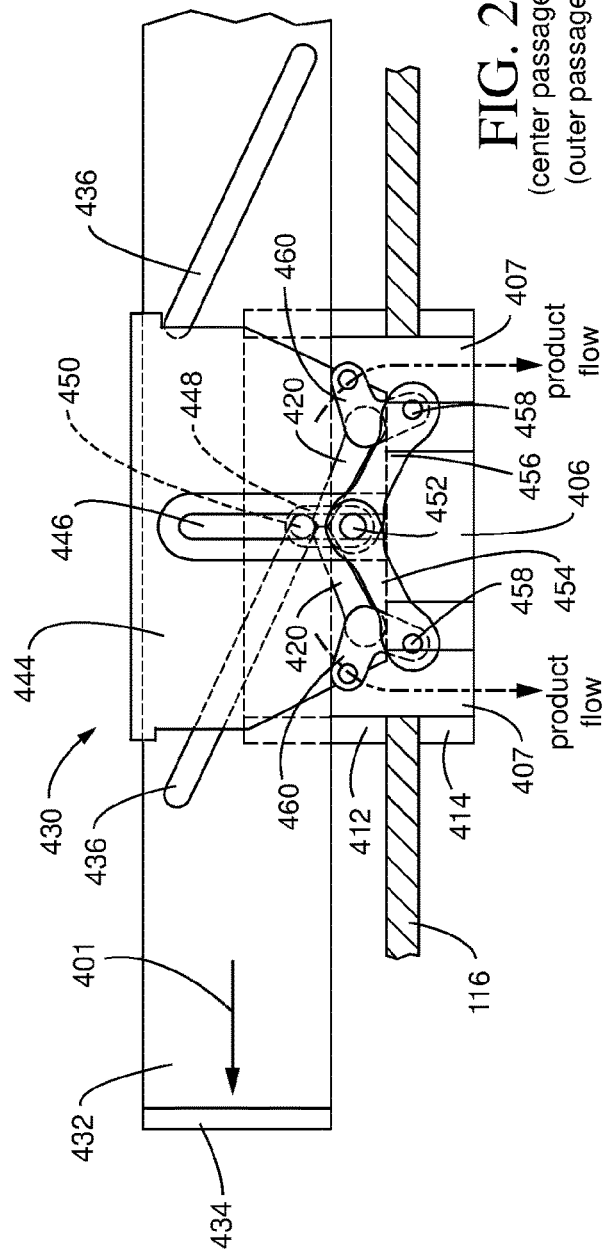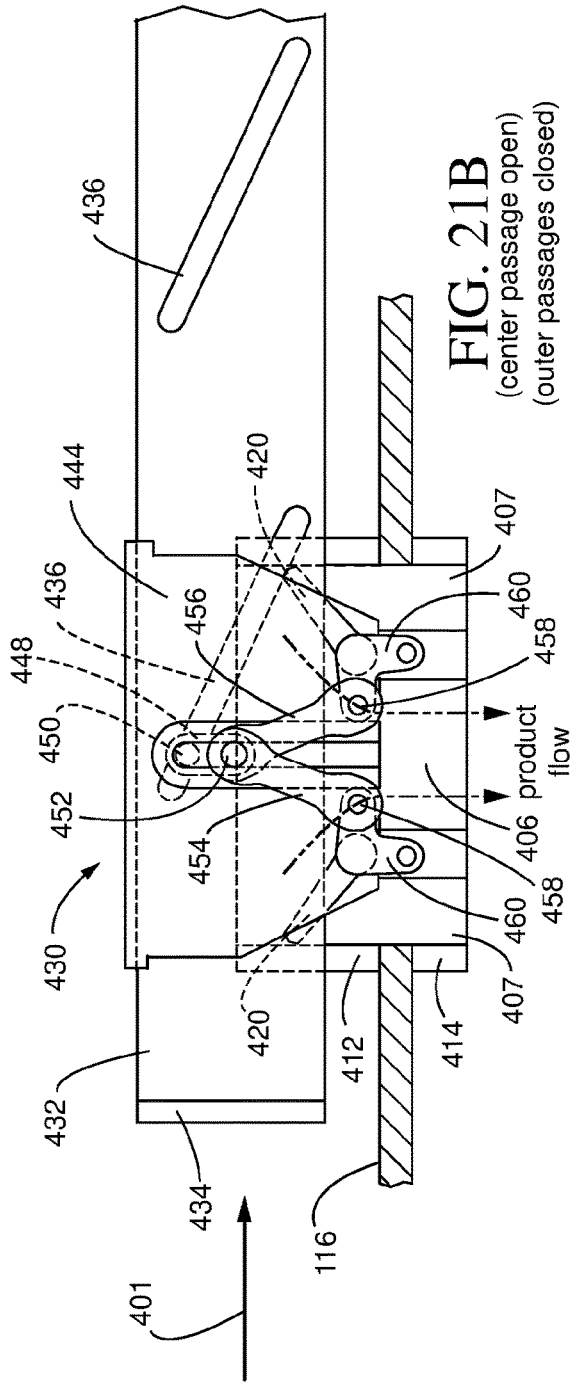

METER CALIBRATION

CROSS REFERENCE TO RELATED APPLICATIONS

This application is a national stage entry of PCT Application No. PCT/IB2021/060638, filed 17 Nov. 2021, which claims priority to U.S. Provisional Application No. 63/127,229, filed 18 Dec. 2020; 63/127,277, filed 18 Dec. 2020; 63/127,300, filed 18 Dec. 2020; 63/127,327, filed 18 Dec. 2020; 63/127,370, filed 18 Dec. 2020; 63/127,437, filed 18 Dec. 2020; 63/127,456, filed 18 Dec. 2020; 63/127,473, filed 18 Dec. 2020; 63/127,482, filed 18 Dec. 2020; and 63/190,278, filed 19 May 2021, the contents of each are incorporated herein by reference in their entireties.

BACKGROUND

Air commodity carts, also commonly referred to as air carts or simply carts, are used to supply seed and fertilizer to air seeders, planters, strip tillers and other applicator implements towed behind or forward of the air cart. Air carts have a wheeled frame which supports one or more large tanks or hoppers. Each tank typically holds one type of product (e.g., a seed type or seed variety, nitrogen, phosphorous, potash, etc.) which is metered by a metering system below the tanks into air tubes. A separate metering system is typically disposed below each tank on the air cart so that each metering system meters out one type of product from each tank. An air stream through the air tubes is produced by a blower or a fan typically supported on the air cart. The air stream carries the metered product through the air tubes and into distribution lines which deliver the product to the row units of the applicator implement.

The metering system for most air carts is constructed as one long assembly extending across the width of the air cart. The metering mechanism for most commercially available metering systems utilize long fluted metering rolls that extend through the meter assembly housing and rotate about an axis that is perpendicular to the forward direction of travel of the air cart. Different fluted metering rolls are typically needed for different types of seed and fertilizer depending on the seed size or granular size and the application rate at which the product is to be applied. It is not uncommon for air carts to require four or more different fluted metering rolls to accommodate all seed and granular sizes and application rates. These fluted metering rolls are expensive. Additionally, due to the corrosive nature of fertilizer, the life of most commercially available metering systems is typically around five years, and during that five year life, one or more of the components of the metering system will need repair or replacement.

Accordingly, it would be desirable to provide a metering system that is modular so that the entire metering system for each tank does not need to be replaced if one area of the metering system becomes corroded or fails. A modular metering system would allow the repair or replacement of the single module instead of the entire metering system for the associated tank. It would also be desirable to provide a metering system that requires only one or two metering mechanisms for metering all types of seeds and granular sizes rather than requiring four or more metering mechanisms. It would also be desirable to utilize a metering mechanism within the metering system that is less expensive to produce and is therefore less expensive to repair and replace.

There is also a need for a metering system that is easier and more efficient to calibrate. Most commercially available metering systems are slow and labor intensive to calibrate. For example a common method of calibrating commercially available metering systems on air carts involves the following steps: (1) manually opening the meter assembly to expose the meter rolls; (2) physically attaching collection bag below the open meter assembly; (3) manually rotating the meter rolls several turns (e.g., 10 to 15 turns) to discharge a large quantity of product (which may exceed 20 pounds of product) into the collection bags; (4) physically removing the filled collection bags from the meter assembly; (5) carrying the filled collection bags to a scale disposed on the air cart; (6) physically lifting and attaching the collection bags onto the scale; (7) manually reading the scale; (8) manually looking up on a printed chart the weight of the collected sample for the applicable product, and then cross-referencing the desired application rate and the desired ground speed to determine the proper meter speed setting to achieve the desired application rate; (9) climbing into the cab of the tractor to adjust the controller to the proper meter speed setting based on the chart; (10) climbing out of the tractor; (11) physically lifting and detaching the filled collection bags from the scale; (12) climbing up onto the air cart with the filled collection bags; (13) removing the tank lid; (14) lifting the filled bags and dumping the collected product sample back into the tank; (15) closing the tank lid; (16) climbing back down from the air cart with the empty collection bags; and (17) then finally climbing back into the tractor to begin field application operations with the proper calibration.

Accordingly, there is a need for a more efficient means of calibrating a metering system to achieve a desired application rate.

BRIEF DESCRIPTION OF THE DRAWINGS

FIGS. 20A and 20B are top and bottom perspective views, respectively, of the upper housing portion of a diverter gate module.

FIGS. 21A and 21B are rear elevation views of the diverter gate module in partial cross section showing operation of the diverter gate actuator and associated movement of the diverter gates between the closed position and open position, respectively.

DESCRIPTION

All references cited herein are incorporated herein in their entireties. If there is a conflict between a definition herein and in an incorporated reference, the definition herein shall control.

Figure 1:
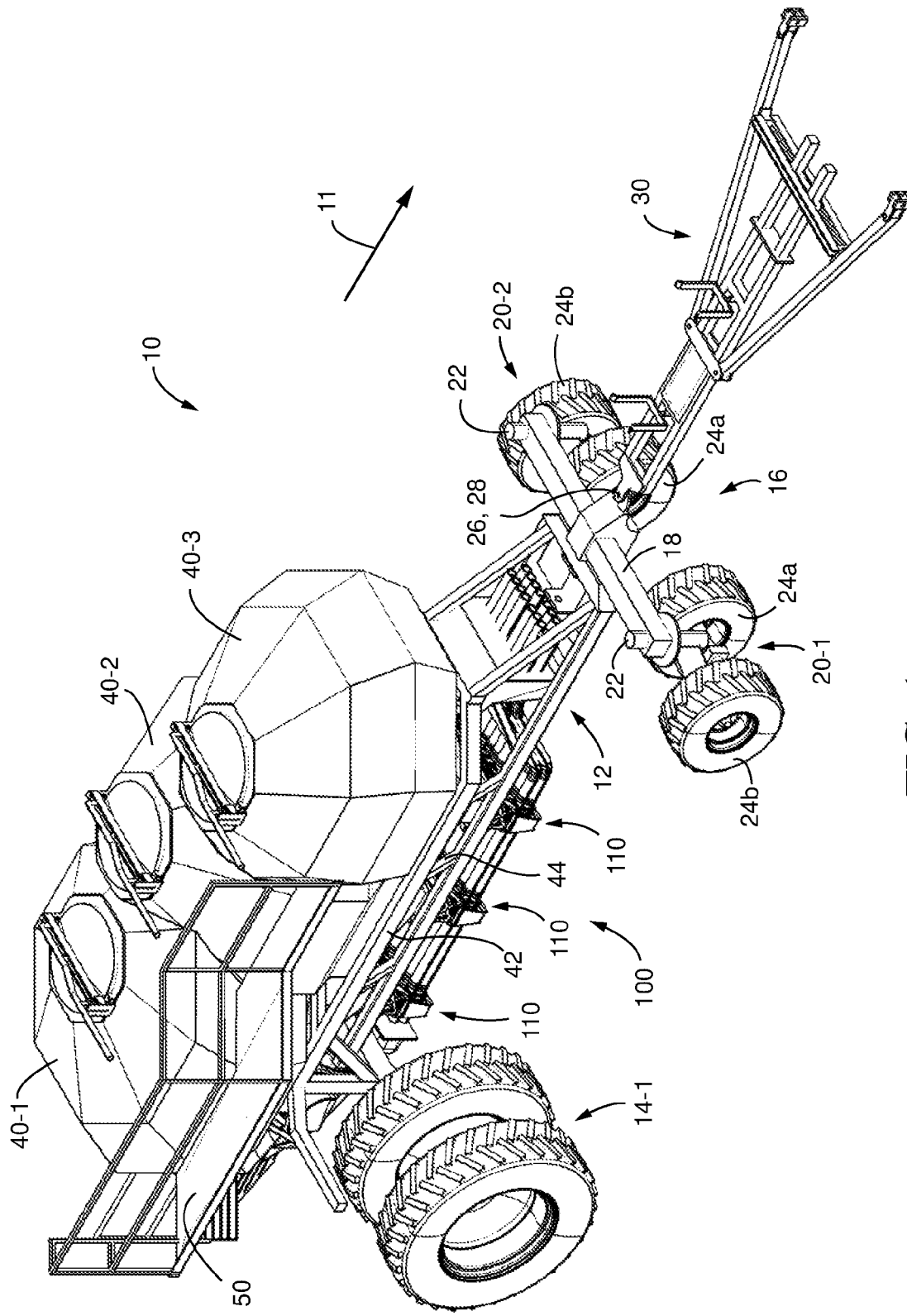
FIG. 1 is a front perspective view of an embodiment of an cart incorporating an embodiment of a modular metering system.
Figure 2:
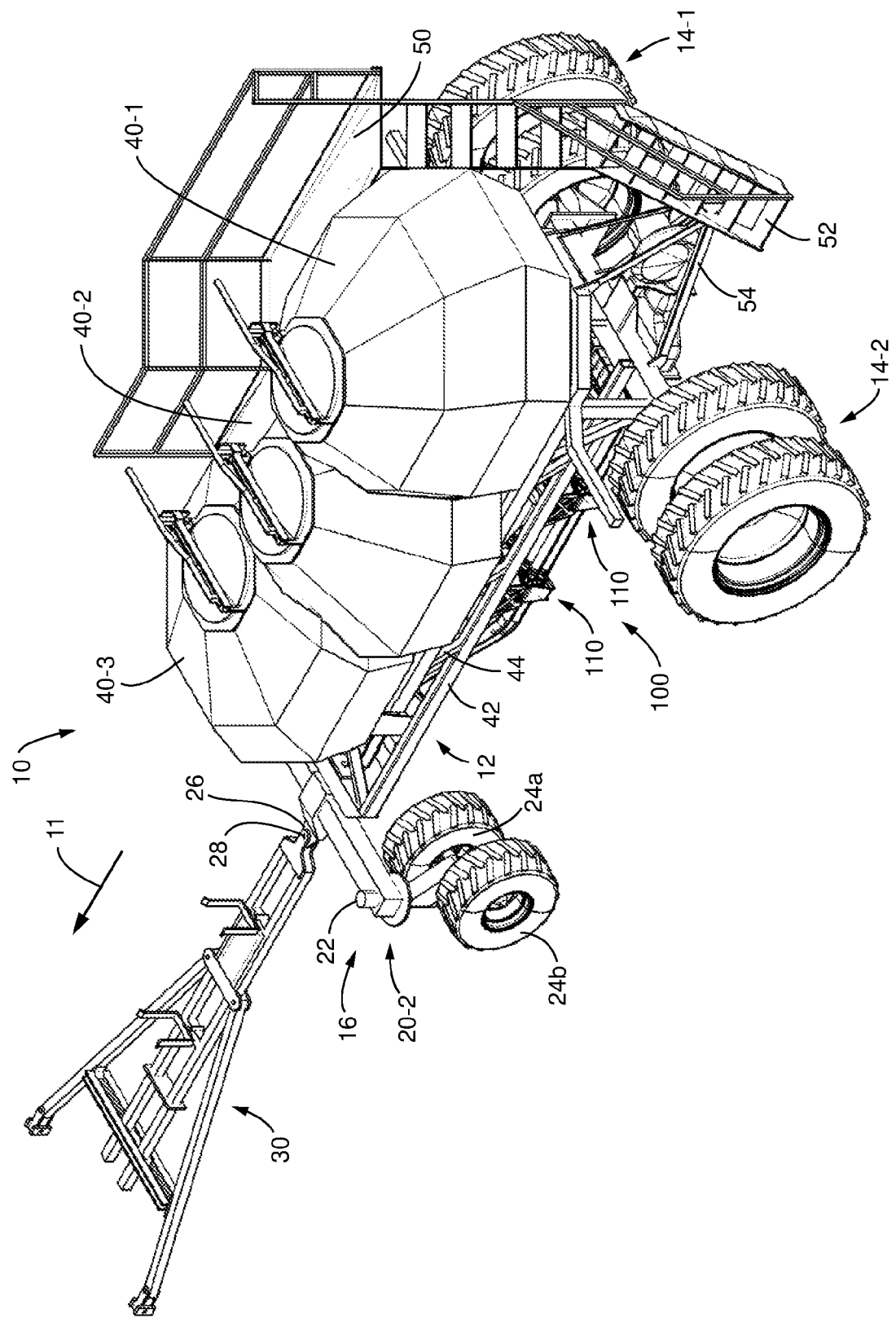
FIG. 2 is a rear perspective view of the air cart of FIG. 1.

Referring to the drawings wherein like reference numerals designate the same or corresponding parts throughout the several drawing views, FIGS. 1 and 2 are front and rear perspective views, respectively, of an embodiment of an air commodity cart 10. The cart 10 is configured to deliver seed, fertilizer or other field or crop inputs to an air seeder, planter, strip tiller or any other field working implement, hereinafter referred to individually and collectively as an "applicator implement" designated generally by reference number 1 in FIG. 3. The embodiment of the air cart 10 is configured to be towed behind the applicator implement 1, which is towed by tractor 2 in a forward direction of travel indicated by arrow 11. Alternatively, the air cart 10 may be towed directly behind the tractor 2 with the applicator implement 1 trailing the air cart 10.

In reference to FIGS. 3, 32 and 33 and as more fully described later, a control system 500 provides operational control and monitoring of the various components of the air cart 10 and the applicator implement 1 so as to control the type and location of the product dispensed and product application rates based on field prescription maps and operator inputs. The control system 500 includes a controller 510 which may be in signal communication with the various operational and monitoring components of the air cart 10 and the applicator implement 1 as described later. The controller 510 may also be in signal communication with a display device 530, a global position system (GPS) 566, a speed sensor 568, and a communication module 520, all discussed later.

Air Cart and Modular Metering System

The air cart 10 includes a modular metering system 100 which is the primary focus of this disclosure. The modular metering system 100 may be adapted for use as a retrofit of virtually any existing or commercially available air cart or the modular metering system 100 may be incorporated as part of an original equipment air cart. Thus, while an exemplary embodiment of an cart 10 is shown in the drawing figures and described below, it should be understood that the modular metering system 100 is not limited to any particular air cart configuration.

The cart 10 includes a main frame 12 supported at a rearward end by left and right rear wheel assemblies 14-1, 14-2 rigidly attached to the main frame 12. A front wheel assembly 16 is rigidly attached to a forward end of the main frame 12. The front wheel assembly 16 includes a horizontal front beam 18 extending transverse to the forward direction of travel 11. Outward lateral ends of the horizontal front beam 18 support left and right front castor wheel assemblies 20-1, 20-2. Each front castor wheel assembly 20-1, 20-2 includes a vertical post 22 pivotally attached at its upper end to the horizontal front beam 18. A lower end of the vertical post 22 supports a pair of longitudinally offset wheels 24a, 24b. A hitch 26 is disposed in the middle of the horizontal front beam 18 along the longitudinal axis of the main frame 12. The hitch 26 is configured to pivotally attached via a pin 28 to a tow frame 30 that mounts to the rear of the applicator implement 1. It should be appreciated that during operation, as the tractor and applicator implement 1 turns, the tow frame 30 attached to the rear of the applicator implement 1 will pull the cart 10 in the direction of the turn, causing the castor wheel assemblies 22-1, 22-2 to pivot about their respective vertical posts 24 in the direction of the turn such that the air cart 10 will turn and trail behind the applicator implement 1.

The main frame 12 supports one or more tanks or hoppers 40. In this embodiment, three tanks (40-1, 40-2, 40-3) are shown. The tanks 40 may hold one or more seed types or seed varieties, fertilizer or other crop or field inputs for distribution via an air stream to the row units of the applicator implement as described later. The tanks 40 are supported by intermediate tank frame members 42 connected by a plurality of struts 44 to the main frame 12. A platform 50 with a rear access ladder 52 (FIG. 2) may be provided for ease of access to the tank lids or hatches for filling and inspecting the tanks 40. The platform 50 and ladder 52 is supported from the main frame 12 or tank frame 42 by intermediate structural support members 54.

It should be appreciated that the above described air cart 10 is but one exemplary embodiment. In alternative embodiments, the air cart 10 may have only one axle and may be directly connected to the applicator implement without the use of an intermediate tow frame 30. Alternatively, the air cart 10 may have a rear axle as shown, but instead of front wheel assembly with castor wheels as shown, the front wheel assembly may have a front pivoting axle connecting directly to the applicator implement by a draw bar. Additionally, the air cart 10 may have one tank, two tanks, three tanks or four or more tanks depending on the crop or field inputs being applied and the tank capacities desired.

Figure 4:
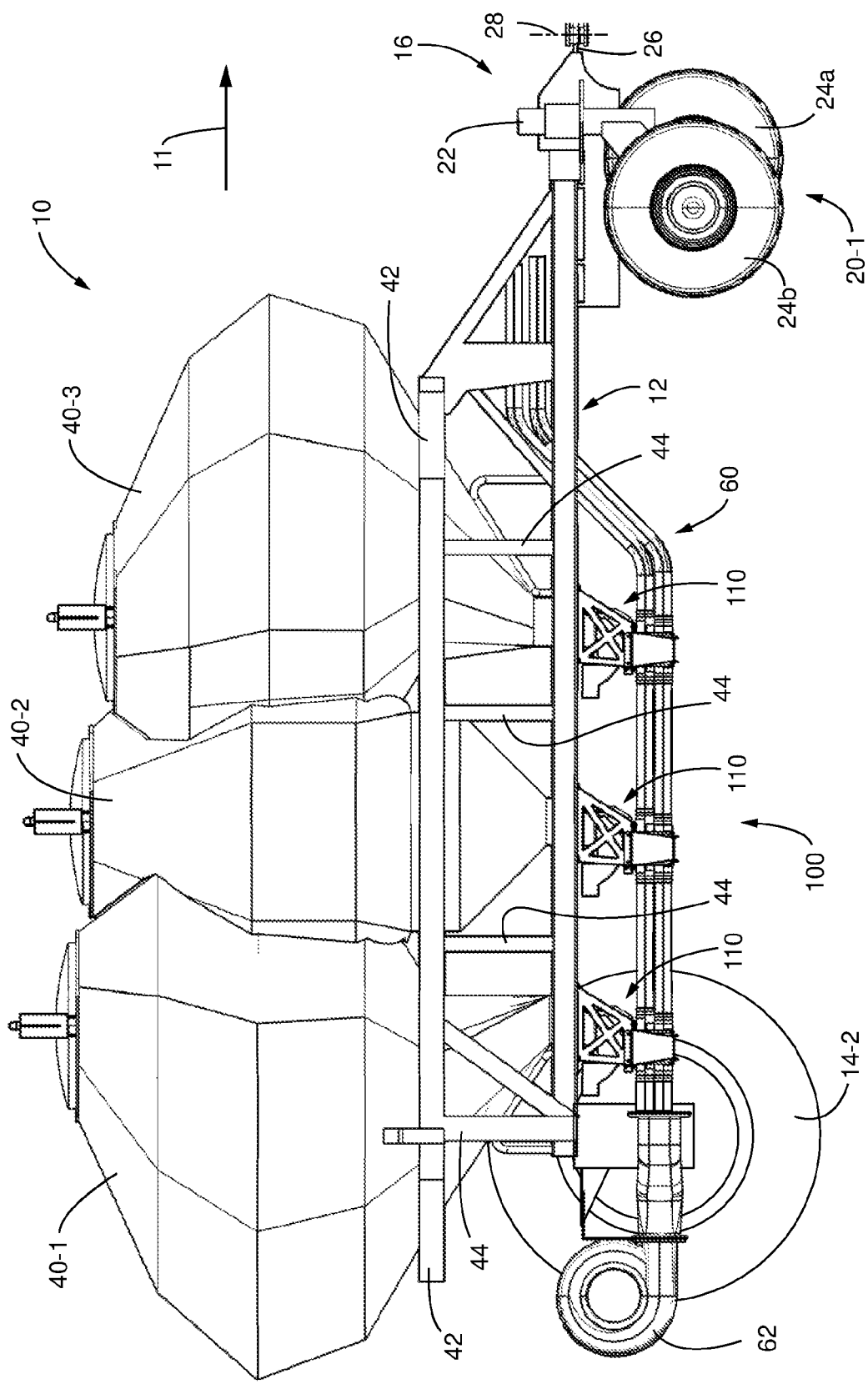
FIG. 4 is an enlarged side elevation view of the cart of FIG. 1 with one of the rear wheel assemblies removed and the platform an intermediate platform support structure removed to better show an embodiment of the air system and modular metering system.

FIG. 4 is an enlarged side elevation view of the air cart 10 with the left rear wheel assembly 14-1 removed, along with the platform, ladder and intermediate structural support members, to better show an embodiment of the air system 60 and the modular metering system 100. In the embodiment illustrated, the modular metering system 100 includes one or more metering banks 110-1, 110-2, 110-3 each disposed below a respective one of the tanks 40-1, 40-2, 40-3.

Figure 5:
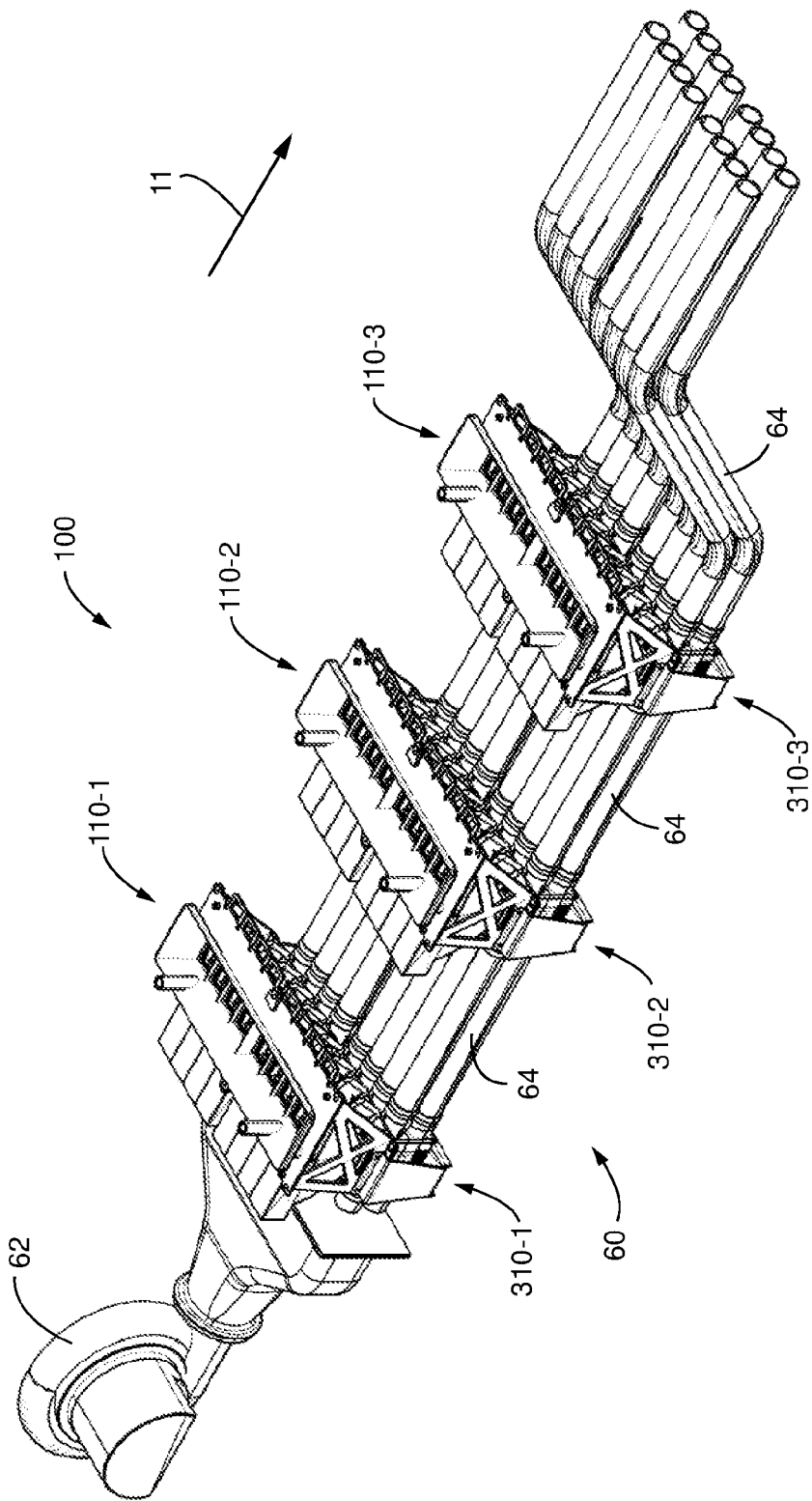
FIG. 5 is a front perspective view of the air system and modular metering system of the cart of FIG. 1 with all of the structural elements of the air cart removed.

FIG. 5 is a perspective view of the air system 60 and modular metering system 100 shown in FIG. 4 with all of the structural elements of the air cart 10 removed. Each metering bank 110-1, 110-2, 110-3 is coupled to a respective air tube bank 310-1, 310-2, 310-3 disposed therebelow. As shown, the air system 60 includes a single centrifugal fan or blower 62, but the air system 60 may include multiple fans or blowers depending on air volume requirements. The fan or fans 62 may be supported by the main frame 12 of the air cart 10 as shown. Alternatively, although not shown, the fan or fans 62 may be disposed on the tractor 2 or on the applicator implement 1. Air tubes 64 extend between the fan 62 and the air tube banks 310. As described later, the air tube banks 310 are in communication with each of three metering banks 110-1, 110-2, 110-3. The metering banks 110-1, 110-2, 110-3 meter the product from the respective tanks 40-1, 40-2, 40-3 into the respective air tube banks 310-1, 310-2, 310-3 and from there into the air tubes 64 which connect to distribution tubes (not shown) at the forward end of the air cart 10 (or if the applicator implement is towed behind the air cart 10, then to the rear of the air cart 10). The distribution tubes distribute the product via the air stream to the row units of the applicator implement. It should be appreciated that the number of metering banks 110 and air tube banks 310 may include fewer than three or more than three depending on the number of tanks 40 on the cart 10.

Figure 6:
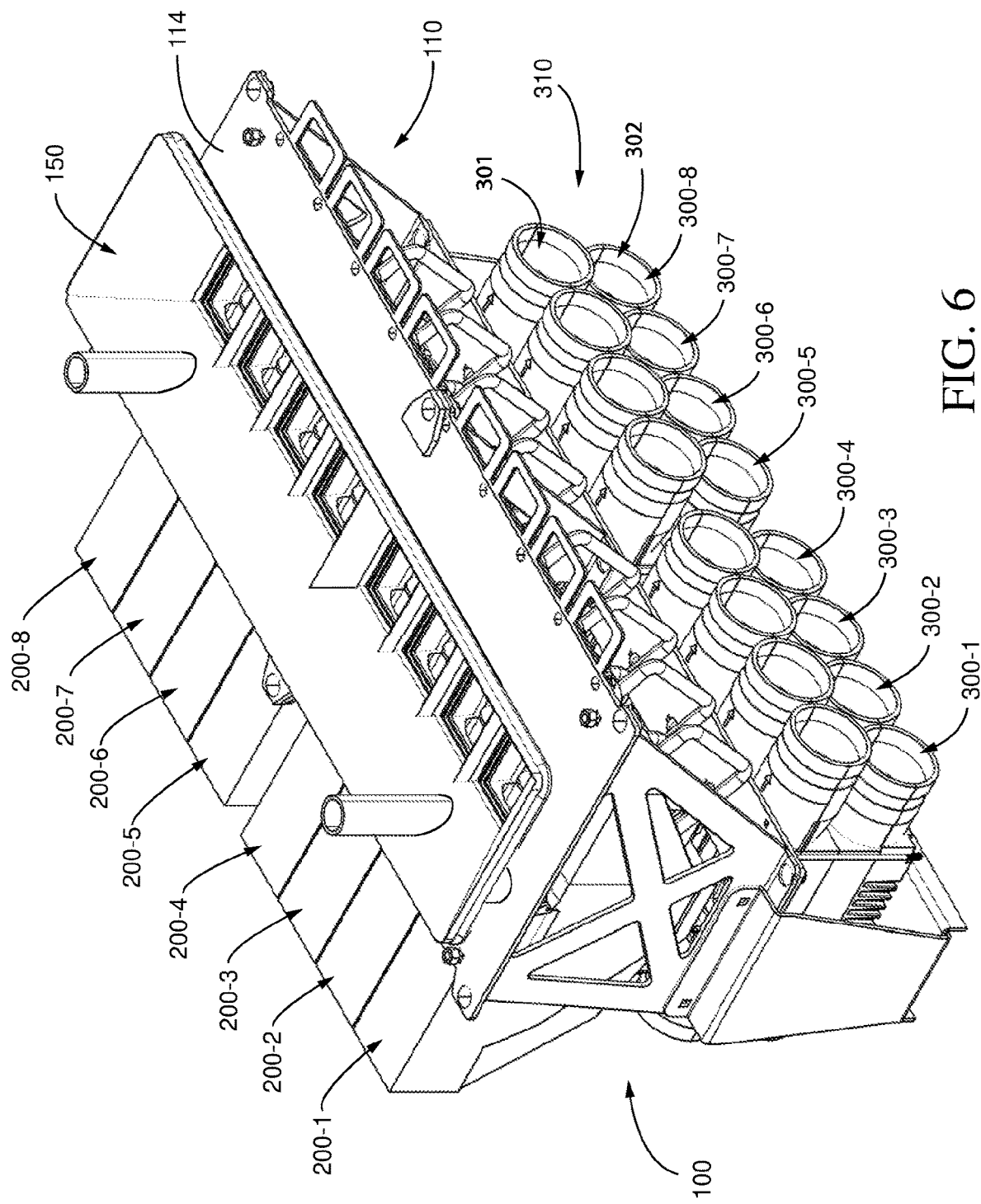
FIG. 6 is an enlarged front perspective view of one of the metering banks and air tube banks of the modular metering system of FIG. 5.
Figure 7:
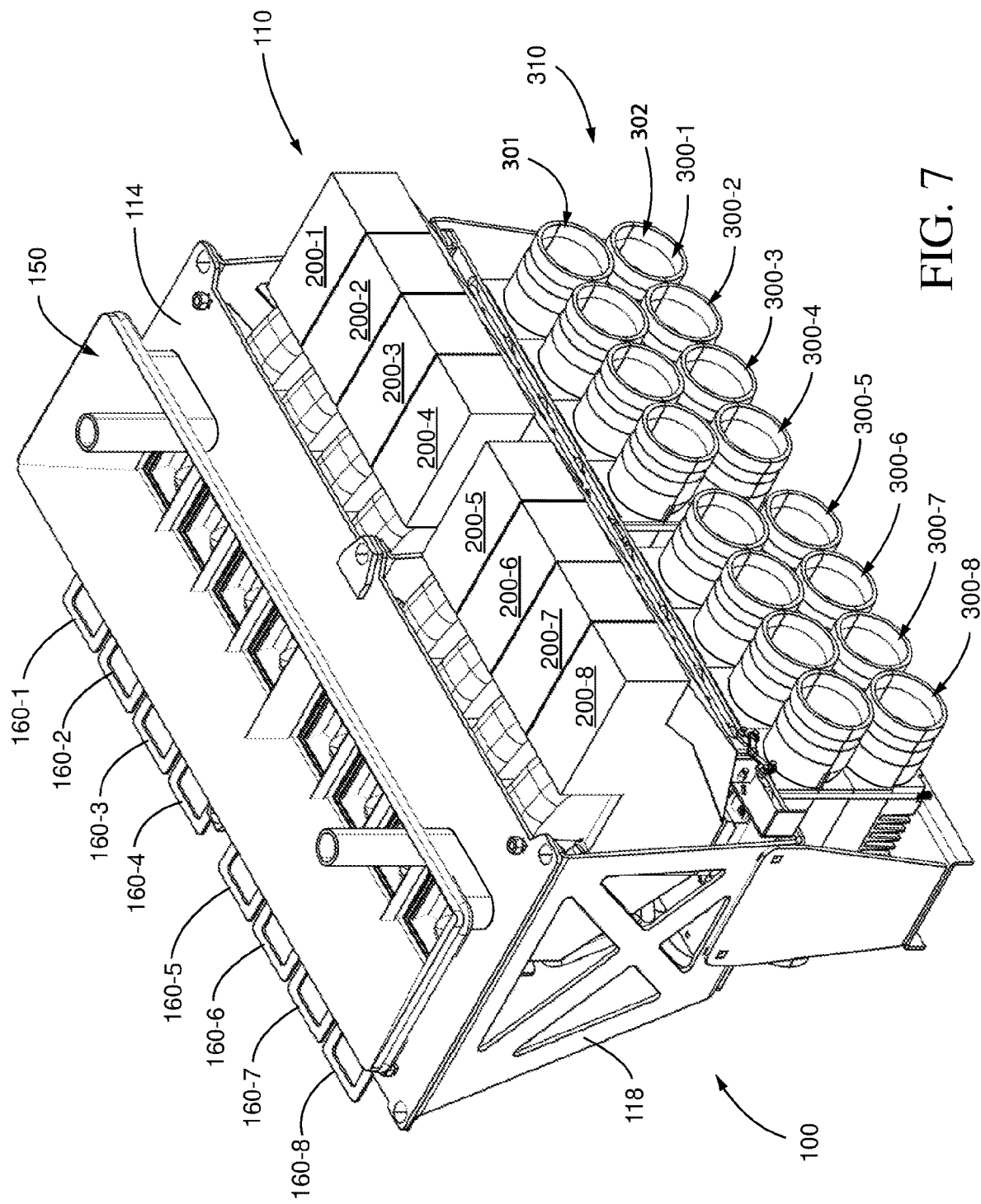
FIG. 7 is a rear perspective view of the metering bank and air tube bank of FIG. 6.
Figure 8:
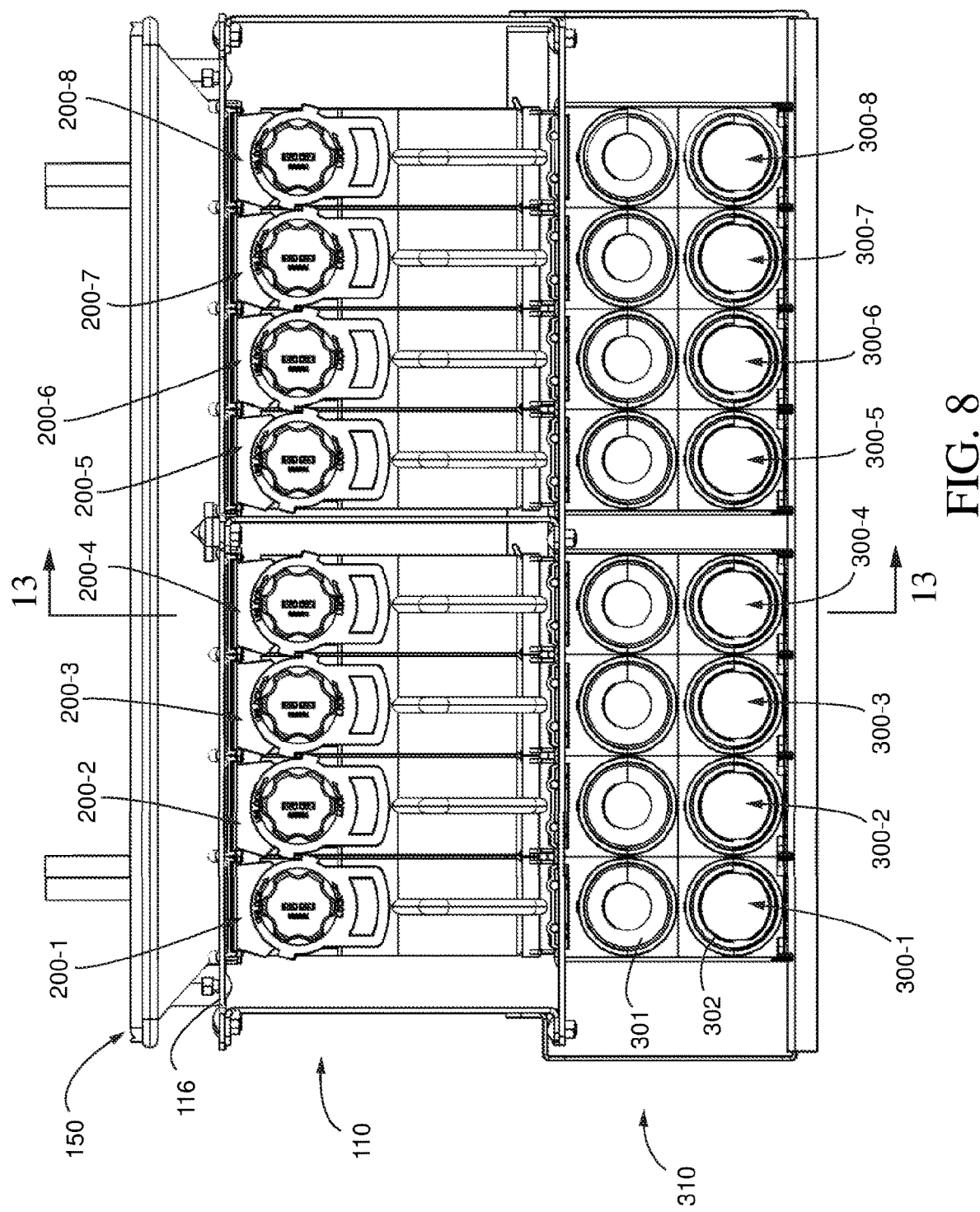
FIG. 8 is a front elevation view of the metering bank and air tube bank of FIG. 6.
Figure 9:
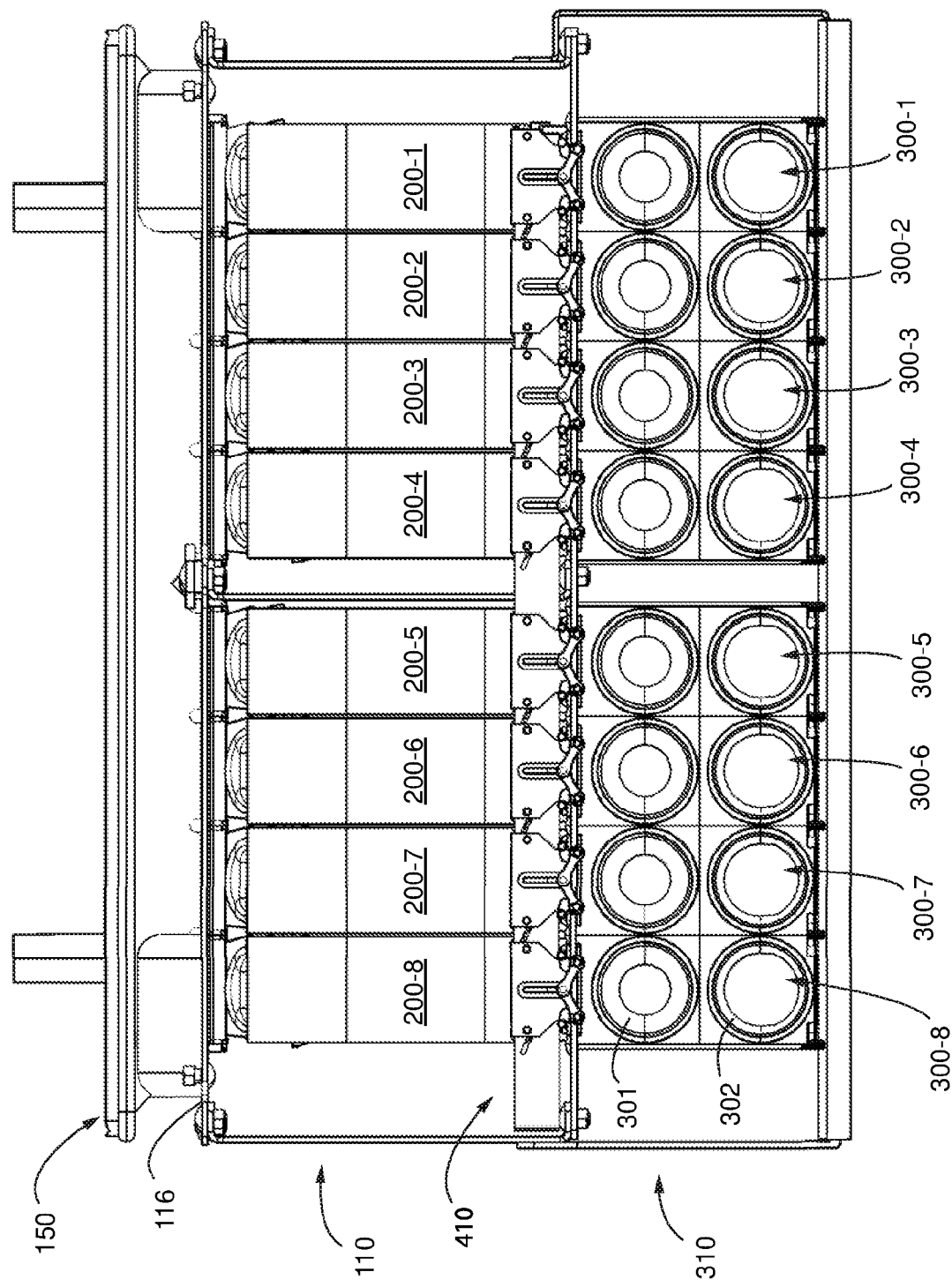
FIG. 9 is a rear elevation view of the metering bank and air tube bank of FIG. 6.

FIGS. 6 and 7 are enlarged front and rear perspective views, respectively, of an embodiment of one of the metering banks 110 and its associated air tube bank 310. FIGS. 8 and 9 are enlarged front and rear elevations views, respectively, of the metering bank 110 and the air tube bank 310. Each metering bank 110 includes a plurality of meter modules 200 and each air tube bank 310 includes a plurality of air tube modules 300. Each air tube module includes an upper air tube coupler 301 and a lower air tube coupler 302 in a double shoot configuration. In a single shoot embodiment, lower air tube coupler 302 is not present. In the embodiment illustrated, the metering bank 110 includes eight individual meter modules 200, designated by reference numbers 200-1 to 200-8 and eight air tube modules 300, designated by reference numbers 300-1 to 300-8. It should be appreciated that each meter module 200 is coupled to a corresponding air tube module 300. It should also be appreciated that the number of meter modules 200 in the metering bank 110 and the number of air tube modules 300 in the air tube bank 310 may include more or fewer than eight.

Figure 10:
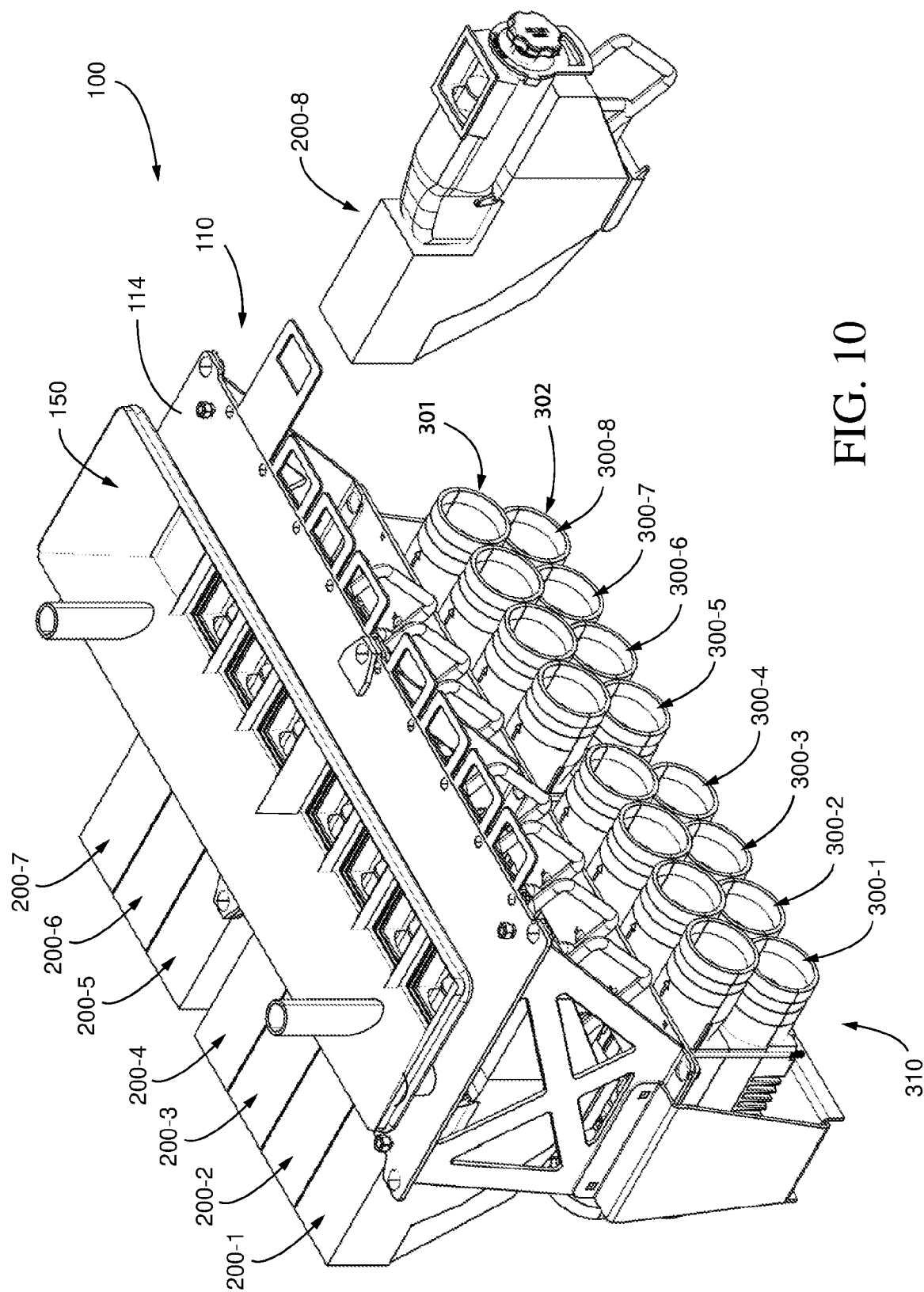
FIG. 10 is the same front perspective view of the metering bank and air tube bank of FIG. 6, but showing one of the meter modules removed from the metering bank.
Figure 11:
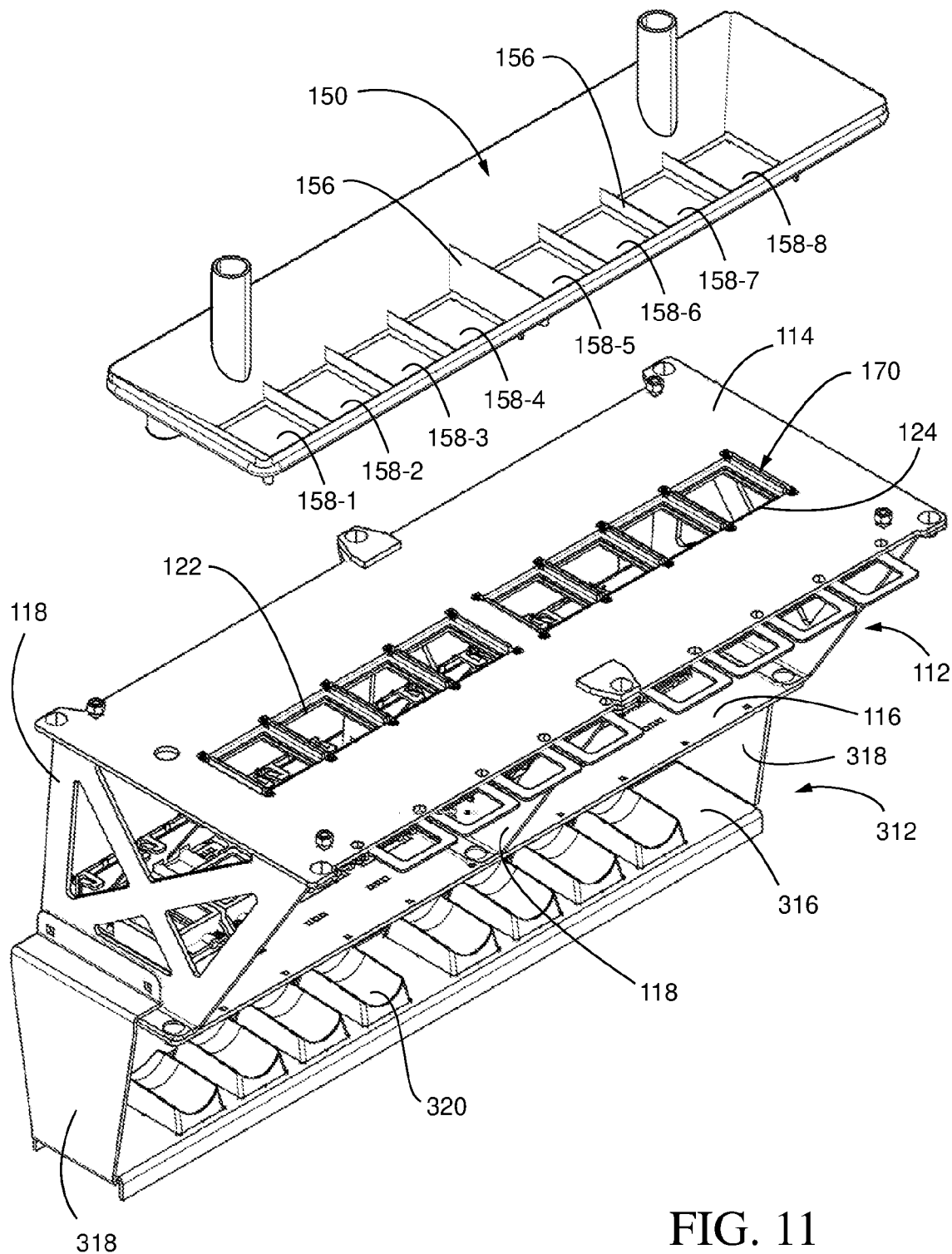
FIG. 11 is a partially exploded front perspective view of the metering bank and air tube bank of FIG. 6 with all of the meter modules and air tube modules removed to show the metering bank frame and air tube bank frame.
Figure 12:
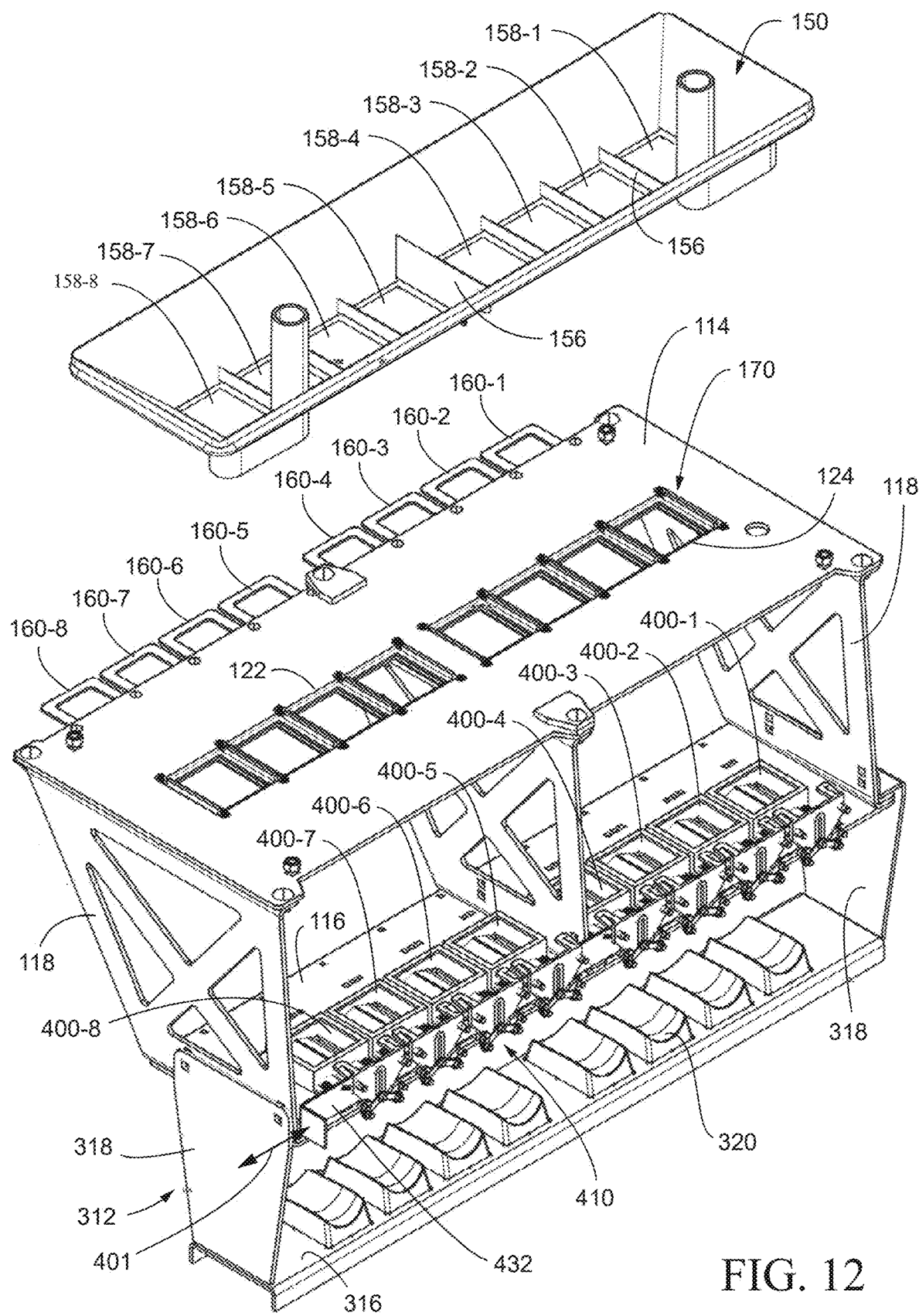
FIG. 12 is a partially exploded rear perspective view of the metering bank frame and air tube bank frame of FIG. 11.

As shown in FIG. 10 and described in detail later, each individual meter module 200 is slidably removable from the metering bank 110. FIGS. 11 and 12 are front and rear perspective views corresponding to FIGS. 6 and 7, respectively, but with all of the meter modules 200-1 to 200-8 removed from the metering bank 110 and with all of the air tube modules 300 removed from the air tube bank 310 to better illustrate the metering bank frame 112 and the air tube bank frame 312.

The metering bank frame 112 includes a top plate 114 and a bottom plate 116. The top plate 114 and bottom plate 116 are spaced apart and secured together by gussets 118. The air tube bank frame 312 includes a bottom member 316, which may be in the form of a channel for rigidity. The bottom member 316 is secured to the bottom plate 116 of the metering bank fame 112 in spaced relation by gussets 318. A plurality of tube saddles 320 are secured to the bottom member 316 for supporting and aligning the air tube modules 300 within the air tube bank 310.

Figure 13:
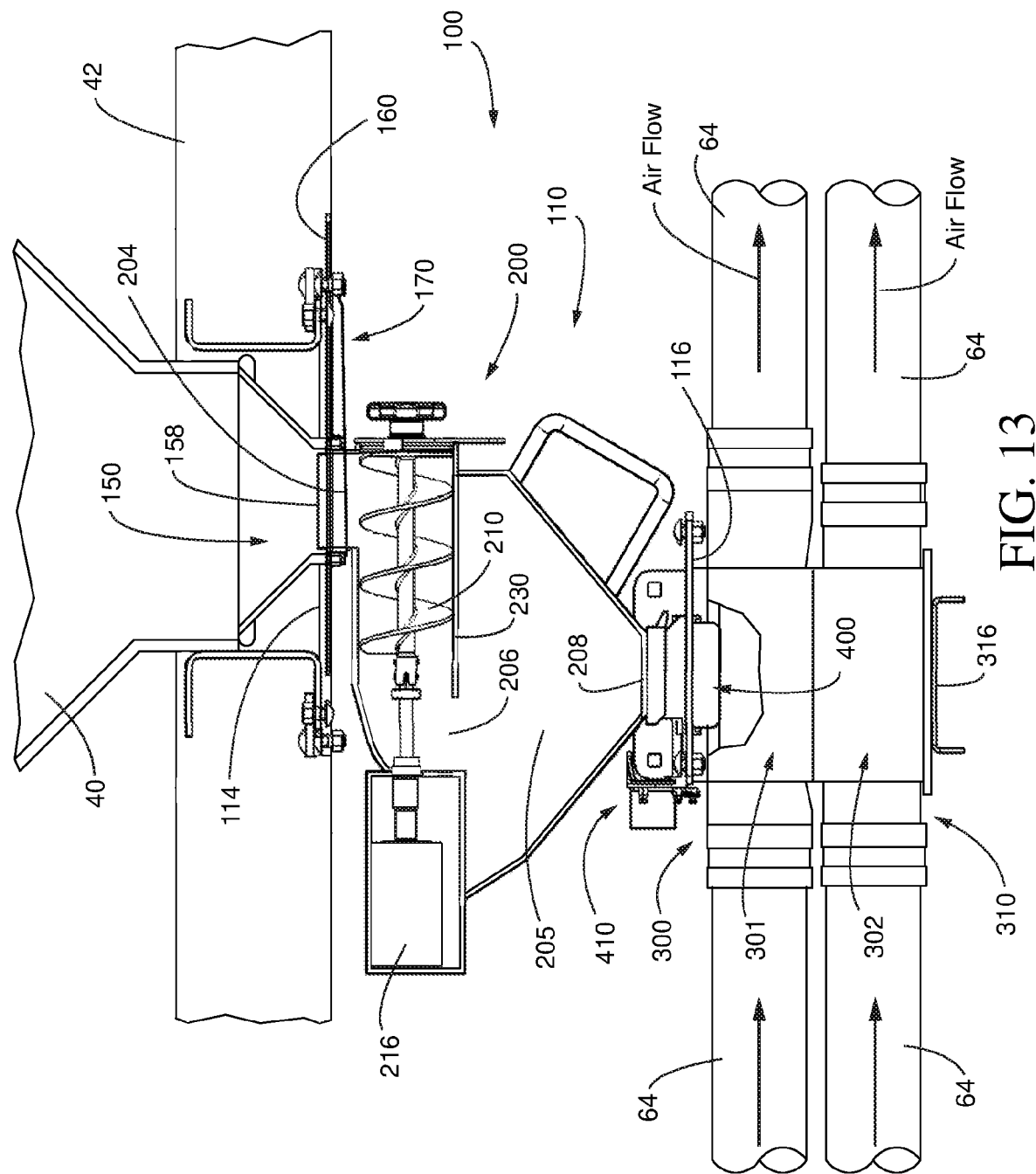
FIG. 13 is a side elevation view of the metering bank as viewed along lines 13-13 of FIG. 8 and showing the interface and of the tank, tank funnel, meter module and air coupling module.

FIG. 13 is a section view along lines 13-13 of FIG. 8 showing an individual meter module 200 seated within the metering bank 110 and showing the interface of the tank 40 with the tank funnel 150 (discussed below) and its relationship with the associated slide gate 160 (discussed below), its associated diverter gate module 400 (discussed below) and its associated air tube module 300. As will be described in more detail later, during operation, the product within the tank 40 flows via gravity out the bottom end of the tank 40 into the open upper flared end 152 of the tank funnel 150. The product passes downwardly through the associated bottom opening 158 of the tank funnel 150 into a top opening 204 of the meter module 200, assuming the associated slide gate 160 is in the open position. The meter module 200 meters the product (discussed below) into the respective air tube modules 300 after passing through the diverter gate module 400. The product is then carried by the air stream through the air tubes 64 for distribution to the row units of the applicator implement 1 by the distribution lines (not sown) coupled to the air tubes 64.

Figure 14:
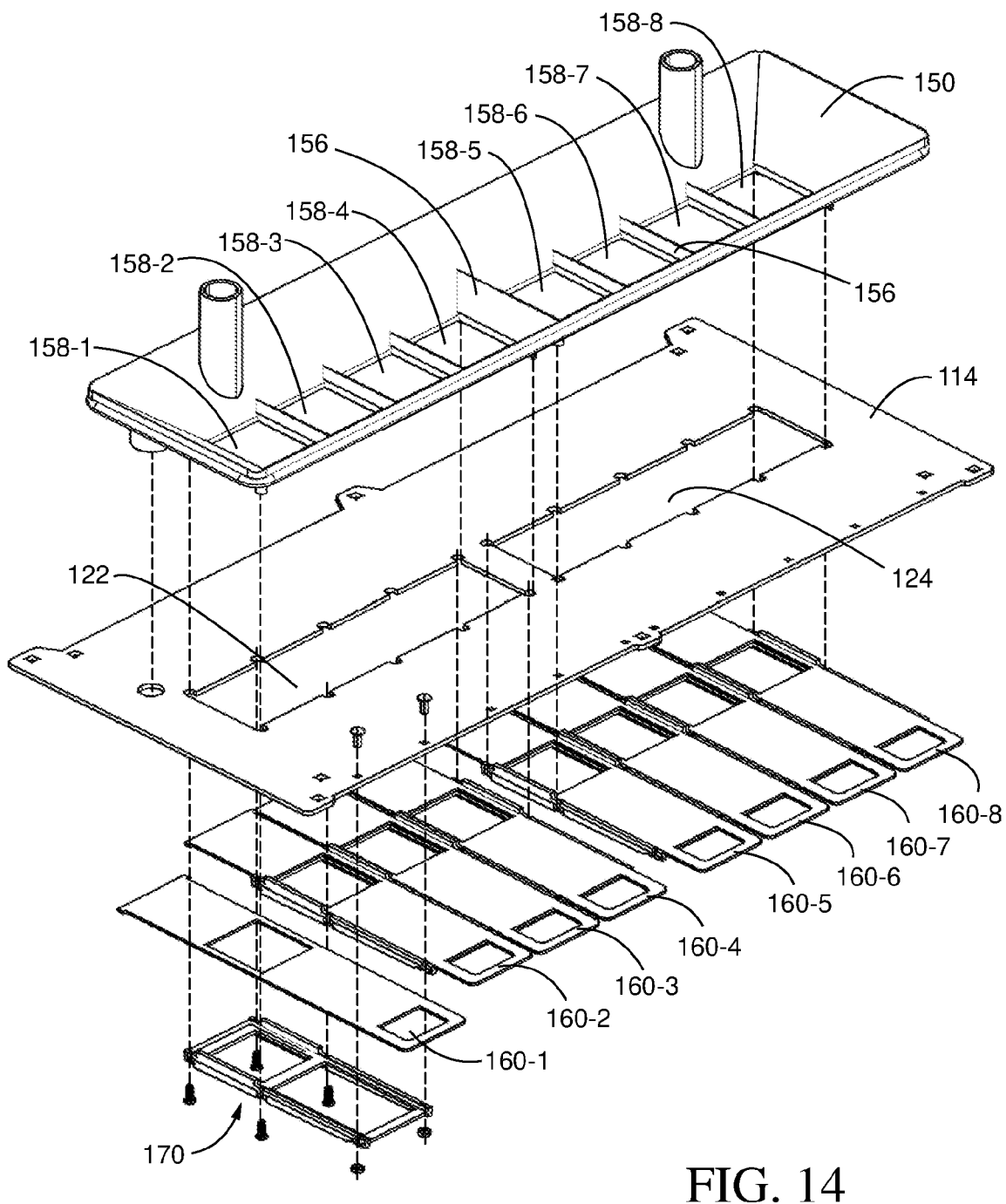
FIG. 14 is an exploded front perspective view showing the tank funnel, the top plate of the metering bank frame and the slide gates and the slide gate frames viewed from a top side of the top plate.

Continuing to refer to FIGS. 6-13, the tank funnel 150 is mounted to the top plate 114 of the metering bank 110. The top plate 114 has two elongated openings 122, 124 (FIG. 14). The tank funnel 150 has an open, flared upper end 152 and an open bottom end 154 separated into a series of bottom openings 158 by laterally spaced divider walls 156. The series of bottom openings 158, are designated by reference numbers 158-1 to 158-8. The middle divider wall 156 is larger than the other divider wall to span the area between the elongated openings 122, 124, thereby separating the bottom openings 158 into two groups of four openings, with the first group comprising openings 158-1 through 158-4 and the second group comprising openings 158-5 through 158-8. The first group of bottom openings 158-1 through 158-4 align with the first opening 122 in the top plate 114. The second group of bottom openings 158-5 through 158-8 align with the second opening 124 in the top plate 114.

Figure 15:
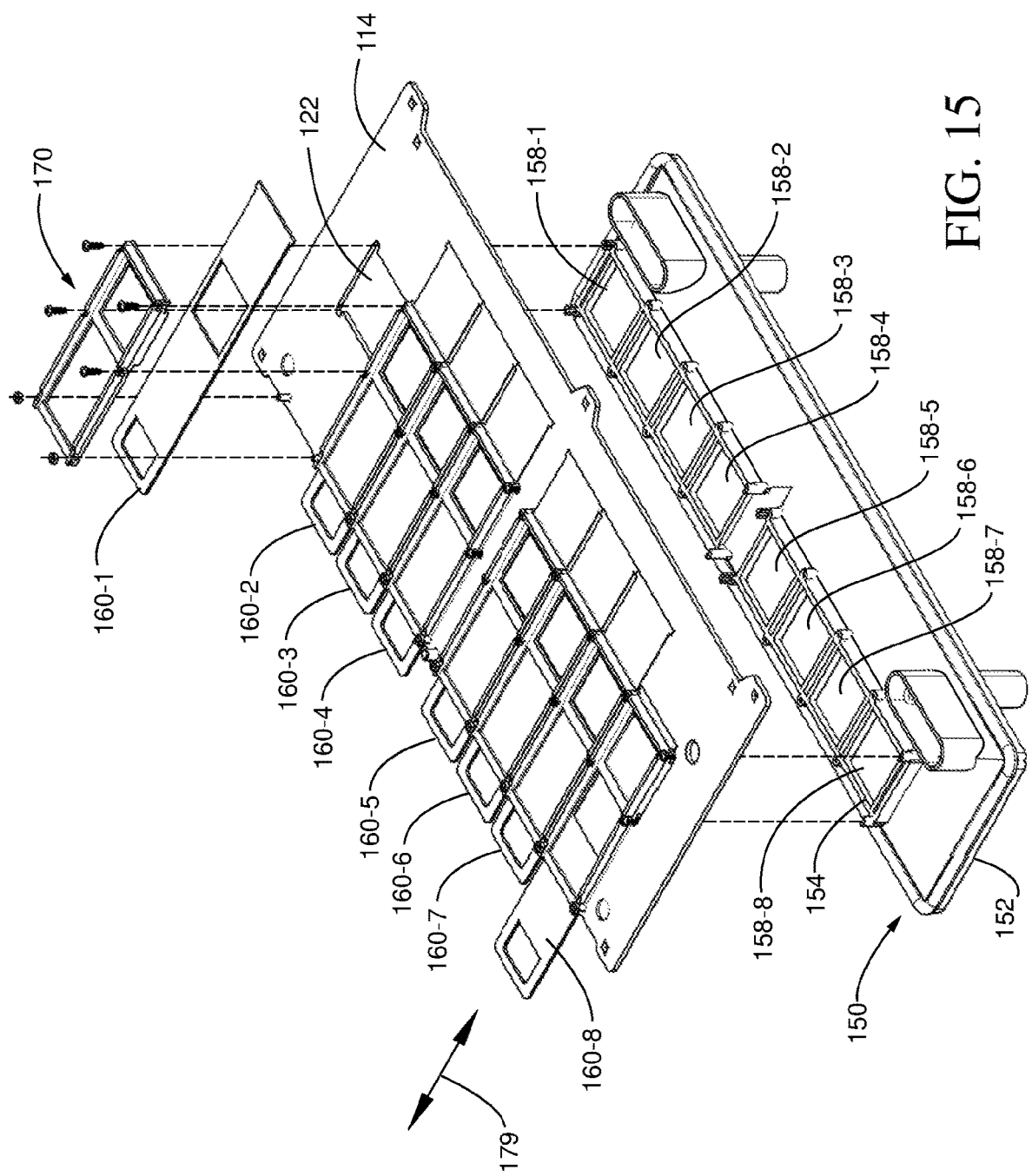
FIG. 15 is an exploded rear perspective view of FIG. 14 viewed from the underside of the top plate.
Figure 17:
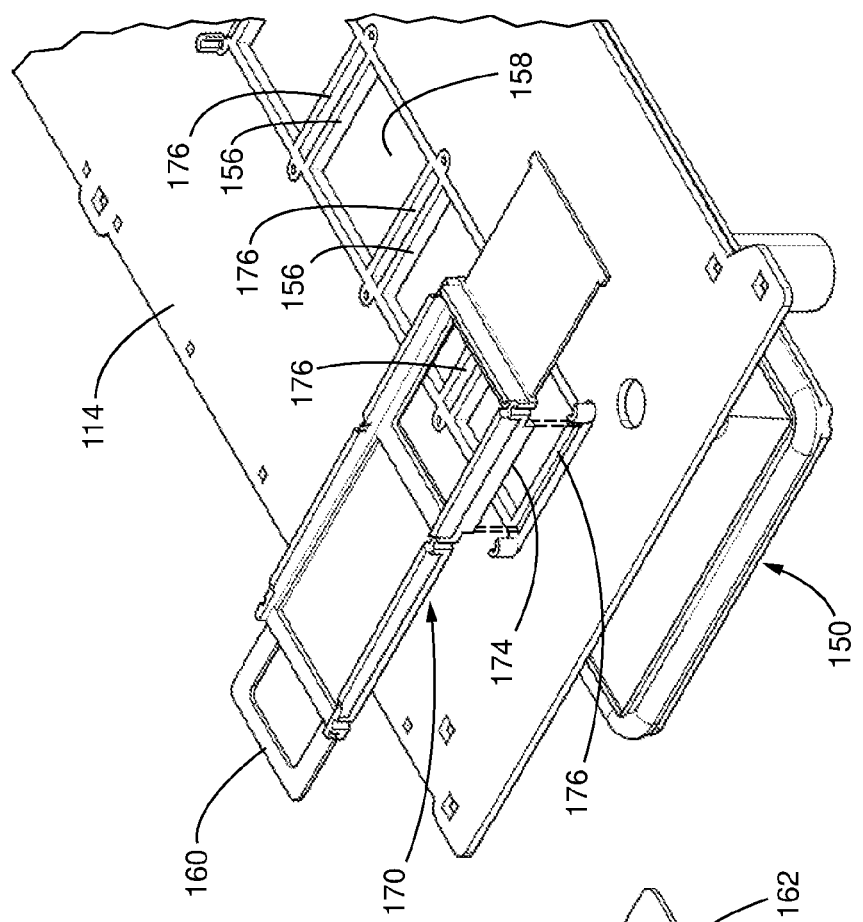
FIG. 17 is an enlarged, partially exploded rear perspective view of the slide gate and slide gate frame of FIG. 16 viewed from the underside of the top plate.
Figure 16:
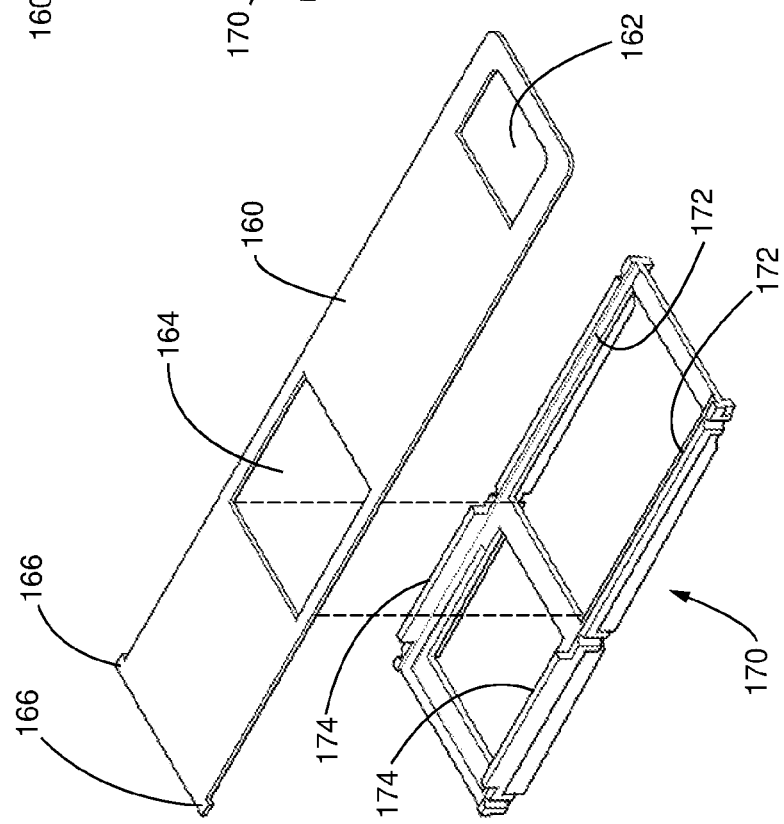
FIG. 16 is an exploded front perspective view of an embodiment of the slide gate and slide gate frame viewed from the top side of the slide gate.

As best shown in the exploded views of FIGS. 14-15, a series of slide gates 160 and slide gate frames 170 mount to the bottom side of the top plate 114. Each of the bottom openings 158-1 to 158-8 has an associated slide gate 160-1 to 160-8. As best shown in the enlarged views of FIGS. 16-17, each slide gate 160 includes a handle opening 162 at its forward end and a rearward product opening 164 through which product from the tank 40 will pass when the product opening 164 is aligned with the bottom openings 158 in the tank funnel 150. Each slide gate 160 is slidably secured to the bottom side of the top plate 114 by slide gate frames 170. The slide gate frame 170 includes opposing side channels 172 spaced to receive the slide gate 160 therebetween. The slide gate frame 170 includes an upper projection 174 that aligns with and is received by a cavity 176 (FIG. 17) in the bottom of each of the divider walls 156. The receipt of the upper projection 174 within the cavity 176, together with threaded connectors, rigidly, yet removable, secures the slide gate frame 170 to the bottom or underside of the top plate 114 and tank funnel 150. The slide gate 160 is thus permitted to slide fore and aft within the slide gate frame 170 as indicated by arrow 179 in FIG. 15 between a fully open position, in which the product opening 164 is aligned with the bottom opening 158 of the tank funnel 150, and a fully closed position, in which the rearward end of the slide gate 160 covers or closes off the bottom opening 158 of the tank funnel 150. The rearward end of the slide gate 160 includes outwardly projecting tabs 166 which act as stops by abutting against the rearward end of the slide gate frame 170 to prevent the slide gate 160 from being pulled out of the slide gate frame 170 and to indicate when the slide gate 160 is in the fully open position.

Based on the foregoing, and as best viewed in FIGS. 6 and 7, it should be appreciated that below each of the respective slide gates 160-1 to 160-8, and thus below each of the respective bottom openings 158-1 to 158-8 of the tank funnel 150, is an associated one of the meter modules 200-1 to 200-8. Thus, if it is desired to independently remove any one of the meter modules 200 from the metering bank 110 for service or repair, the operator may pull the associated slide gate 160 outwardly (forwardly) to the closed position, thereby closing-off the associated opening 158 in the tank funnel 150. Once the opening 158 is closed off by the slide gate 160, the meter module 200 below the closed slide gate 160 may be safely pulled out of the metering bank 110 without any of the product within the tank funnel 150 or the tank 40 above spilling out. Thus, it should be appreciated that any one of the meter modules 200, or all of the meter modules 200 may be pulled out of the metering bank 110 at any time for service or repair, even while the tank 40 is completely full. FIG. 10 is an example showing the slide gate 160-8 in the closed position and with the meter module 200-8 removed from the metering bank 110. When it is desired to resume operation, the meter module 200 is simply slid back into the metering bank 110 and the associated slide gate 160 pushed inward (rearward) to the open position, permitting product within the tank 40 to pass through the now-open opening 158 at the bottom of the tank funnel 150.

Referring to FIGS. 9 and 12, a diverter gate assembly 410 controls the flow of product between the meter modules 200 and the upper and lower air tube couplers 301, 302 of the respective air tube modules 300. The diverter gate assembly 410 includes a series of diverter gate modules 400, designated 400-1 to 400-8, each disposed below the respective meter modules 200-1 to 200-8 and above the respective air tube modules 300-1 to 300-8. While this configuration applies to a double chute configuration, it also applies to a single chute configuration in which air tube coupler 302 is not present.

Figure 18:
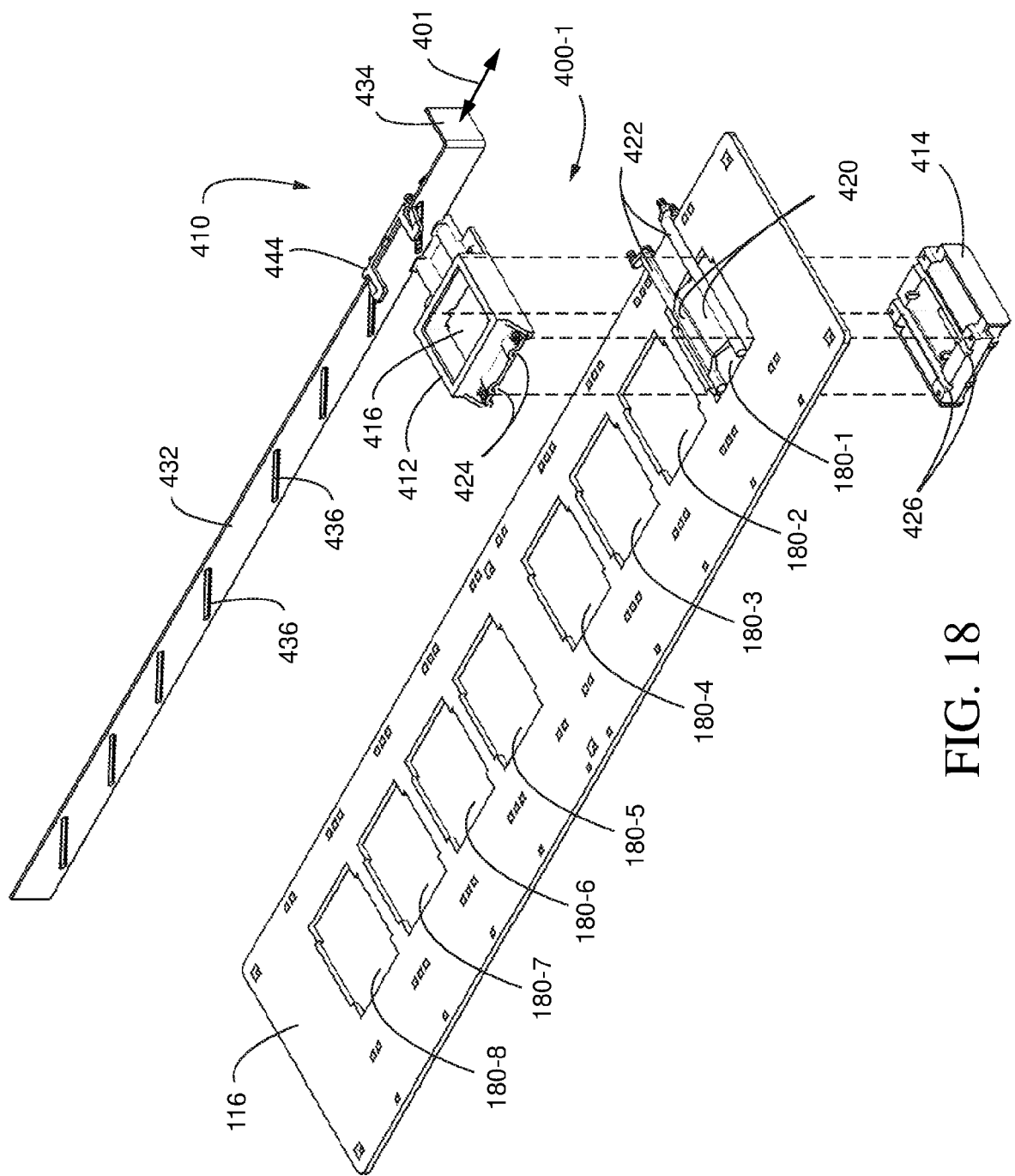
FIG. 18 is an exploded front perspective view showing an embodiment of the diverter gate assembly.
Figure 19:
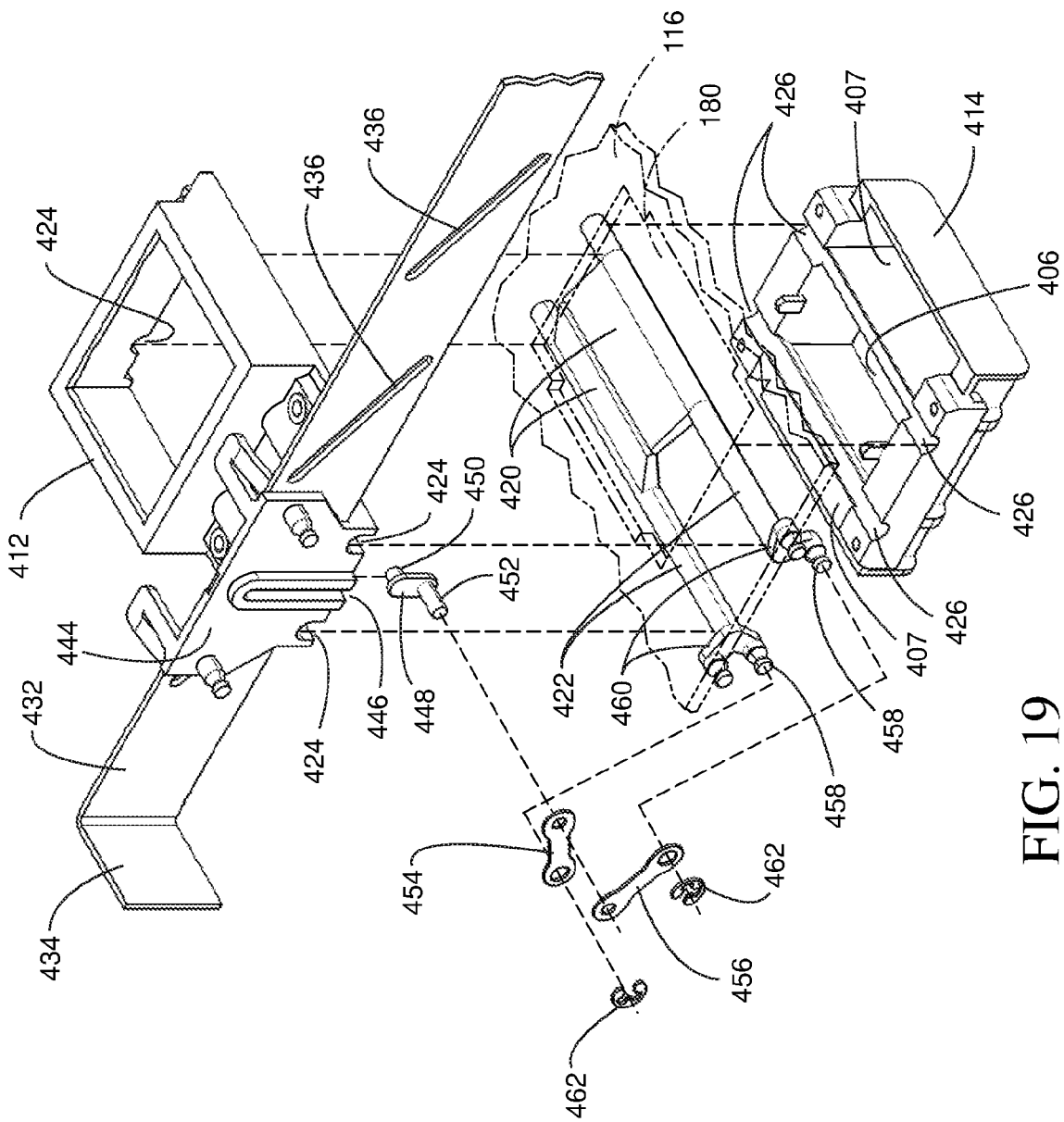
FIG. 19 is an enlarged exploded rear perspective view of the diverter gate assembly of FIG. 18.

FIGS. 18 and 19 are partially exploded front and rear perspective views, respectively, of the diverter gate assembly 410. Each diverter gate module 400 is disposed over a respective aperture 180-1 to 180-8 in the bottom plate 116 of the metering bank 110. Each diverter gate module 400 includes a top frame member 412 disposed on a top side of the bottom plate 116 and a bottom frame member 414 disposed on a bottom side of the bottom plate 116. FIGS. 20A-20B are top and bottom perspective views of the top frame member 412. The bottom frame member 414 defines a center passage 406 and two outer passages 407. A pair of diverter gates 420 are pivotally restrained via respective shafts 422 received within top and bottom recesses 424, 426 in the respective top and bottom frame members 412, 414 which matingly align to form a cylindrical bore within which the shafts 422 are pivotally received. Threaded connectors (not shown) secure the top and bottom frame members 412, 414 together over the aperture 180 in the bottom plate 116, and pivotally restrain the shafts 422 within the cylindrical bore, and thus pivotally restraining the diverter gates 420.

FIGS. 21A and 21B are rear elevation views in partial section schematically illustrating the pivotal movement of the diverter gates 420 between a first position (FIG. 21A) and a second position (FIG. 21B). In the first position, the center passage 406 is closed by the diverter gates 420 and the outer passages 407 are open to allow product flow to one of the upper and lower air tube couplers 301, 302 of the air tube module 300 therebelow. In the second position (FIG. 21B), the outer passages 407 are closed by the diverter gates 420 and the center passage 406 is open to allow product flow to one of the upper and lower air tube couplers 301, 302 of the air tube module 300 therebelow.

The diverter gates 420 are moved between the first position and the second position by a diverter gate actuator 430. As best viewed in FIGS. 12 and 18, the diverter gate actuator 430 includes an elongated plate 432 coupled to each of the diverter gate modules 400. One end of the elongated plate 432 includes a handle 434 which may be in the form of a 90 degree bend at the end of the elongated plate 432. By pulling and pushing on the handle 434, the elongated plate 432 is moved transversely as indicated by arrow 401, all of the diverter gates 420 of each of the diverter gate modules 400-1 to 400-8 may be collectively opened or closed as hereinafter described.

Referring to FIGS. 18-19 and 21A-21B, the elongated plate 432 includes a series of diagonal slots 436. The elongated plate 432 is slidably received between top and bottom channels 440, 442 (FIG. 20A-20B) of the actuator bracket 444 extending rearwardly from the top frame member 412. As best viewed in FIGS. 19 and 20A-20B, the actuator bracket 444 includes a vertical slot 446 which receives a slide member 448. The slide member 448 has a forwardly extending peg 450 which is received within one of the diagonal slots 436 of the elongated plate 432. The slide member 448 also includes a rearward extending peg 452. Referring to FIGS. 19, 21A and 21B, the rearwardly extending peg 452 receives one end of a pair of links 454, 456. The other end of each of the links 454, 456 is received by a rearwardly extending post 458 on a cam 460 at the rearward end of the shaft 422 of each of the diverter gates 420. Retainer clips 462 (FIG. 19) may secure the links 454, 456 onto the posts 458 and the peg 452. Referring to FIGS. 21A and 21B, it should be appreciated that when the elongated plate 432 is moved to the left (as indicated by arrow 401 in FIG. 21A), the diagonal slot 436 forces the slide member 448 downwardly within the vertical slot 446 due to the diagonal slot's engagement with the forwardly extending peg 450 on the slide member 448. As the slide member 448 is forced downwardly, the links 454, 456 (coupled between the rearwardly extending peg 452 and the posts 458), cause the diverter gates 420 to pivot to the first position (FIG. 21A) closing off the center passage 406 and opening the outer passages 407 to flow of the product therethrough. Conversely, when the elongated plate 432 is moved to the right (as indicated by arrow 401 in FIG. 21B), the diagonal slot 436 forces the slide member 448 upwardly within the vertical slot 446 due the diagonal slot's engagement with the forwardly extending peg 450 on the slide member 448. As the slide member 448 is forced upwardly, the links 454, 456 (coupled between the rearwardly extending peg 452 and the posts 458), cause the diverter gates 420 to pivot into the second position (FIG. 21B) closing off the outer passages 407 and opening the center passages 406 to flow of the product therethrough.

Figure 22:
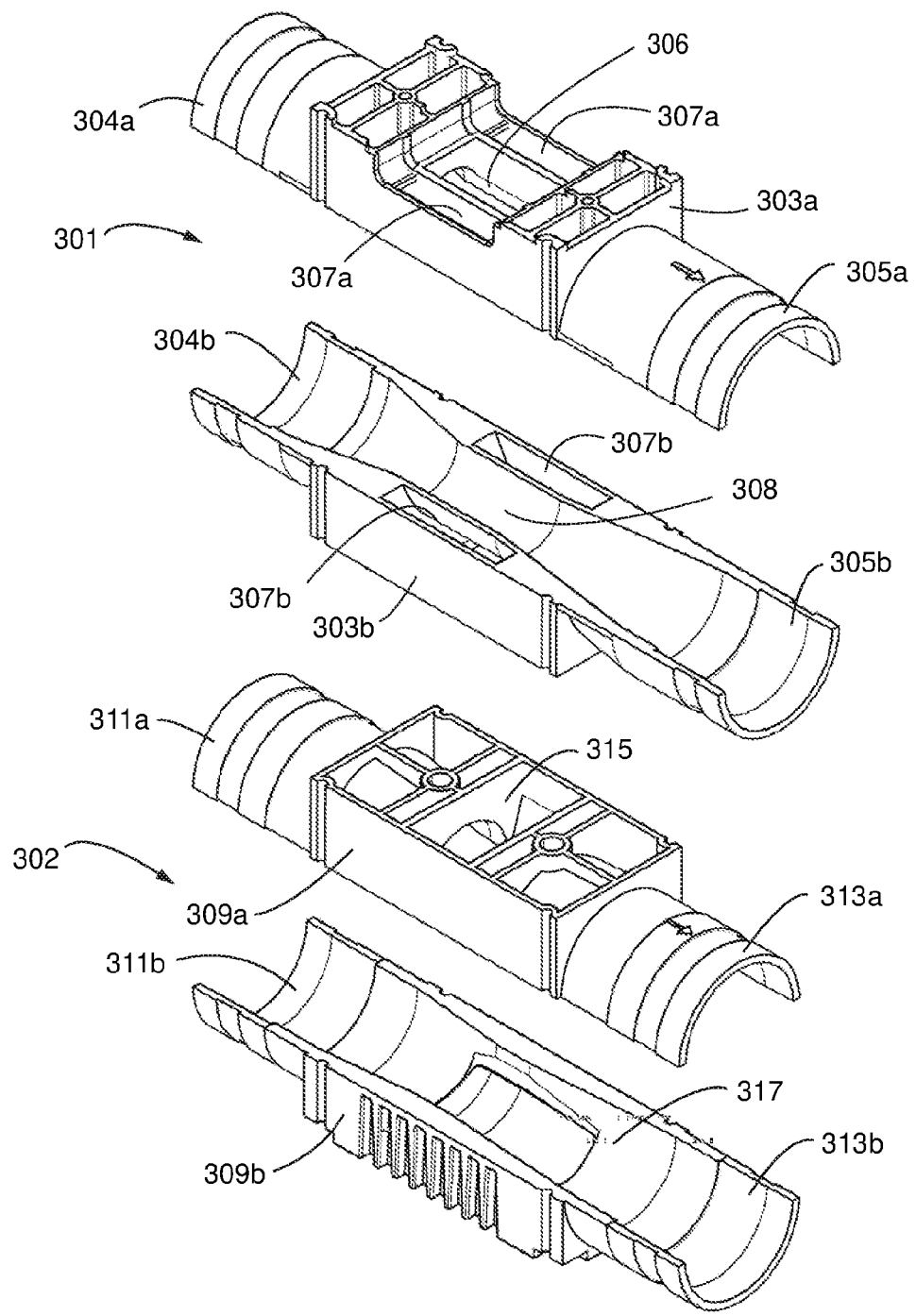
FIG. 22 is an exploded perspective view an air tube module showing the upper air tube coupler and lower air tube coupler each exploded into half-sections to show the passages therethrough.

FIG. 22 is an exploded perspective view an air tube module 300 showing the upper air tube coupler 301 and lower air tube coupler 302. The upper air tube coupler 301 is exploded into half-sections to show the passages therethrough with mating components of the half-sections designated by the suffixes "a" and "b". Similarly the lower air tube coupler 302 is exploded into half-sections to show the passages therethrough with mating components of the half-sections designated by the suffixes "a" and "b".

The upper air tube coupler 301 includes a block shaped body 303 with an inlet pipe section 304 and an outlet pipe section 305. The upper end of the block shaped body 303 has an upper end configured to receive and mate with the bottom frame member 414 of the diverter gate module 400. A longitudinal air flow passage 308 extends longitudinally through the block shaped body 303 and each of the inlet and outlet pipe sections 303, 305. The upper end of the block shaped body 303 includes a center passage 306 and outer passages 307. The center passage 306 is in communication with the longitudinal air flow passage 308. The outer passages 307 extend vertically through the block body 303 and are not in communication with the longitudinal air flow passage 308. The lower air tube coupler 302 includes a block shaped body 309 with an inlet pipe section 311 and an outlet pipe section 313. The upper end of the lower air tube coupler 302 includes an open area 315 that is in communication with a longitudinal air flow passage 317 extending longitudinally through the block shaped body 309. The open area 315 of the lower block shaped body 309 is in communication with the outer passages 307 of the upper air tube coupler 301. Thus, when the diverter gates 420 are in the first position (FIG. 21A) with the center passage 406 closed by the diverter gates 406 the product is directed by the diverter gates 420 into the outer passages 407 of the diverter gate module 400 and into the outer passages 307 of the upper air tube coupler 301. The product passes vertically through outer passages 307 in upper air tube coupler 301 and into the open end 315 of the lower air tube coupler 302 where the product then enters the longitudinal air flow passage 317 and is carried by the air stream flowing through longitudinal air flow passage 317 communicated by the air tubes 64 coupled at each end of the inlet and outlet pipe sections 311, 313 and the product is then distributed by the distribution tubes (not shown) coupled at the forward end of the air tubes 64 as previously explained. If, however, the diverter gates 420 of the diverter gate module 400 are in the second position (FIG. 21B) with the outer passages 407 closed by the diverter gates 420, the product is diverted into the center passage 406 of the diverter gate module 400 and into the aligned center passage 306 of the upper air tube coupler 301. The product falls through the center passage 306 into the longitudinal passage 308 whereupon the product is carried by the air stream passing through the longitudinal passage 308 communicated by the air tubes 64 coupled at each end of the inlet and outlet pipe sections 304, 305 and the product is then distributed by the distribution tubes (not shown) coupled at the forward end of the air tubes 64 as previously explained.

Meter Module Embodiments

Figure 23:
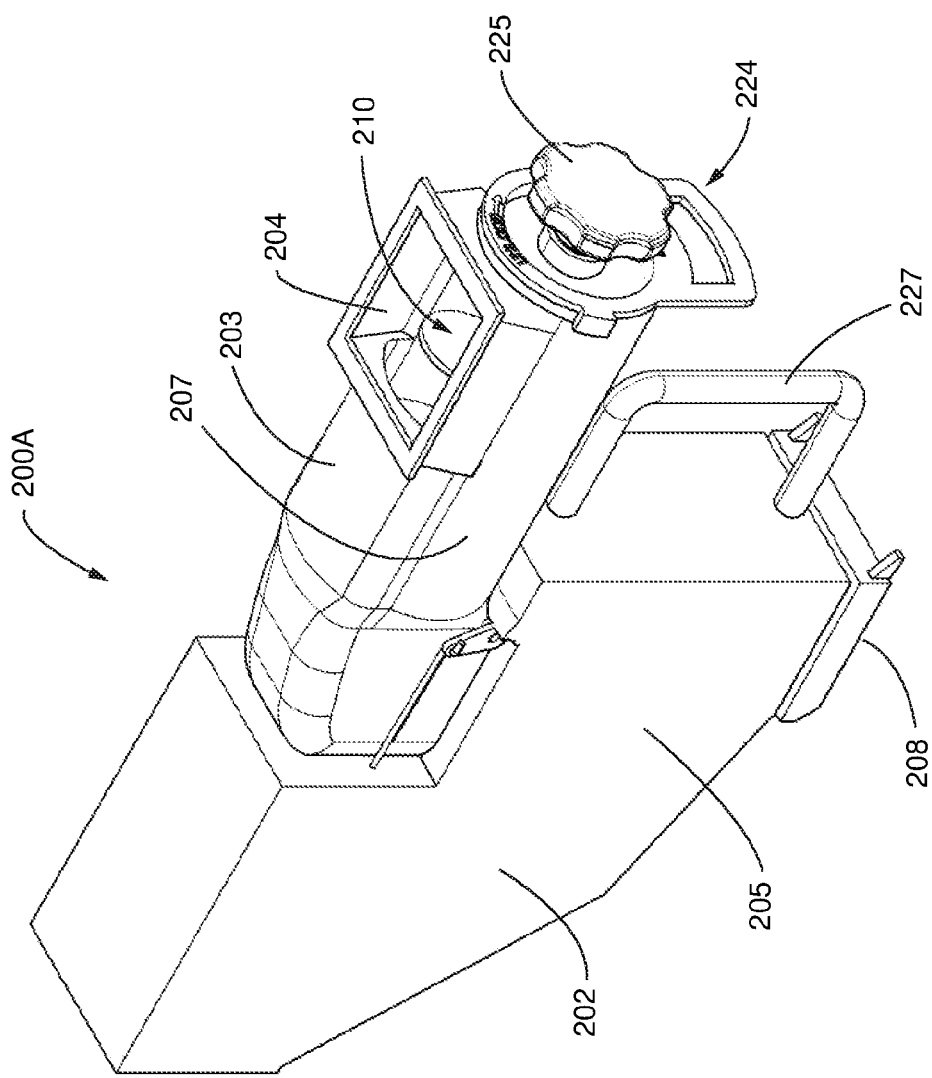
FIG. 23 is a front perspective view of an embodiment of a meter module.
Figure 24:
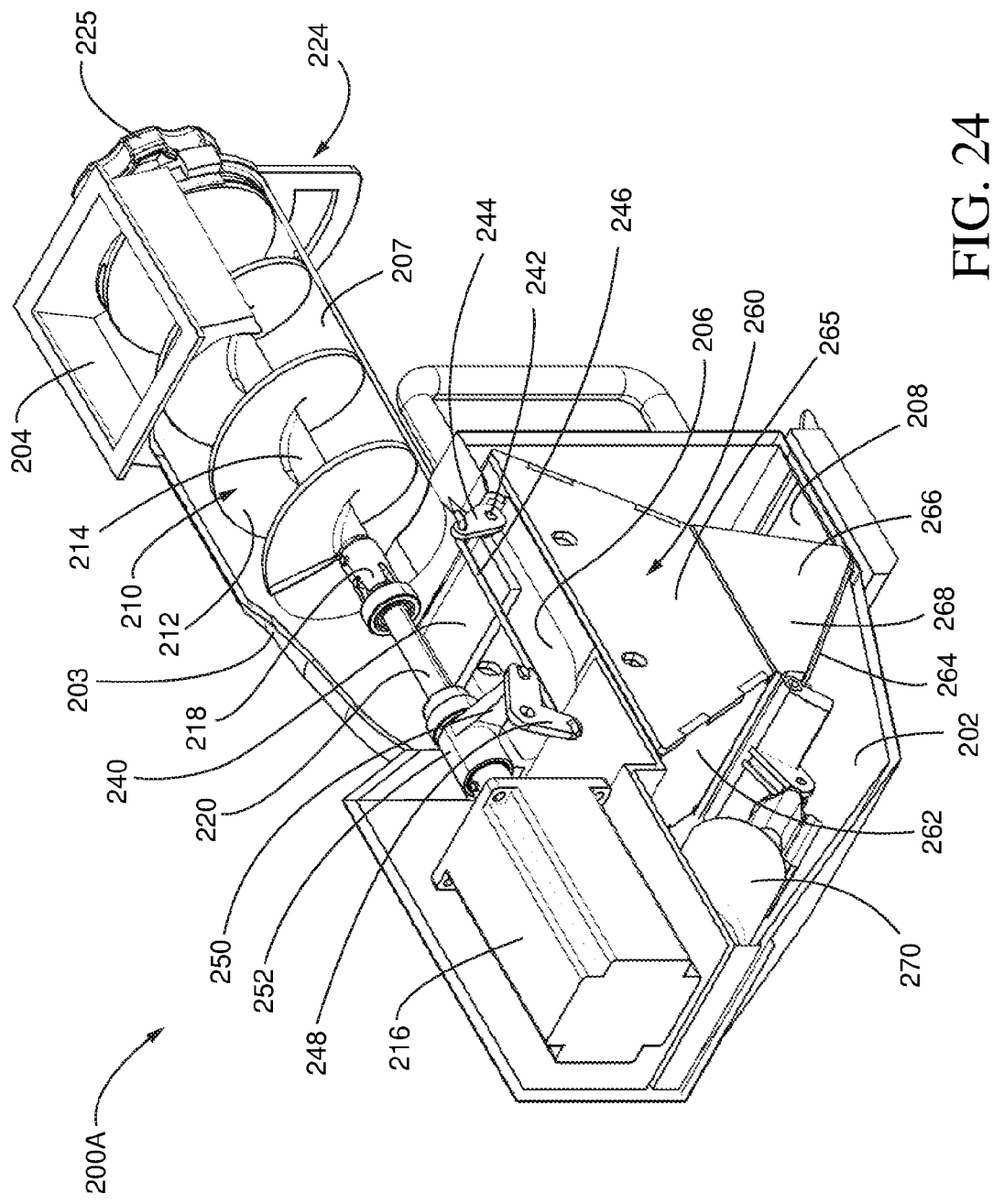
FIG. 24 is a rear perspective view of the meter module of FIG. 23 with portions of the housing removed to show internal components of the meter module.
Figure 25:
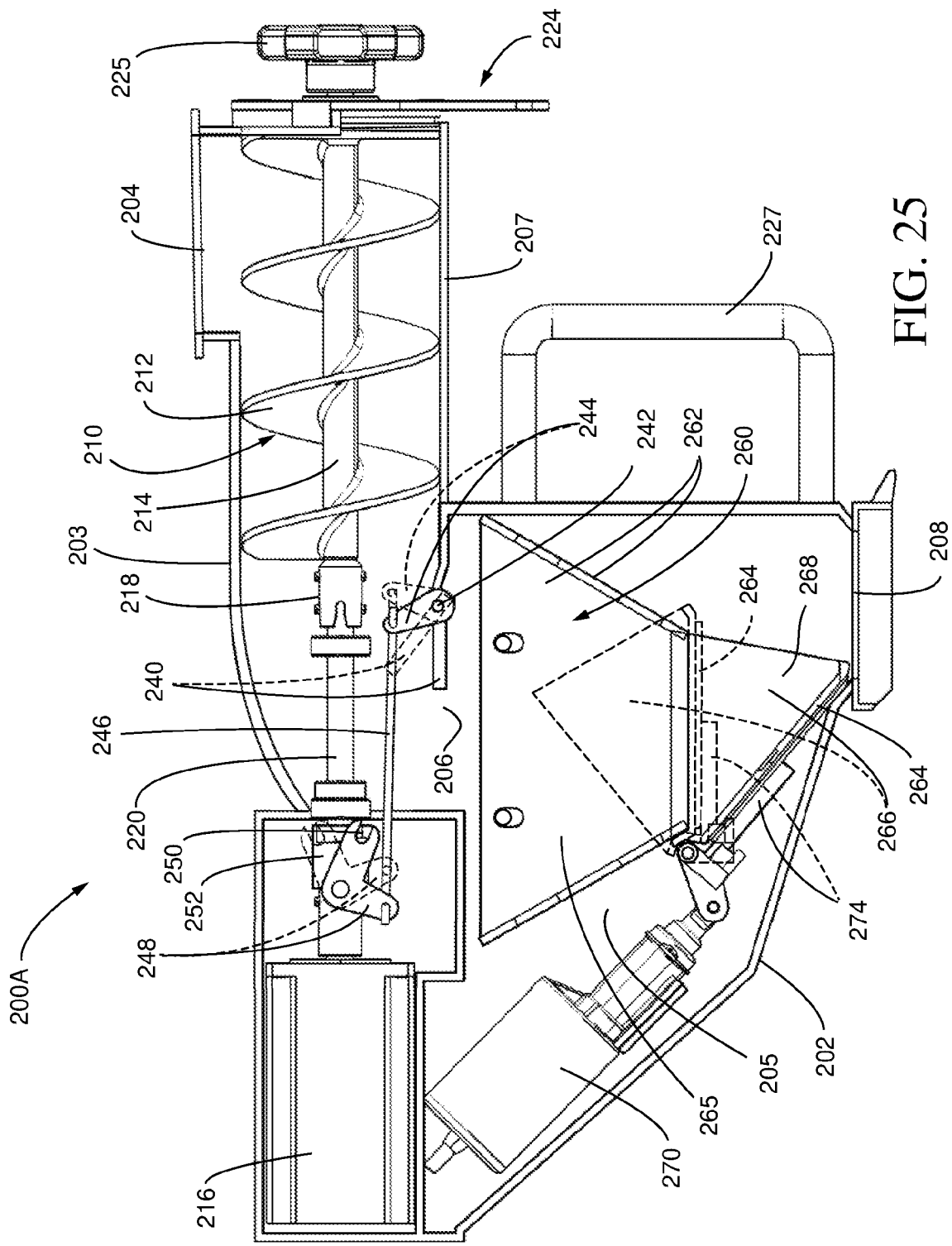
FIG. 25 is a side elevation view of the meter module of FIG. 23 in cross-section and showing movement of the chute structure.

FIG. 23 is a front perspective view of one embodiment of a meter module 200A. FIG. 24 is a rear perspective view of the meter module 200A of FIG. 23, but with most of the main housing 202 removed to show its internal components. FIG. 25 is a partial sectional view of the meter module 200A and shows movement of certain components discussed later. The meter module 200A includes a main housing 202 substantially enclosing the internal components of the meter module 200A and defines its overall configuration for seating within the metering bank 110. The main housing 202 includes a meter housing portion 203 at the upper end of the main housing 202 and a lower chamber portion 205 below the meter housing portion 203. The meter housing portion 203 includes a top opening 204 at its upper forward end and outlet 206 at its rearward end. The lower chamber portion 205 has a bottom opening 208 at its lowermost end. In reference to FIG. 13, it should be appreciated that the top opening 204 of the meter module 200A aligns with the bottom opening 158 of the tank funnel 150 and the bottom opening 208 of the meter module 200A aligns with the diverter gate module 400 when the meter module 200A is properly seated in the metering bank 110.

A meter mechanism 210, such as an auger, is received within the meter housing portion 203. While an auger is the preferred meter mechanism used in the meter modules 200, other types of meter mechanisms may also be used as discussed later. Since an auger is the preferred meter mechanism, for ease of drafting and understanding, the remainder of the description of each of the meter modules embodiments and the operation and calibration of the modular metering system 100, will refer to the meter mechanism 210 as an auger 210 and thus the meter housing portion 203 will be referred to as the auger housing portion 203.

The auger 210 includes auger flights 212 winding around the longitudinal axis 211 of the auger shaft 214. The longitudinal axis 211 is oriented generally parallel with the forward direction of travel 11 of the air cart 10. The auger housing portion 203 includes a cylindrical segment 207, or at least an internal wall defining a cylindrical segment. The cylindrical segment 207 surrounds a lower one-half of the diameter of the auger 210 and has an inside radius that is slightly larger than the outside radius of the auger flights 212. As the auger 210 rotates, the auger flights 212 are oriented such that the flights 212 carry or push the product rearward from the upper opening 204 (i.e., opposite the forward direction of the air cart 10) toward the auger housing outlet 206 at the rearward end of the cylindrical segment 207. While this illustrates a tow behind air cart, a tow between air cart can also be used, and in this case, auguring is in the same direction as air travel.

As best viewed in FIGS. 24 and 25, the auger 210 is driven by an electric motor 216, such as a stepper motor. A coupling joint 218 removably couples the auger shaft 214 with the drive shaft 220 coupled to the electric motor 216, thereby permitting the auger 210 to be easily decoupled from the motor drive shaft 220 and removed from the auger housing portion 203 for service, repair or replacement as described below.

Figure 26:
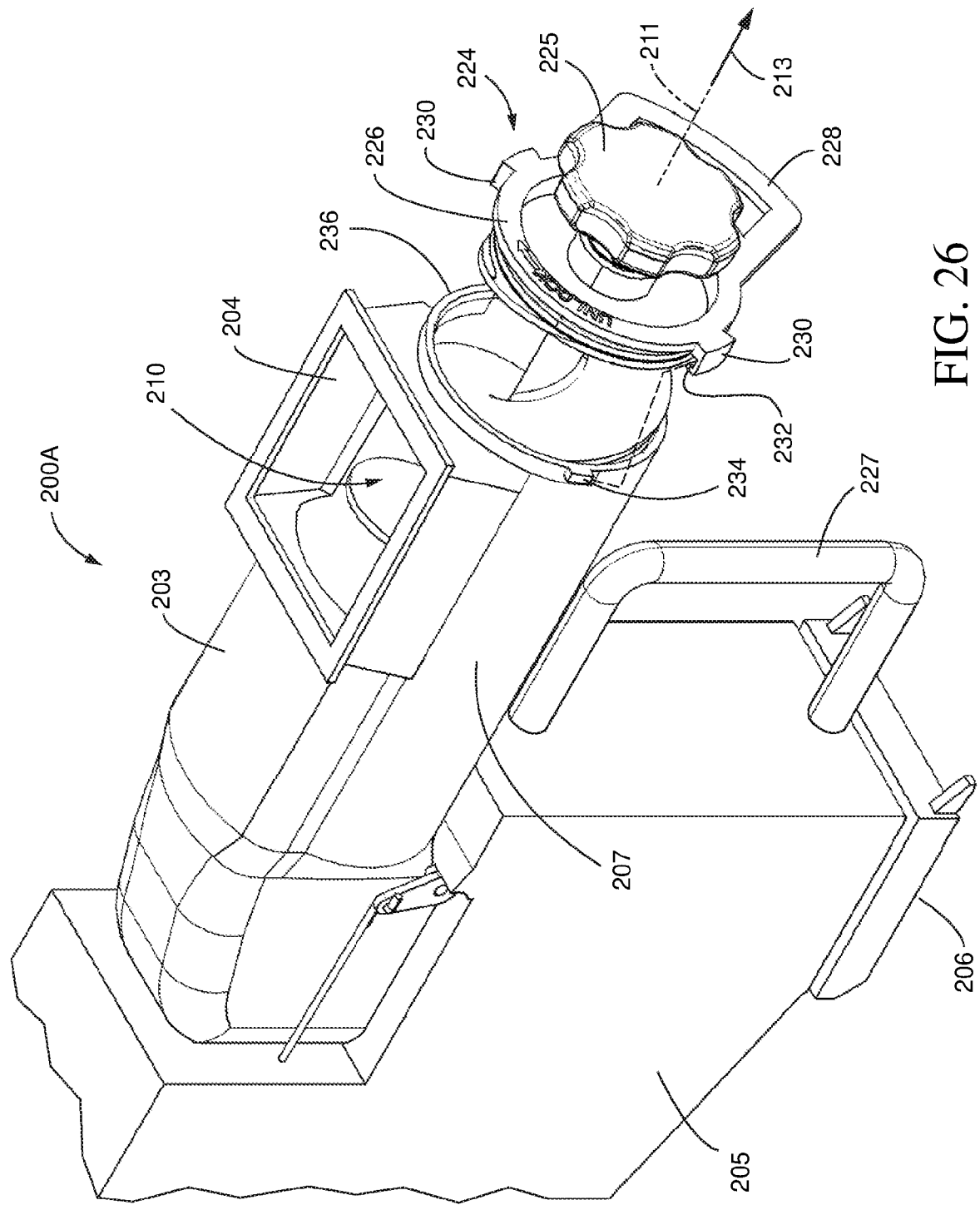
FIG. 26 is an enlarged front perspective view of the meter module of FIG. 23, showing operation of the auger lock mechanism and removal of the auger from the auger housing portion of the meter module.

Referring to FIGS. 23 and 26, an auger locking mechanism 224, an auger turn knob 225, and a handle 227 are provided on the forward end of the meter module 200A. It should be appreciated that the handle 227 may be grasped by the operator when it is desired to slidably remove the entire meter module 200 from the metering bank 110 as described above and illustrated in FIG. 10, and when reinserting the meter module 200 into the metering bank 110. The auger turn knob 225 is removably secured to the end of the auger shaft 214 such that manual rotation of the auger turn knob 225 by the operator will cause the auger 210 to rotate.

As best shown in FIG. 26, the auger locking mechanism 224 includes a rotatable locking collar 226 having a locking handle 228 extending therefrom. The rotatable locking collar 226 includes a pair of circumferentially spaced tab receivers 230 extending radially outward from the locking collar 226. The tab receivers 230 include an arcuate channel 232 extending partially through the width of the tab receivers 228. A pair of locking tabs 234 (one locking tab 234 is hidden from view in FIG. 26) extend radially outward from a receiving collar 236 on a forward face of the main housing 202. When the locking handle 228 is moved into the locked position (shown in FIG. 23), the locking tabs 234 are received within the arcuate channels 232 of the tab receivers 230, thereby longitudinally securing the auger 210 within the auger housing portion 203. When it is desired to remove the auger 210 from the auger housing portion 203, the operator grasps the locking handle 228 rotating it counterclockwise (as viewed in FIG. 26) to an unlocked position in which the tab receivers 230 are rotatably disengaged from the stationary locking tabs 234 on the receiving collar 236. Once the tab receivers 230 are disengaged from the locking tabs 234, the auger 210 may be pulled outwardly (forwardly) from the auger housing portion 203 as indicated by arrow 213 in FIG. 26. As the auger 210 is pulled outwardly in the direction of arrow 213, the auger shaft 214 decouples from the motor drive shaft 220 at the coupling joint 218 (FIG. 24). When replacing the auger 210 within the auger housing portion 203, the operator pushes the auger 210 inwardly until the joint coupler 218 at the end of the auger shaft 214 abuts the motor drive shaft 220. The operator then turns the auger turn knob until the joint coupler 218 seats onto or over the motor drive shaft 220. In the embodiment of the joint coupler 218 illustrated in FIG. 24, the motor drive shaft 220 includes a pin which seats within a forked end of the joint coupler 218, but any suitable means of removably coupling the auger shaft 214 with the motor drive shaft 220 may be used as recognized by those of skill in the art. Once the joint coupler 218 is seated onto the motor drive shaft 220, the operator rotates the locking lever 228 clockwise (as viewed in FIG. 26) to the locked position as shown in FIG. 23 such that the locking tabs 234 are again received within the arcuate channels 232 of the tab receivers 230, thereby locking the auger 210 within the auger housing portion 203.

Referring to FIGS. 24 and 25, a flip gate 240 is pivotally retained within the auger housing portion 203 toward a rearward end of the auger 210. During operation of the air cart 10, the flip gate 240 is disposed in the down position, wherein the flip gate 240 is in a horizontal or slightly downward orientation as shown in FIG. 24 and as shown in solid lines in FIG. 25. When in the down position, the product augured rearwardly by the auger 210 flows over the flip gate 240 and drops through the auger housing outlet 206 and into the lower chamber portion 205. However, when the air cart 10 is not in operation, such as when the air cart is being transported between fields or when it is desired to remove the module from the metering bank 110, the flip gate 240 may be pivoted to the up position as shown in dashed lines in FIG. 25. When in the up position, the flip gate 240 obstructs any product that may remain in the auger housing portion 203 rearward of the rearward-most auger flight 212 from dropping through the auger housing outlet 206 into the lower chamber portion 205, thereby preventing any inadvertent spilling of the product from the meter module 200A. Movement of the flip gate 240 from the down position to the up position may be accomplished by any suitable means, including via a manual lever extending through the side of the auger housing 202 (not shown), by a direct drive actuator coupled to a pivot pin rotationally fixed to the flip gate 240 (not shown), or by any other suitable mechanism.

In one embodiment as shown in FIGS. 24 and 25, the movement of the flip gate 240 is accomplished with a mechanical linkage coupling the motor drive shaft 220 with the flip gate 240. The flip gate 240 is supported at the rearward end of the auger housing portion 203 by a hinge pin 242. The hinge pin 242 is rotationally fixed to a hinge cam 244. A rod 246 connects the hinge cam 244 to one leg of an L-shaped member 248 pivotally supported within the main housing 202. The other leg of the L-shaped member 248 is coupled to a lever arm 250 rotationally fixed to a bushing 252 surrounding the motor drive shaft 220. A one-way clutch mechanism (not illustrated) associated with the bushing 252 causes rotational engagement of the bushing 252 (and thus the lever arm 250) with rotation of the motor drive shaft 220. The one way-clutch mechanism may be engaged to cause rotational engagement of the bushing 252 with the motor drive shaft 220 via a command signal or as a result of the motor drive shaft 220 being commanded to rotate in a reverse direction from its normal direction of rotation when the air cart 10 is in operation. Thus, in reference to FIG. 25, when the end of the lever arm 250 is rotated upwardly due to the rotational engagement of the bushing 252 with the motor drive shaft 220 via the one-way clutch mechanism, the lever arm 250 causes the L-shaped member 248 coupled thereto to rotate in the counterclockwise direction (as viewed in FIG. 25). The counterclockwise rotation of the L-shaped member 248 forces the rod 246 coupled thereto to the right or forwardly (as viewed in FIG. 25). The forward movement of the rod 246 forces the hinge cam 244 and the flip gate 240 rotationally fixed thereto by the hinge pin 242 to rotate in the clockwise direction (as viewed in FIG. 25) or upwardly to the up position. The flip gate 240 remains in the up position until the clutch mechanism is disengaged. For example the flip gate 240 may be spring biased to return to the normally down position when the clutch mechanism is disengaged. Alternatively, the clutch mechanism may automatically disengage when the motor drive shaft 220 is again rotated in the normal direction of rotation. Engagement of the clutch mechanism to cause rotational engagement of the bushing 252 with the motor drive shaft 220 may also be performed manually by the operator rotating the auger turn knob 225 in the reverse direction until the flip gate 240 is moved into the up position. Alternatively, the motor 216 may be programmed to reverse rotation of the motor drive shaft 220 to cause a partial reverse revolution of the auger 210 (such as one-quarter revolution) upon receiving a command initiated by the operator of the air cart 10, thereby causing the flip gate 240 to move from the down position to the up position. For example, the motor 216 may be programmed to reverse direction one quarter turn of the auger 210 when the operator raises the applicator implement at the end rows or headlands of field, shuts off the blower 62, overplant control (controller prevents overplant when GPS coordinates reach a position on a coverage map of an already planted field section), or other operation in which discharge of the product into the air tubes 64 or distribution lines of the applicator implement is not desired.

The meter module 200A may also employ product flow sensors and a calibration system as hereinafter described. Referring to FIGS. 24 and 25, the lower chamber portion 205 may include internal structure, such as internal walls or baffles which guide or direct the product from the auger housing outlet 206 toward the bottom opening 208 of the meter module 200. In one embodiment, such internal structure may include an internal structure 260 supported within the lower chamber portion 205 of the main housing 202. The internal structure 260 may be comprised of sloped sidewalls 262 defining an open bottom end, wherein the sloped sidewalls direct or guide the product downwardly and forwardly toward the bottom opening 208 of the main housing 202.

Figure 27A:
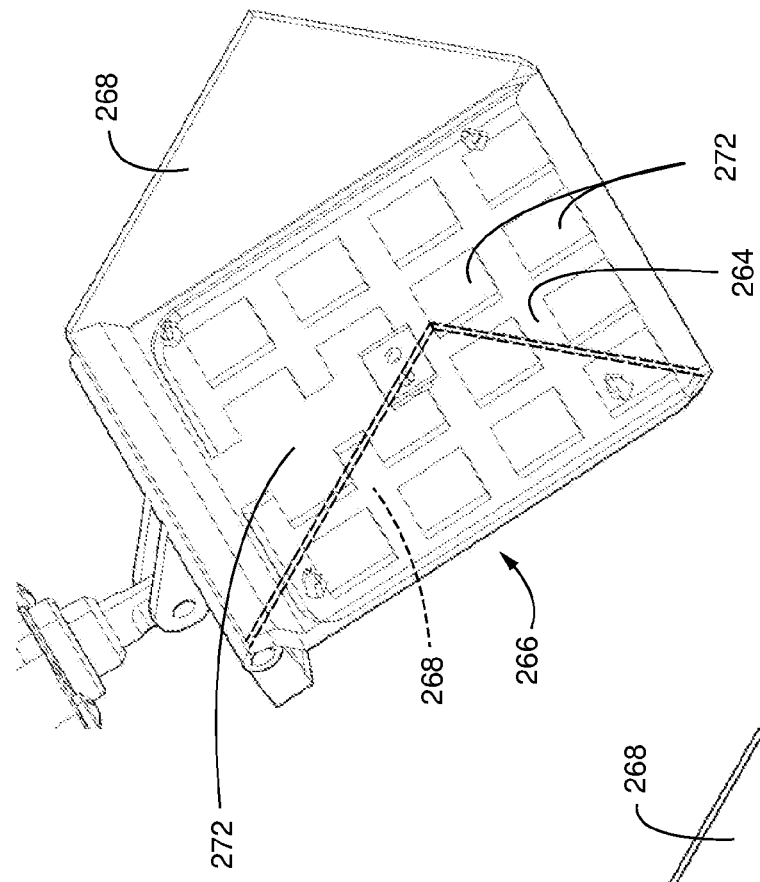
FIG. 27A is an enlarged perspective view of the chute structure of FIG. 26, and showing an embodiment of the bottom plate instrumented with sensors.
Figure 27:
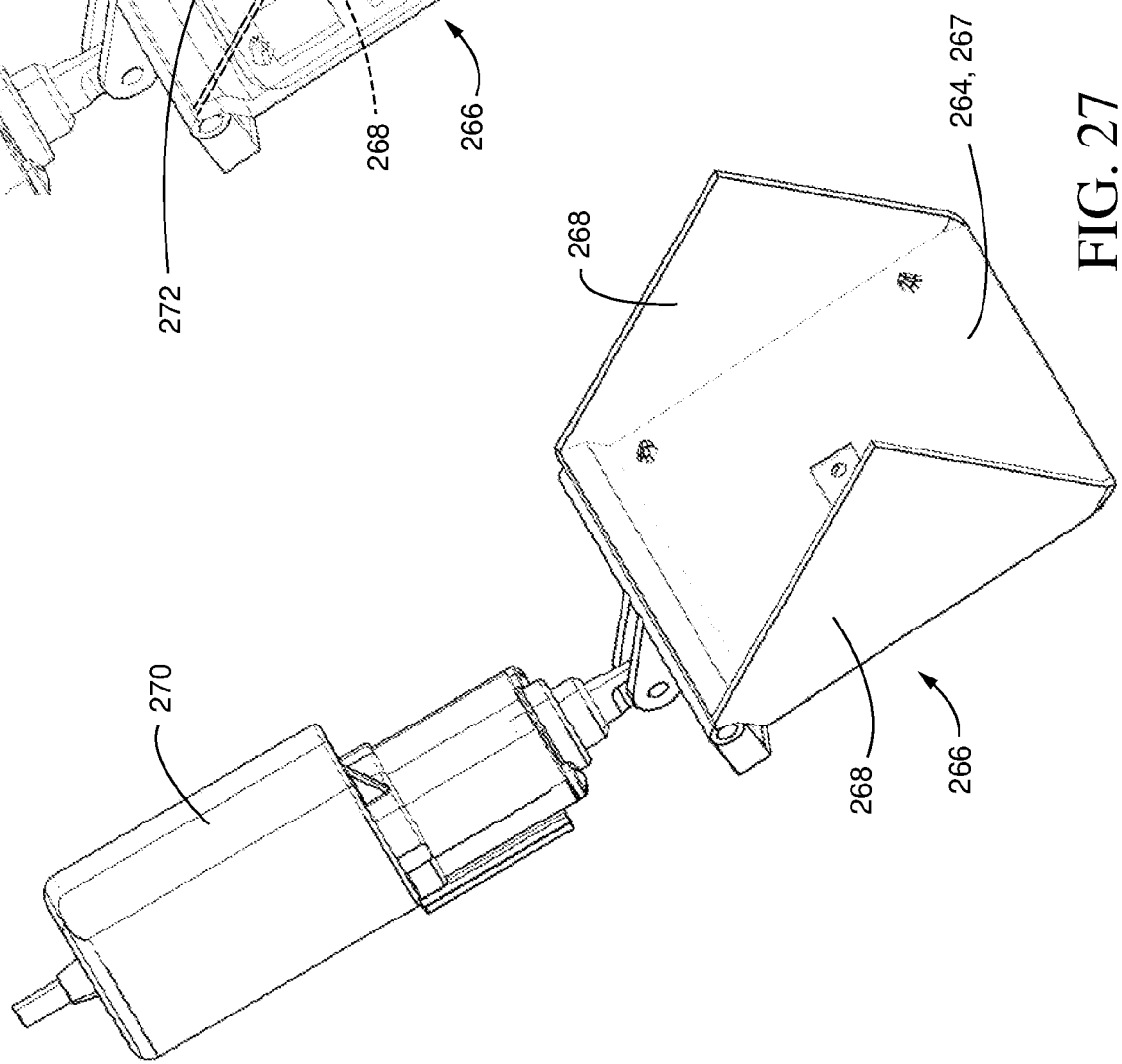
FIG. 27 is a perspective view of an embodiment of a chute structure.

The internal structure 260 may include a bottom plate 264 disposed at an angle relative to the direction of flow of the product flowing from the auger housing outlet 206 toward the bottom opening 208. The bottom plate 264 may be instrumented with impact or pressure sensors 272 such that the bottom plate 264 functions as a flow sensor. As illustrated in FIGS. 27 and 27A, the bottom plate 264 may include a plurality of impact or pressure sensors 272 arranged below a resilient, wear resistant, upper surface layer 267 (shown removed in FIG. 27A). The impact or pressure sensors 272 are configured to generate signals (such as voltage signals) corresponding in magnitude to the amount of product flowing over the surface of the plate 264. If the impact or pressure sensors 272 are not generating signals of sufficient magnitude, thereby indicating no-flow or low-flow volume of product through the meter module 200, an alarm condition may be initiated to alert the operator that a particular meter module 200 within the metering bank 110 is not operating properly. The operator may then stop operation and remove the meter module 200 from the metering bank 110 for inspection as previously described or to determine if there is an obstruction in the opening 158 of the tank funnel preventing the flow of product therethrough. In such an embodiment, it will be appreciated that the sensor plate 264 is in signal communication with the controller 510 and an integrated or separate monitor display screen visible to the operator in the cab of the tractor pulling the air cart. The signal communication may be wired or wireless.

In some embodiments, the signal magnitudes generated by the impact or pressure sensors 272 may be empirically correlated to volume or mass flow of the product, similar to the operation of a yield sensor commonly used on agricultural combine harvesters as is well known to those of ordinary skill in the art. Such empirically correlated volume or mass flow signal magnitudes may serve as a row-by-row application rate sensor of the product being applied. An example of a sensor correlating signal magnitudes to mass flow rates and volumetric flow rates is disclosed in U.S. Pat. No. 9,506,786 issued to Precision Planting LLC.

In alternative embodiments, rather than the bottom plate 264 being instrumented with impact or pressure sensors 272 to detect product flow, other types of sensors may be employed to detect product flow. Examples of alternative types of product flow sensors may include, optical sensors, piezoelectric sensors, microphone sensors, electromagnetic energy sensors, or particle sensors. In such alternative embodiments, utilizing optical sensors, piezoelectric sensors, electromagnetic sensors or particle sensors, the sensor elements may be disposed on opposing sidewalls 262 of the funnel structure or otherwise within the lower chamber portion 205 of the main housing 202 of the meter module 200 to detect the passage of product between the sensor elements. An example of a suitable optical sensor may be the type distributed by Dickey-John Corporation of Auburn, IL and disclosed in U.S. Pat. No. 7,152,540. An example of a suitable microphone sensor may be Recon Wireless Blockage System available from Intelligent Ag Solutions. An example of a suitable particle sensor may be the type disclosed in International Patent Publication No. WO2020194150 to Precision Planting LLC. An example of a suitable electromagnetic energy sensor, may be the type disclosed in U.S. Pat. No. 6,208,255, assigned to Precision Planting LLC.

In the embodiment illustrated in FIGS. 24 and 25, the internal structure 260 may be comprised of two parts, including an upper funnel structure 265 having an open bottom end and a capture structure 266. As best illustrated in FIG. 27, the capture structure 266 may include sidewalls 268 extending upwardly from a bottom plate 264. As shown in FIG. 25, the capture structure 266 may be pivotally supported within the lower chamber portion 205 by an actuator 270 for movement between a dump position, indicated by solid lines in FIG. 25, and a capture position, indicated by dashed lines in FIG. 25. The capture structure 266 may be instrumented with a load cell 274. When the capture structure 266 is in the dump position, product flow may be detected by the impact or pressure sensors 272 or by any of the alternative flow sensors as described above. In the capture position, the capture structure 266 covers or closes off the open bottom end of the upper funnel structure 265 to capture the metered product augured by the auger 210 which is then measured by the load cell 274 for calibration purposes as described later. As non-limiting examples, the load cell 274 may be configured to measure strain due to bending or shear forces, such as a beam-type load cell or load pin-type load cells. As the product is captured by the capture structure 266 in the capture position, the load cell 274 generates a signal magnitude in proportion to the amount of strain in the load cell 274 due to the captured product. As described later, the signals generated by the load cell 274 are received by the controller 510 which then correlates the signal magnitude to the weight of the product captured. The capture structure 266 may also be moved to the capture position when the air cart 10 is being transported or when the meter module 200A is being removed from the metering bank 110 to prevent or minimize inadvertent spilling or release of the product that may remain in the auger housing portion 203.

Figure 28:
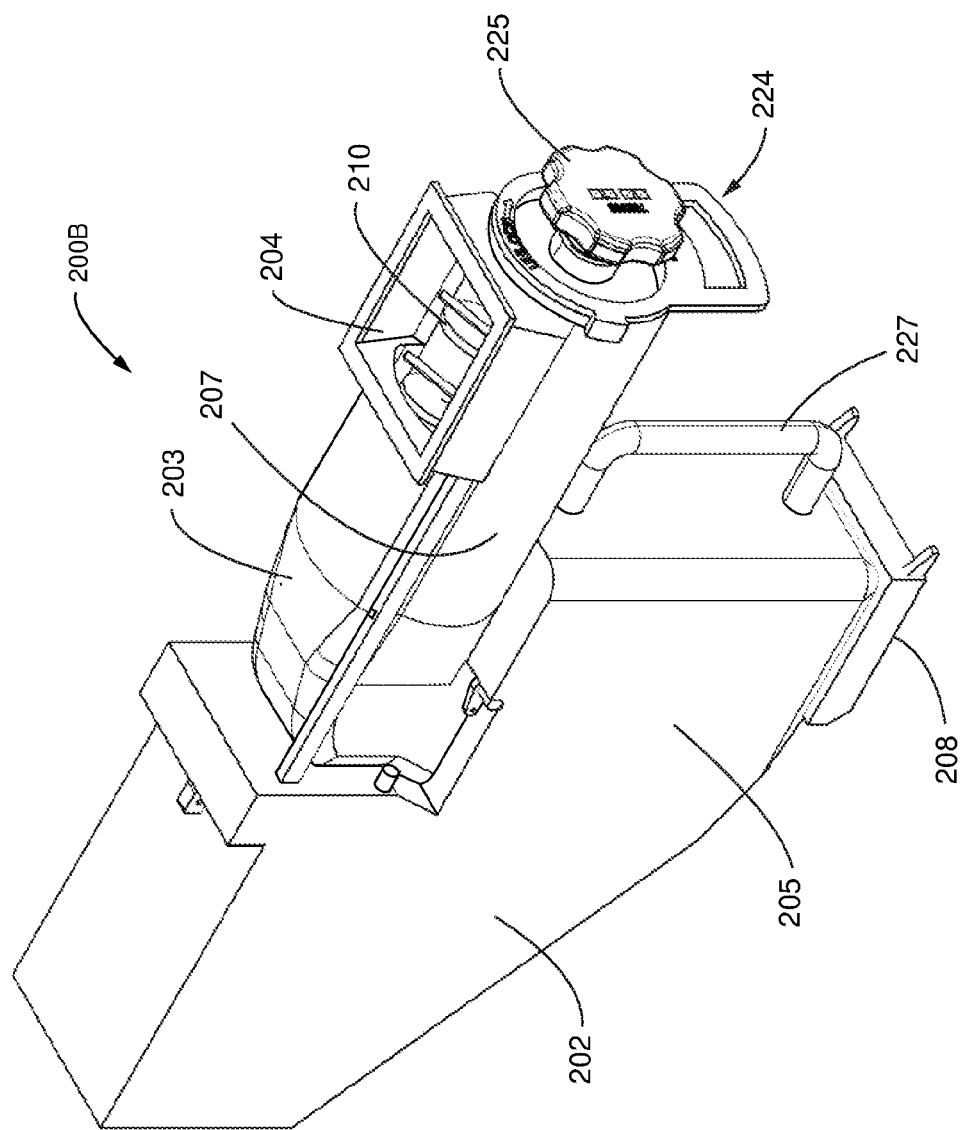
FIG. 28 is a front perspective view of another embodiment of a meter module.
Figure 29:
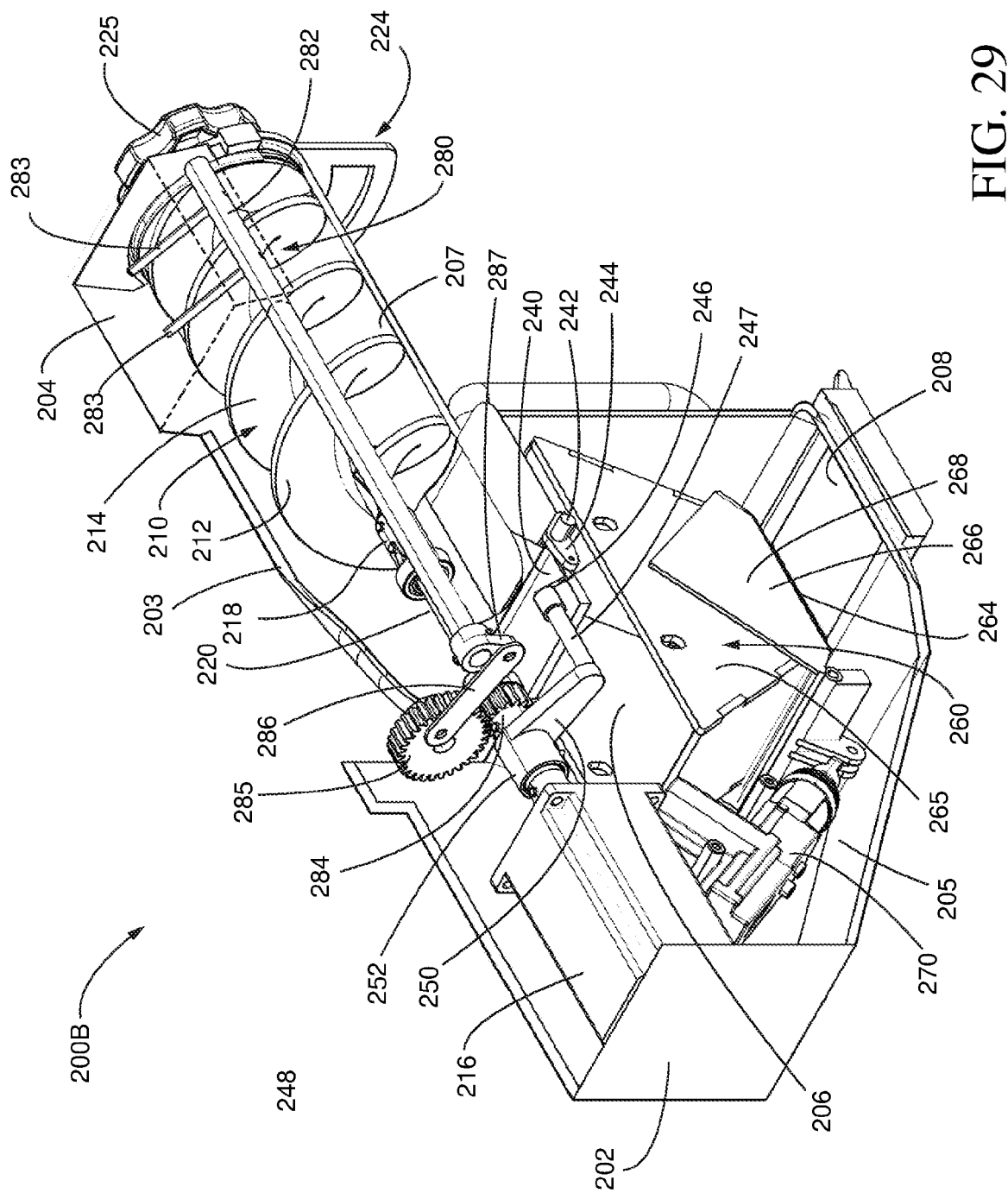
FIG. 29 is a rear perspective view of the meter module of FIG. 28 with portions of the housing removed to show internal components of the meter module.
Figure 30:
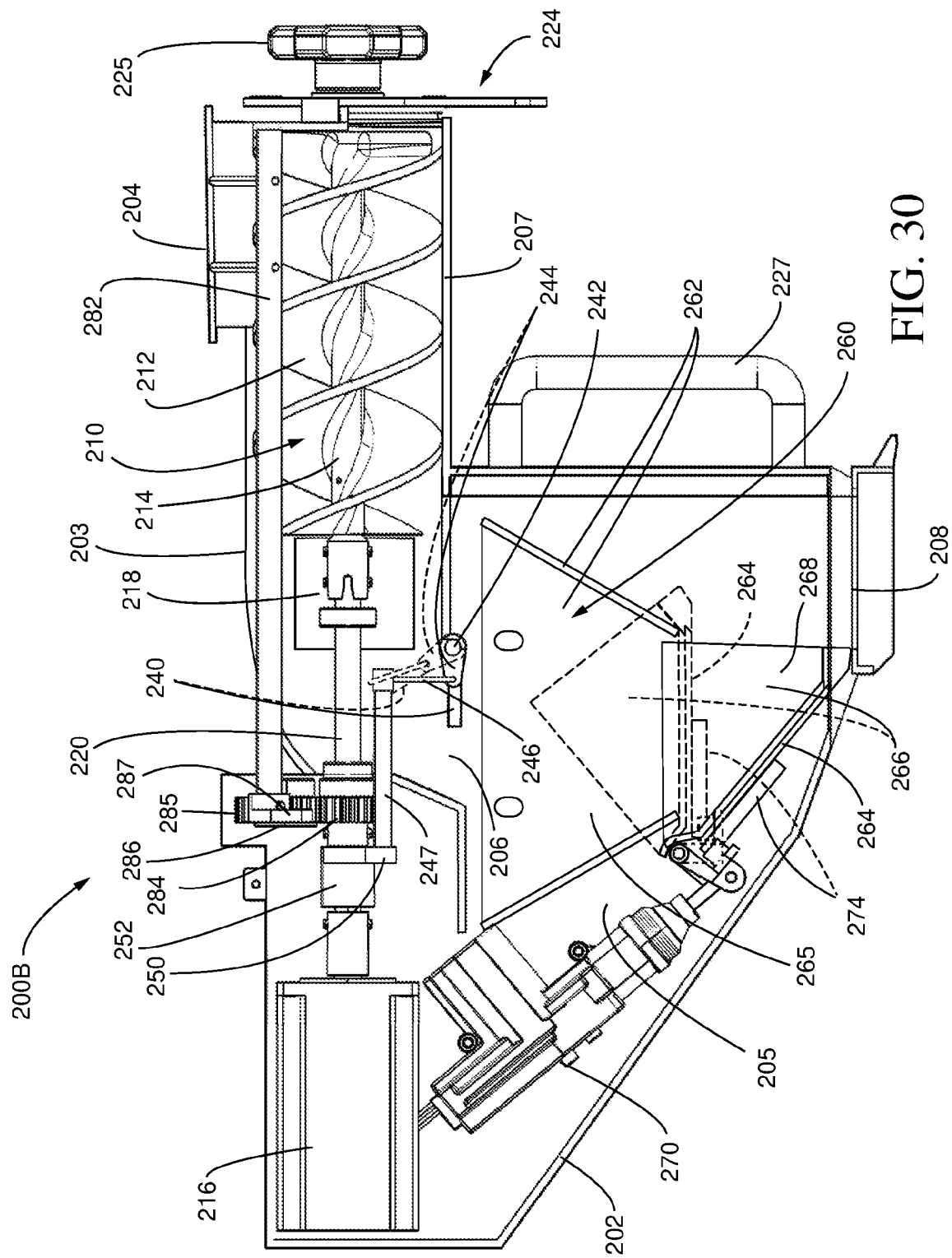
FIG. 30 is a side elevation view of the meter module of FIG. 28 in cross-section and showing movement of the chute structure.

FIGS. 28-30 illustrate another embodiment of a meter module 200B. FIG. 28 is a front perspective view of meter module 200B. FIG. 29 is a rear perspective view of the meter module 200B of FIG. 28, but with most of the main housing 202 removed to show its internal components. FIG. 30 is a partial sectional view of the meter module 200B and shows movement of certain components discussed later. The meter module 200B includes a main housing 202 substantially enclosing the internal components of the meter module 200B and defines its overall configuration for seating within the metering bank 110. The main housing 202 includes an auger housing portion 203 at the upper end of the main housing 202 and a lower chamber portion 205 below the auger housing portion 203. The auger housing portion 203 includes a top opening 204 at its upper forward end and an auger housing floor opening 206 at its rearward end. The lower chamber portion 205 has a bottom opening 208 at its lowermost end. In reference to FIG. 13, it should be appreciated that the top opening 204 of the meter module 200B aligns with the bottom opening 158 of the tank funnel 150 and the bottom opening 208 of the meter module 200B aligns with the diverter gate module 400 when the meter module 200B is properly seated in the metering bank 110.

A constant diameter auger 210 is received within the auger housing portion 203. The auger 210 includes auger flights 212 winding around the longitudinal axis 211 of the auger shaft 214. The longitudinal axis 211 is oriented generally parallel with the forward direction of travel 11 of the air cart 10. The auger housing portion 203 includes a cylindrical segment 207, or at least an internal wall defining a cylindrical segment. The cylindrical segment 207 surrounds a lower one-half of the diameter of the auger 210 and has an inside radius that is slightly larger than the outside radius of the auger flights 212. As the auger 210 rotates, the auger flights 212 are oriented such that the flights 212 carry or push the product rearward from the upper opening 204 (i.e., opposite the forward direction of the air cart 10) toward the auger housing outlet 206 at the rearward end of the cylindrical segment 207.

As best viewed in FIGS. 29 and 30, the auger 210 is driven by an electric motor 216, such as a stepper motor. A coupling joint 218 removably couples the auger shaft 214 with the drive shaft 220 coupled to the electric motor 216, thereby permitting the auger 210 to be easily decoupled from the motor drive shaft 220 and removed from the auger housing portion 203 for service, repair or replacement as described below. Meter module 200B also includes, an auger locking mechanism 224, an auger turn knob 225, and a handle 227 on the forward end of the meter module 200B which operate and serve the same function as previously discussed in connection with meter module 200A.

As with embodiment of the meter module 200A, the embodiment of the meter module 200B may include internal structure 260 to direct the product toward the bottom opening 208. The internal structure 260 may be comprised of two parts, including an upper funnel structure 265 having an open bottom end and a capture structure 266. The capture structure 266 may include sidewalls 268 which extend upwardly from a bottom plate 264. The bottom plate 264 may be instrumented with impact or pressure sensors 272 and with a load cell 274 as previously described. As shown in FIG. 30, the capture structure 266 may be pivotally supported within the lower chamber portion 205 by an actuator 270 for movement between a dump position, indicated by solid lines in FIG. 30, and a capture position, indicated by dashed lines in FIG. 30. When the capture structure 266 is in the dump position, product flow may be detected by the impact or pressure sensors 272 on the bottom plate 264 as described above or by any of the other flow sensors described above. In the capture position, the capture structure 266 covers or closes off the open bottom end of the upper funnel structure 265 to capture the metered product augured by the auger 210 which is then measured by the load cell 274 for calibration purposes described later. As the product is captured by the capture structure 266 in the capture position, the load cell 274 generates a signal magnitude in proportion to the amount of strain in the load cell 274 due to the captured product. As described later, the signals generated by the load cell 274 are received by the controller 510 which then correlates the signal magnitude to the weight of the product captured. The capture structure 266 may also be moved to the capture position when the air cart 10 is being transported or when the meter module 200B is being removed from the metering bank 110 to prevent or minimize inadvertent spilling or release of the product that may remain in the auger housing portion 203.

As best illustrated in FIG. 29, an agitator 280 is incorporated above the auger 210 within the upper opening 204 of the auger housing portion 203 to break up clods and to ensure a consistent stream of product enters the upper opening 204 through the passage 158 of the tank funnel 150. The agitator 280 includes a rod 282 rotatably supported at a forward end by the sidewalls of the auger housing portion 203 defining or framing the upper opening 204. Agitating fingers 283 are secured toward the forward end of the rod 282 which project into the upper opening 204 above the auger 210. In operation, these agitating fingers 283 will oscillate within the upper opening 204 as the rod 282 pivots back and forth due to the linkage at the rearward end of the rod 282. In this embodiment, the motor drive shaft 220 includes a gear 284 which engages with a larger gear 285 providing a rotational speed reduction. A linkage 286 is pivotally secured at one end to a face of the larger gear 285 such that it is axially offset. The other end of the linkage 286 is pivotally secured to a lobe 287 rotationally fixed with the rod 282. Thus, as the motor drive shaft 220 rotates, the engagement of the gears 284 and 285 causes the linkage 286 pivotally secured to the face of the larger gear 285 to move in a circular path which, in turn, causes the lobe 287 to which the other end of the linkage 286 is pivotally secured to move back and forth, i.e., laterally side-to-side. The back and forth movement of the lobe 287 causes the same motion in the rod 282 to which the lobe 287 is rotationally fixed. The back and forth motion of the rod 282 results in the fingers 283 at the forward end of the rod 282 to oscillate back and forth within the upper opening 204.

Like the meter module embodiment 200A, the meter module embodiment 200B includes a flip gate 240 pivotally supported at a rearward end of the auger housing portion 203, forward of the auger housing outlet 206. Also similar to meter module 200A, the flip gate 240 in meter module 200B is configured to move between a down position and an up position as shown in dashed lines in FIG. 30. In one embodiment as shown in FIGS. 29 and 30, the movement of the flip gate 240 is accomplished with a mechanical linkage coupling the motor drive shaft 220 with the flip gate 240. The flip gate 240 is supported at the rearward end of the auger housing portion 203 by a hinge pin 242. The hinge pin 242 is rotationally fixed to a hinge cam 244. A rod 246 connects the hinge cam 244 to shaft 247 which is coupled to a lever arm 250 rotationally fixed to a bushing 252 surrounding the motor drive shaft 220. A one-way clutch mechanism (not illustrated) associated with the bushing 252 causes rotational engagement of the bushing 252 (and thus the lever arm 250) with rotation of the motor drive shaft 220 as previously described in connection with meter module 200A and the clutch may be actuated by any of the means described in connection with the clutch mechanism of meter module 200A.

Figure 31:
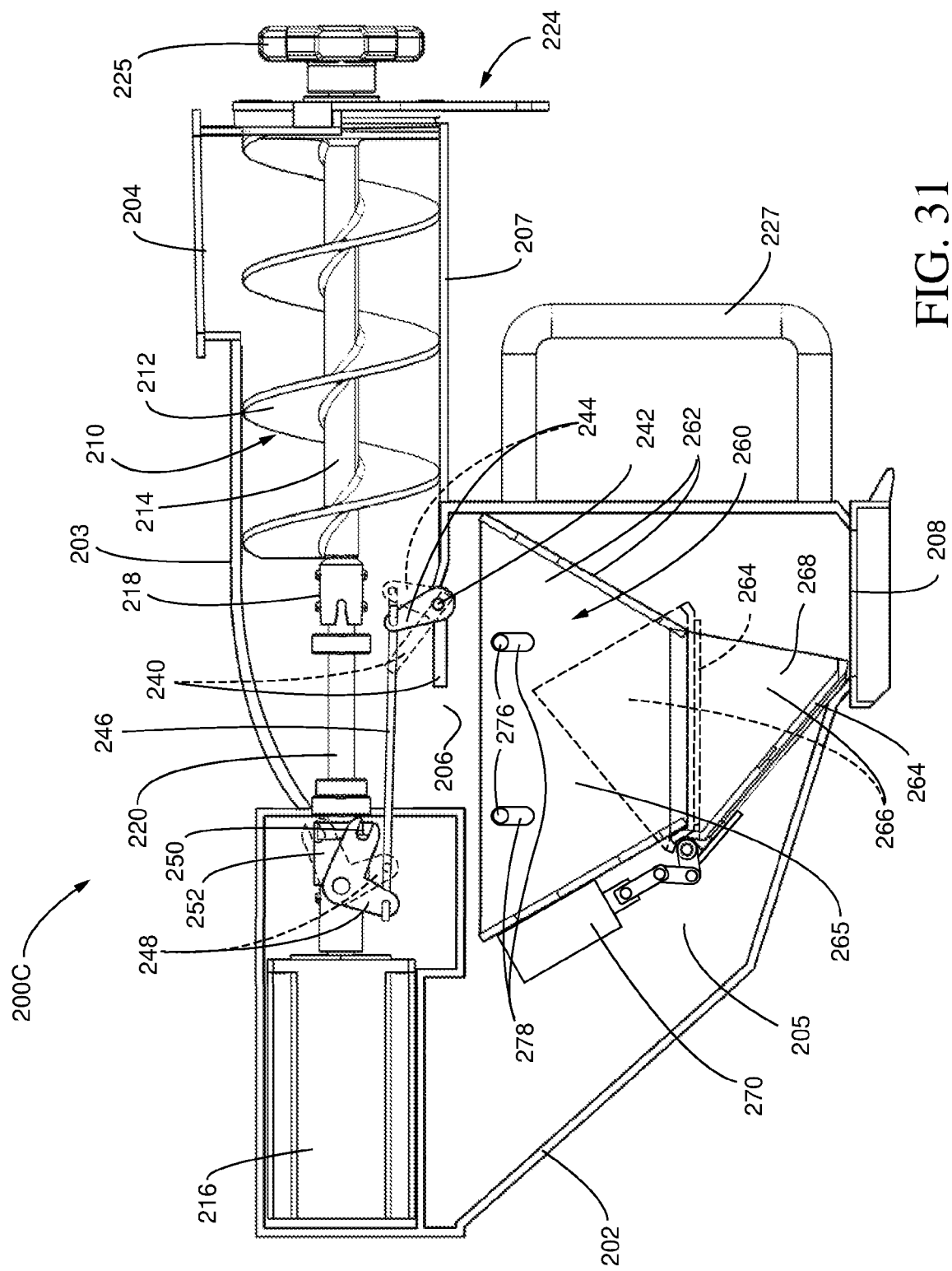
FIG. 31 is a side elevation view of another embodiment of a meter module.

FIG. 31 is a side elevation view of another embodiment of a meter module 200C. While the embodiment of meter module 200C is shown as being substantially the same as the embodiment of meter module 200A, it should be appreciated that meter module 200C may be configured to incorporate the agitator 280 and flip gate 240 (and their respective parts, features and components) as described and illustrated in connection with the embodiment of meter module 200B.

The meter module 200C includes a main housing 202 substantially enclosing the internal components of the meter module 200C and defines its overall configuration for seating within the metering bank 110. The main housing 202 includes an auger housing portion 203 at the upper end of the main housing 202 and a lower chamber portion 205 below the auger housing portion 203. The upper auger housing portion 203 includes a top opening 204 at its upper forward end and an auger housing outlet 206 at its rearward end. The lower chamber portion 205 has a bottom opening 208 at its lowermost end. In reference to FIG. 13, it should be appreciated that the top opening 204 of the meter module 200C aligns with the bottom opening 158 of the tank funnel 150 and the bottom opening 208 of the meter module 200C aligns with the diverter gate module 400 when the meter module 200C is properly seated in the metering bank 110.

A constant diameter auger 210 is received within the auger housing portion 203. The auger 210 includes auger flights 212 winding around the longitudinal axis 211 of the auger shaft 214. The longitudinal axis 211 is oriented generally parallel with the forward direction of travel 11 of the air cart 10. The auger housing portion 203 includes a cylindrical segment 207, or at least an internal wall defining a cylindrical segment. The cylindrical segment 207 surrounds a lower one-half of the diameter of the auger 210 and has an inside radius that is slightly larger than the outside radius of the auger flights 212. As the auger 210 rotates, the auger flights 212 are oriented such that the flights 212 carry or push the product rearward from the upper opening 204 (i.e., opposite the forward direction of the air cart 10) toward the auger housing outlet 206 at the rearward end of the cylindrical segment 207.

The auger 210 is driven by an electric motor 216, such as a stepper motor. A coupling joint 218 removably couples the auger shaft 214 with the drive shaft 220 coupled to the electric motor 216, thereby permitting the auger 210 to be easily decoupled from the motor drive shaft 220 and removed from the auger housing portion 203 for service, repair or replacement. Meter module 200C also includes, an auger locking mechanism 224, an auger turn knob 225, and a handle 227 on the forward end of the meter module 200C which operate and serve the same function as previously discussed in connection with meter module 200A.

As with the embodiment of the meter module 200A, the embodiment of the meter module 200C may include internal structure 260 comprised of two parts, including an upper funnel structure 265 and a capture structure 266. The capture structure 266 may include sidewalls 268 extending upwardly from a bottom plate 264. The bottom plate 264 may be instrumented with impact or pressure sensors 272 as previously described. However, in this embodiment, the capture structure 266 is hingedly attached to the upper funnel structure 265 and is movable by an actuator 270 mounted on the upper funnel structure 265. The actuator 270 moves the capture structure 266 between a dump position, indicated by solid lines in FIG. 31, and a capture position, indicated by dashed lines in FIG. 31. As in the previous embodiments, when the capture structure 266 is in the dump position, product flow may be detected by the impact or pressure sensors 272 on the bottom plate 264 as described above or by any of the other flow sensors described above. In the capture position, the capture structure 266 covers or closes off the open bottom end of the upper funnel structure 265 to capture the product augured by the auger 210 for calibration purposes described later. Additionally, as previously described, the capture structure 266 may be moved to the capture position when the air cart 10 is being transported or when the meter module 200C is being removed from the metering bank 110 to prevent or minimize inadvertent spilling or release of the product that may remain in the auger housing portion 203.

In this embodiment, the upper funnel structure 265 (to which the capture structure 266 and actuator 270 are mounted) is supported within the lower chamber portion 205 via one or more load cells 276 for weighing a sample of the product during the calibration operation described later. The type of load cells 276 used to weigh the product captured by the capture structure 266 in the capture position, may vary depending on the manner in which the funnel structure 265 is supported within the lower chamber portion 205. As non-limiting examples, the load cells 276 may be configured to measure tension or compression, such as a canister-type load cells utilizing a spring element or S-type load cells. Alternatively, the load cells 276 may be configured to measure strain due to bending or shear forces, such as a beam-type load cell or load pin-type load cells. In FIG. 31, beam-type load cells 276 are shown supporting the funnel structure 265. The beam load cells 276 project laterally inwardly from the sidewalls of the lower chamber portion 205 of the main housing 202 and are received within vertical slots 278 in the lateral sidewalls 262 of the funnel structure 265. As the product sample is captured by the capture structure 266 in the capture position, the load cells 276 generate a signal magnitude in proportion to the amount of strain in the load cell due to the captured product. As described later, the signals generated by the load cells 276 are received by the controller 510 which then correlates the signal magnitude to the weight of the captured product.

An advantage of the modular metering system 100 is that the meter modules 200 may be made entirely or substantially of corrosion resistant plastic (e.g., polypropylene, PVC, HDPE, UHMW, PTFE) or other corrosion material, including the main housing 202, the internal structure 260, including the funnel 265 and capture structure 266 if used, as well as the auger 210. Thus, each meter module 200 should have a longer life than most commercially available metering systems and if any meter module becomes corroded, or fails, it may be easily removed for servicing or replaced with a new meter module 200 as previously explained.

Auger and Alternative Metering Mechanisms

As identified above, an auger is the preferred metering mechanism 210 for the meter modules 200. An auger is an accurate and efficient metering mechanism because each revolution of an auger will meter a substantially consistent amount of product. Additionally, it has been found that a single "standard" auger configuration will accurately meter most types of product that a grower may apply to a field, whether seed or fertilizer, such that only a single "standard" auger is required for the meter modules 200. An exception is when seeding or planting canola or similar vary small seed sizes which are applied at very high application rates. According, for seeding canola or similar small seeds, a second auger (a "canola auger") having closer spaced flights than the "standard" auger may be required. Additionally, for canola augers, the diameter of the flights may be slightly larger than for a standard auger so as to provide a near zero fit between the auger flights 212 and the inside radius of the cylindrical segment 207 of the auger housing portion 203. The near zero fit may provide for higher seed metering accuracy for very small seeds and will minimize auger chatter that may produce crushing or cracking of the seeds as the auger 210 rotates about its longitudinal axis within the cylindrical segment 207 of the auger housing 203. In applications when high metering accuracy is not as necessary such as when applying larger seeds or fertilizer or other granular product, the standard auger with a larger clearance is suitable. Thus, an advantage of utilizing an auger as the metering mechanism is that all product that a grower may apply may be accomplished with one or at most two augers, whereas most commercially available metering mechanisms that utilized conventional fluted metering rolls require at least four different fluted metering rolls to cover all product applications.

Not only is the need to purchase a second auger unnecessary for most growers, resulting in significant cost savings, for those growers having a need to purchase a canola auger, the process or swapping out augers or repairing or servicing augers in the meter modules 200 is much easier and much more efficient than in conventional metering systems utilizing long fluted meter rolls. For example, switching between a standard auger and a canola auger may be performed by simply unlocking the auger locking mechanism 224 on the front of the meter module 200 as described above (i.e., by rotating the locking handle 228 from the locked position to the unlocked position to disengage the locking tabs 234 from the tab receivers 230 on the locking collar 226) and pulling the standard auger (with the locking handle 228 and turn knob 225 attached at its forward end) from the auger housing portion 203. With the standard auger removed, the rearward end of the canola auger (also having a locking handle 228 and turn knob 225 on its forward end) is slid into the auger housing portion 203 until the shaft of the canola auger is seated with the auger drive shaft 220 as previously described. The locking handle 228 on the canola auger is then locked onto the meter module 200 by turning the locking handle 228 to the locked position.

Another advantage of utilizing augers as the metering mechanism 210 in the meter modules 200 is that augers are more gentle on seeds than the fluted meter rolls used in most commercially available metering systems.

Yet another advantage of utilizing augers as the metering mechanism 210 in the meter modules 200 is that much less torque is required to turn a fully loaded auger than a fully loaded conventional fluted metering roll of the same length and diameter. Testing has shown that it requires only about 2 to 3 inch-pounds of torque to rotate the fully loaded auger 210, whereas it requires 10 to 15 inch-pounds of torque to rotate a fully loaded conventional fluted metering roll of the same length and diameter. Thus, by utilizing an auger instead of a conventional fluted metering roll, a smaller and less expensive electric motor 216, which draws less power, may be utilized in the meter module 200.

The ability to utilize small electric motors to drive augers as the metering mechanism enables the metering system to be very modularized or segmented into multiple components which are individually removable for servicing and which are individually replaceable in the event of corrosion or failure. The modularity of the modular metering system 100 reduces downtime because if one meter module corrodes or fails or requires servicing, the entire meter module 200 may simply be swapped out with a new meter module 200. This modularity offers significant cost savings over metering systems utilized on most commercially available air carts that are constructed as one long assembly. If any part of a conventional metering system constructed as one assembly corrodes, fails or needs servicing the entire metering system must be removed and either entirely replaced or repaired resulting in significant downtime and expense.

While there are several advantages to using augers as the metering mechanism 210, there may be advantages to using the fluted metering rolls similar in construction to those used in the metering systems of other commercially available air carts, including, for example, Deere 1900, 1910, or 1990 air cart seeders; CNH Precision Air 2355, 3445, 4465, 3555, or 4585 air cart seeders; or Morris Industries 9 Series, 9s Series, or CX8105 air cart seeders. Thus, although augers may be preferred, it should be understood that fluted metering rolls or other types of metering mechanisms are not excluded from the modular metering system 100 and meter modules 200. It should be appreciated that if the fluted metering roll is used, the fluted metering roll may be disposed in the metering mechanism housing portion 203 to rotate about a longitudinal axis generally parallel with the forward direction of travel 11 of the air cart 10 in the same manner as the auger shown in the meter module embodiments 200A, 200B, 200C. However, because the fluted metering rolls do not auger product from one end to the other, the top opening 204 would need to be configured and position to feed the fluted metering roll along its length and the outlet 206 may be located below the fluted metering roll instead of at the rearward end of the meter housing 203. In such embodiments, the flip gate 240 may be eliminated.

Control System

Figure 3:
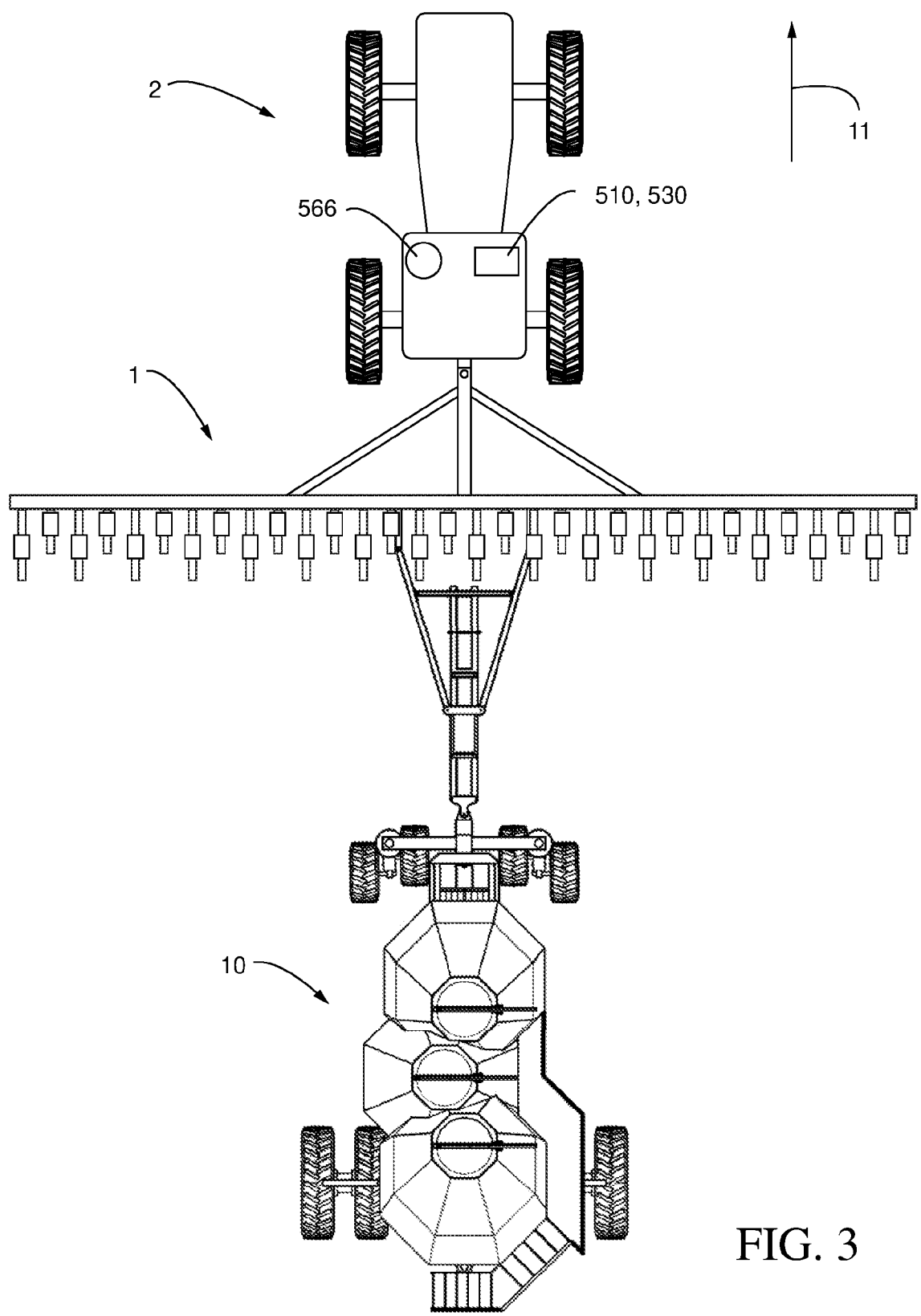
FIG. 3 is a top plan view of the air cart of FIG. 1 shown attached to an applicator implement drawn by a tractor.
Figure 32:
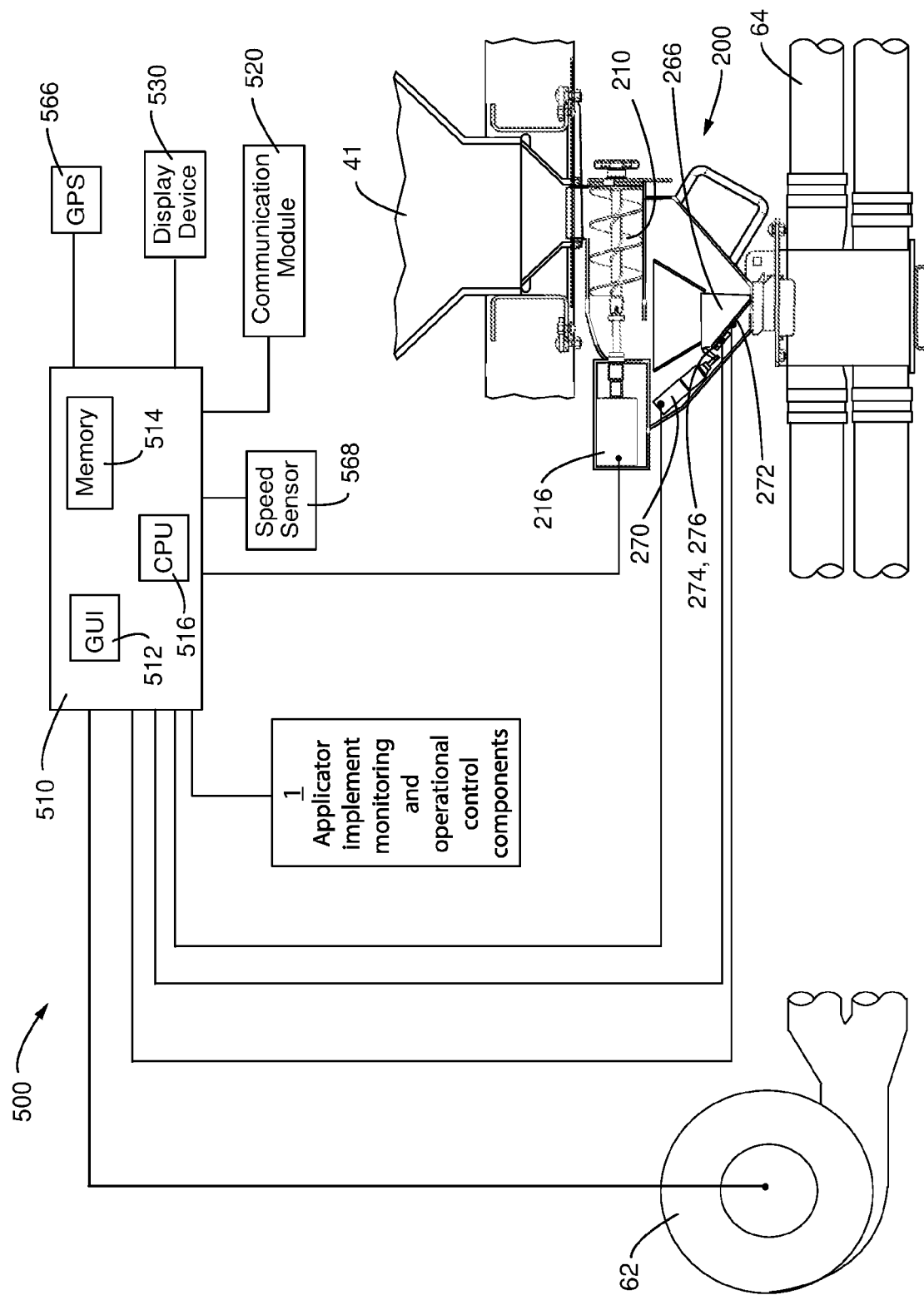
FIG. 32 is a schematic illustration of the controller in signal communication with various components of the modular metering system and applicator implement.
Figure 33:
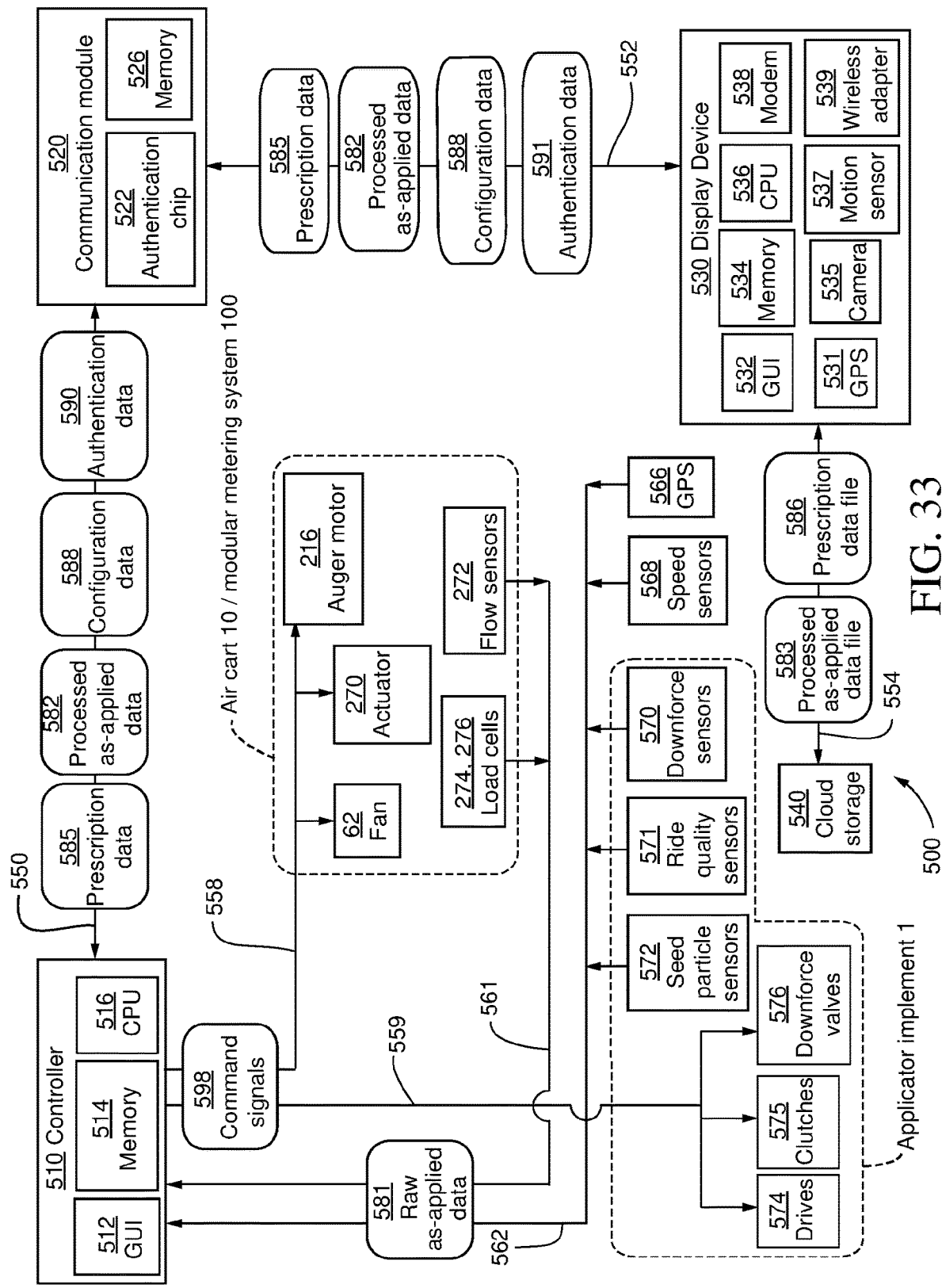
FIG. 33 is an embodiment of a diagram of the control system for the modular metering system.

Referring to FIGS. 3, 32 and 33, the control system 500 includes a controller 510, such as the 20/20 monitor available from Precision Planting LLC, 23207 Townline Road, Tremont, IL 61568. As previously identified, the controller 510 may be in signal communication with a communication module 520, a display device 530, a global position system (GPS) 566 and a speed sensor 568 associated with the tractor 2 or applicator implement 1. The GPS 566 provides the controller 510 with a real time georeferenced location of the applicator implement 1 and tractor 2 within a field during field operations. The speed sensor 568 provides a speed of the applicator implement 1 or the tractor 2. The speed sensor may be the tractors speedometer or a separate speed sensor disposed on the applicator implement 1 or tractor 2. The display device 530 and controller 510 may be mounted in the cab of the tractor 2 (FIG. 3) for viewing and interacting by the operator during configuration and during field operations. The controller 510 may also be in signal communication with the components of the metering system 100, including the fan 62 and each of the meter modules 200, including each of their respective product flow sensors 272 (or other flow sensors discussed above), load cells 274, 276, chute actuators 270, and auger drive motors 216. The controller 510 may also be in signal communication with the various components of the applicator implement 1 as discussed below.

FIG. 33 is a schematic illustration of an embodiment of the control system 500. The controller 510 may include a graphical user interface (GUI) 512, memory 514 and a central processing unit CPU 516. The controller 510 may be in signal communication with the communication module 520 via a harness 550. The communication module 520 may include an authentication chip 522 and memory 526. The communication module 520 may be in signal communication with the display device 530 via a harness 552. The display device 530 may include a GUI 532, memory 534, a CPU 536 and may connect to a cloud-based storage server 540 via a wireless Internet connection 554. One such wireless Internet connection 554 may comprise a cellular modem 538. Alternatively, the wireless Internet connection 554 may comprise a wireless adapter 539 for establishing an Internet connection via a wireless router.

The display device 530 may be a consumer computing device or other multi-function computing device. The display device 530 may include general purpose software including an Internet browser. The display device 530 may include a motion sensor 537, such as a gyroscope or accelerometer, and may use a signal generated by the motion sensor 537 to determine a desired modification of the GUI 532. The display device 530 may also include a digital camera 535 whereby pictures taken with the camera 535 may be associated with a GPS position, stored in the memory 534 and transferred to the cloud storage server 540. The display device 530 may also include a GPS receiver 531.

Figure 34:
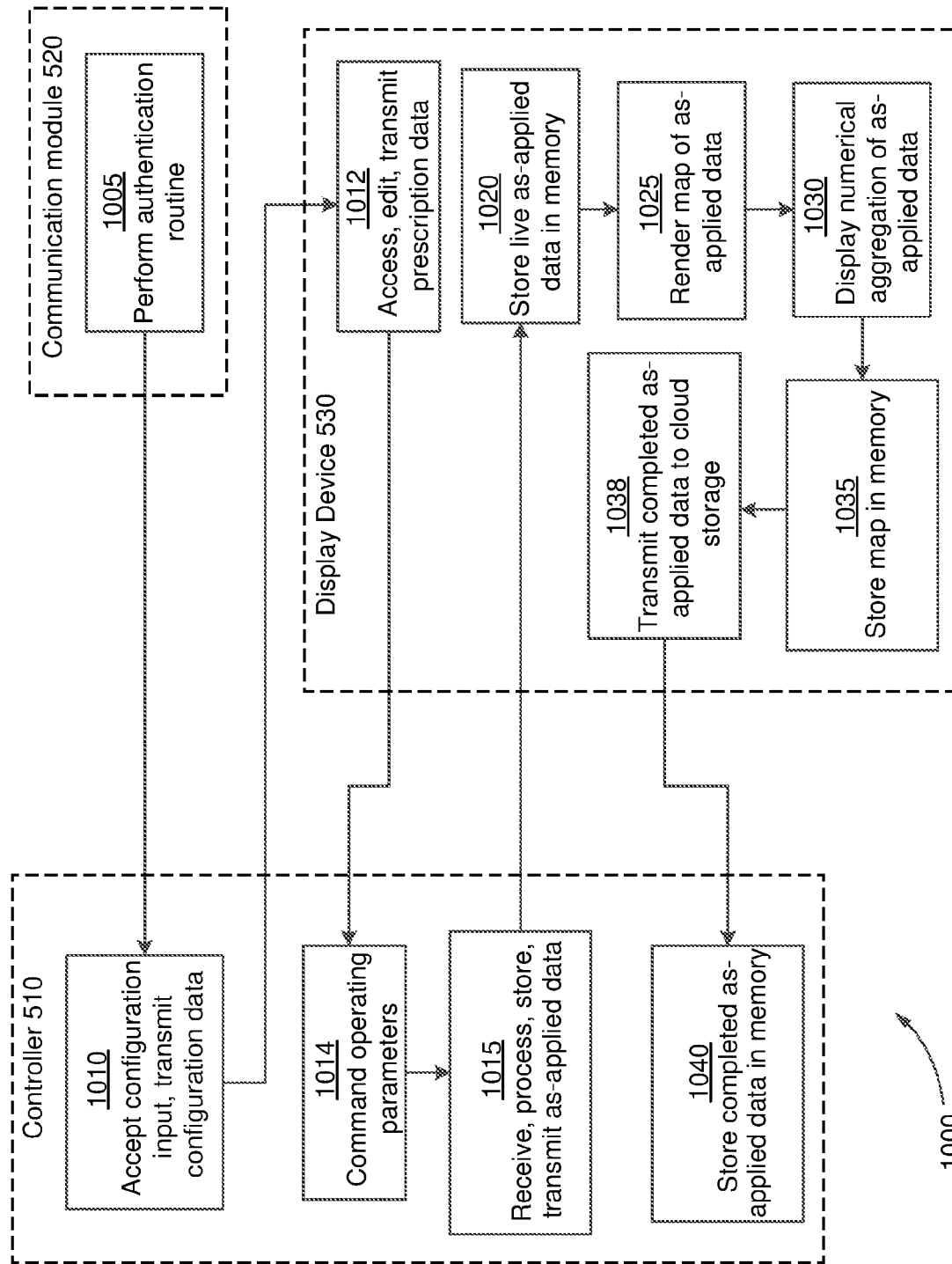
FIG. 34 is a diagram of a process for setting up and controlling the modular metering system and for storing and mapping operational data.

In operation, referring to FIG. 33 in combination with FIG. 34, the control system 500 may carry out a process designated generally by reference numeral 1000. At step 1005, the communication module 520 may perform an authentication routine in which the communication module 520 receives a first set of authentication data 590 from the controller device 510 and the authentication chip 522 may compare the authentication data 590 to a key, token or code stored in the memory 526 of the communication module 520 or which is transmitted from the display device 530. If the authentication data 590 is correct, the communication module 520 may transmit a second set of authentication data 591 to the display device 530 such that the display device 530 permits transfer of other data between the controller 510 and the display device 530 via the communication module 520.

At step 1010, the controller 510 accepts configuration input entered by the operator via the GUI 512. In some embodiments, the GUI 512 may be omitted and configuration input may be entered by the operator via the GUI 532 of the display device 530. The configuration input may comprise parameters including the number of row units of the applicator implement 1, the row unit spacing, dimensional offsets between the GPS receiver 566 and the row units of the applicator implement 1, the number of meter modules 200 in each metering bank 110, the number of metering banks 110, the amount and type of product in each tank 40 associated with each metering bank 110, the time from meter module 200 to the time seed reaches the seed trench (such as is described in PCT Publication No. WO2012/015957), etc. The controller 510 is configured to transmit the resulting configuration data 588 to the display device 530 via the communication module 520.

At step 1012, the display device 530 may access prescription data files 586 from the cloud storage server 540. The prescription data files 586 may include a file (e.g., a shape file) containing geographic boundaries (e.g., a field boundary) and relating geographic locations (e.g., GPS coordinates) to operating parameters (e.g., product application rates). The display device 530 may allow the operator to edit the prescription data file 586 using the GUI 532. The display device 530 may reconfigure the prescription data file 586 for use by the controller 510 and may transmit the resulting prescription data 585 to the controller 510 via the communication module 520.

At step 1014, while traversing the field with the air cart 10 and applicator implement 1 during field application operations, the controller 510 may send command signals 598 via harness 558 to the components of the air cart 10 providing operational control, including to the fan 62, the chute actuators 270 and auger drive motor 216. These command signals 598 may include signals for engaging and disengaging the fan 62, for setting the speed or air flow of the fan 62, to actuate the actuators 270 to move the capture structure 266 between the dump position and the capture position, for engaging and disengaging rotation of the auger drive motors 216, and for varying the speed of rotation of the auger drive motors 216. The controller 510 may also send command signals 598 via harness 559 to the components of the applicator implement 1 providing operational control, including to the various drives 574, clutches 575, downforce valves/actuators 576 and any other components of the applicator implement providing operational control.

At step 1015, as the applicator implement 1 traverses the field, the controller 510 receives raw as-applied data 581 from the modular metering system 100 and air cart 10 via harness 561 and from the applicator implement 1 via harness 562. The raw as-applied data 581 from the modular metering system 100 and air cart 10 may include signals from the flow sensors 272 (or other flow sensors as described herein), the load cells 274, 276 and any other monitored components of the modular metering system 100 and air cart 10. The raw as-applied data 581 from the applicator implement 1, may include signals from downforce sensors 570, ride quality sensors 571, seed or particle sensors 572 or any other monitored components of the applicator implement 1. In addition, the raw as applied data 581 may include signals from the GPS 566 and speed sensors 568 associated with the applicator implement 1 or the tractor 2. The controller 510 processes the raw as-applied data 581, and stores the as-applied data to the memory 514. The controller 510 may transmit the processed as-applied data 582 to the display device 530 via the communication module 520. The processed as-applied data 582 may be streaming, piecewise, or partial data. It should be appreciated that according to the method 1000, control of the modular metering system 100 and air cart 10, and the applicator implement 1 and data storage are performed by the controller 510 such that if the display device 530 stops functioning, is removed from the control system 500, or is used for other functions, the operation of the modular metering system 100 and air cart 10, the implement 1 and essential data storage are not interrupted.

At step 1020, the display device 530 receives and stores the live processed as-applied data 582 in the memory 534. At step 1025, the display device 530 may render a map of the processed as-applied data 582 (e.g., an application rate map) as described below. At step 1030, the display device 530 may display a numerical aggregation of as-applied data (e.g., pounds of product applied over the last 5 seconds). At step 1035, the display device 530 may store the location, size and other display characteristics of the application map images rendered at step 1025 in the memory 534. At step 1038, after completing application operations, the display device 530 may transmit the processed as-applied data file 583 to the cloud storage server 540. The processed as-applied data file 583 may be a complete file (e.g., a data file). At step 1040 the controller 510 may store completed as-applied data (e.g., in a data file) in the memory 514. The method of mapping and displaying the as applied data 582 may be the same or similar to the as-applied data maps disclosed in U.S. Pat. No. 9,699,958.

Calibration

Figure 35:
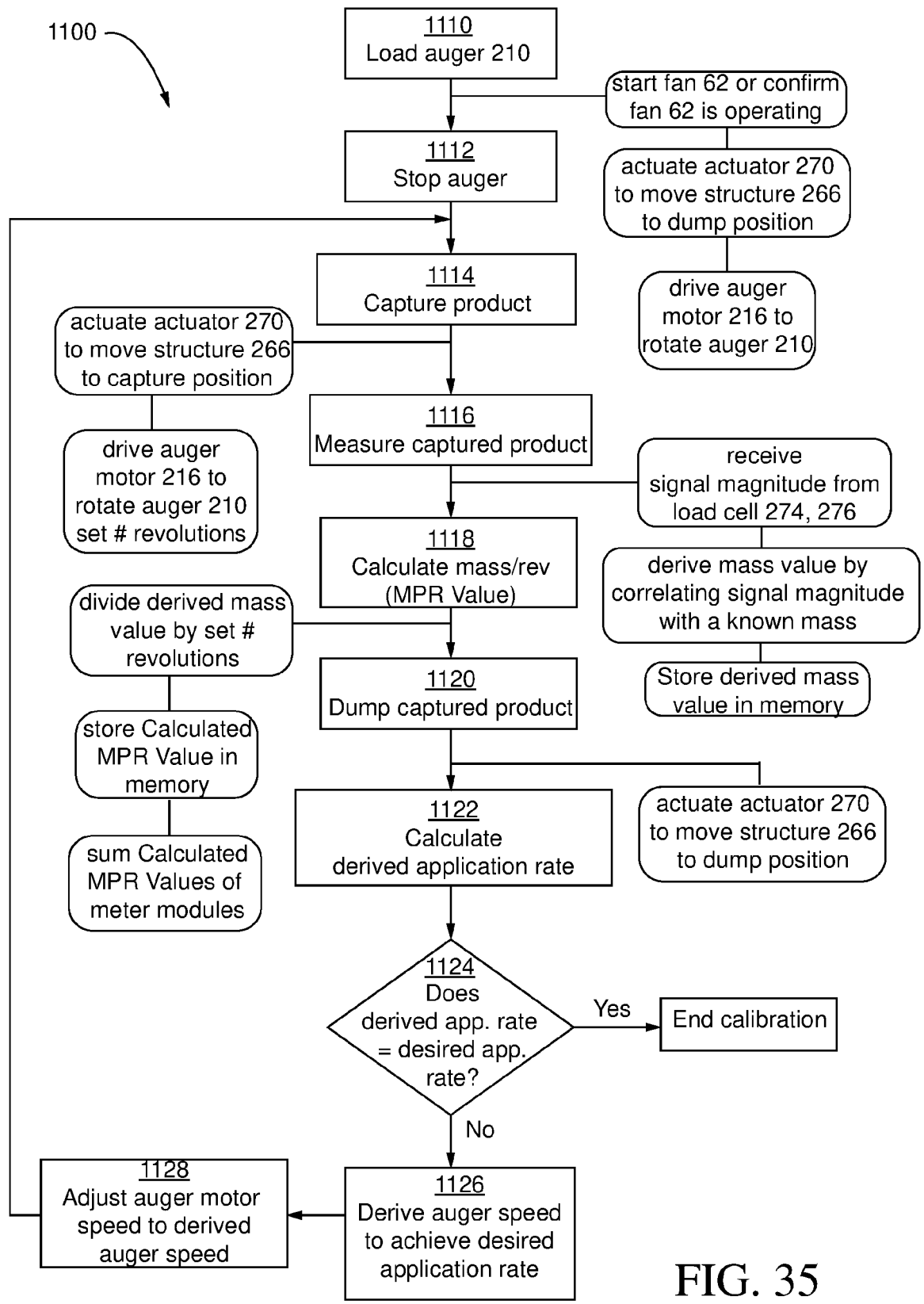
FIG. 35 is a flow chart of a process for calibrating the modular metering system.

Referring to FIG. 35, the control system 500 may carry out a process designated generally by reference numeral 1100. After ensuring that the slide gates 160 are in the open position such that product flows from the tank 40 through the tank funnel 150 and into the upper opening 204 of the meter modules 200, the operator initiates the "load auger" step 1110 to load or fill the flights 212 of the augers 210 of each metering bank 110 in preparation for the subsequent calibration steps. The load auger step 1110 may be initiated by the operator selecting a load auger selection displayed on the GUI 532 of the display device or on the GUI 512 of the controller 510. Upon initiating the load auger step 1110, the controller 510 commands the fan 62 to operate at a predetermined speed to produce a predetermined air flow or controller 510 determines whether fan 62 is operating (fan 62 can be operated by a controller on the tractor, in which fan 62 is controlled by the tractor's hydraulic circuit. The controller 510 also commands the actuators 270 to move the capture structure 266 to the dump position so that any product augured by the augers 210 while charging will flow out the bottom opening 208 of the meter module, through the corresponding diverter gate module 400 and into the corresponding air tube module 300 before being carried away by the air flow through the air tubes 64 and into the distribution lines of the applicator implement 1. The controller 510 also commands the auger drive motors 216 to rotate for a predetermined time period or predetermined number of auger rotations to ensure that the length of the augers 210 are filled with product.

Upon the auger 210 being fully loaded with product, the "stop auger" step 1112 is triggered to stop the auger motor 216 and auger 210 from rotating. In one embodiment, the stop auger step 1112 may be automatically triggered upon the flow sensors 272 generating signals indicating that each auger rotation is discharging a consistent flow of product. Alternatively, the operator may trigger the stop auger step 1112 by selecting a stop auger selection displayed on the GUI 532 or 512. Once the augers 210 are fully loaded, and the stop auger step 1112 has been triggered, the "product capture" step 1114 is initiated. The product capture step 1114 may be initiated automatically by the controller 510 after completing the stop auger step 1112 or the operator may initiate the product capture step 1114 by selecting a product capture selection displayed on the GUI 532 of the display device or on the GUI 512 of the controller 510.

In the product capture step 1114, the fan 62 continues to operate at the predetermined speed, the controller 510 commands the actuators 270 to move the capture structure 266 to the capture position to close off the open bottom end of the upper funnel structure 265. Once the capture structure 266 is in the capture position, the controller 510 commands the auger drive motor 216 to rotate the auger a predetermined number of revolutions (e.g., one complete revolution) at a default or predetermined auger speed. In one embodiment the predetermined number or revolutions may be a single revolution since only a nominal amount of product is needed to obtain an accurate measurement using the load cells 274, 276 (e.g., 1 pound or 454 grams by weight which may be approximately 4 cups or one liter by volume of the product). The product captured is then measured at the "measure" step 1116. The product capture step 1116 may be initiated automatically by the controller 510 after the predetermined number of revolutions or the operator may initiate the measure step 1116 by selecting a measure selection displayed on the GUI 532 of the display device or on the GUI 512 of the controller 510.

In the measure step 1116, the signal magnitude generated by the load cell 274, 276 may be correlated with a known mass value via a look-up table to obtain a derived mass value. The derived mass value is stored in memory 514 After completing the measure step 1116, the "mass per revolution calculation" step 1118 is initiated. The mass per revolution calculation step 1118 may be initiated automatically by the controller 510 after completing measure step 1116 or the operator may initiate the mass per revolution calculation step 1118 by selecting a mass per revolution calculation selection displayed on the GUI 532 of the display device or on the GUI 512 of the controller 510.

In the mass per revolution calculation step 1118, it is assumed that the product in the tank 40 is flowing freely into the upper opening 204 of the meter module 200 being calibrated. Thus, once the auger 210 has been fully loaded, the volume and mass of the product carried by each flight 212 of the auger 210 will be substantially the same and therefore each revolution of the auger 210 will meter substantially the same mass or volume of product. Thus, the mass per revolution may be calculated by dividing the derived mass value from step 1116 by the number of predetermined auger revolutions (e.g., one full revolution). The resulting mass per auger revolution value ("MPR Value") may be displayed to the operator on the GUI 532 or 512 and stored in memory 514. At any time after the measure sample step 1116 is completed, the "dump" step 1120 may be initiated. The dump step 1120 may be performed automatically upon completion of the measure step 1116 or mass per revolution calculation step 1118 or the operator may initiate the dump step 1120 by selecting a dump selection displayed on the GUI 532 of the display device or on the GUI 512 of the controller 510. In the dump step 1120, the controller 510 may command the actuator 270 to actuate to move the capture structure 266 to the dump position to dump or release the captured product through the bottom opening 208.

After calculating the MPR Value at step 1118, the MPR Value is used to derive the application rate at step 1122. It should also be appreciated that the MPR Value is for one meter module 200. Thus, the MPR Values across all meter modules 200 in the metering bank 110 metering the same product (which in this example is assumed to be all of the meter modules 200 within a metering bank 110) may be summed or the MPR Value from one meter module 200 may be multiplied by the number of meter modules within the meter bank 110 metering the same product to determine the total mass of the product metered in one auger revolution of each of the meter modules 200 of a metering bank 110. The MPR Value sum may be used to derive an application rate based on the following equation:

$$AR = \frac{\left(\sum MPR \text{ Values}\right) \times AS}{GS \times W} \times C$$

Where:
AS=Auger speed (revolutions per minute)
AR=application rate (lbs/acre) or (kg/hectare)
C=conversion factor
    for imperial units C=495 (i.e., 60 min/hour×43560 ft$^2$/acre÷5280 ft/mile) for SI units C=600 (i.e., 60 min/hour×10,000 m$^2$/hectare÷1000 m/km)
ΣMPR Values=sum of MPR Values from step 1118 (lbs/rev) or (kg/rev)

GS=ground speed of applicator implement (miles/hour) or (km/hr)

W=width of applicator implement (ft) or (m)

The auger speed (AS) is known from the predetermined or preset speed under step 1114. The width (W) of the applicator implement 1 is known and may have been previously input by the operator and stored in memory 114 during the during the configuration stage (step 1010 of FIG. 34). A ground speed of the applicator implement (GS) may be assumed by the operator and may have been previously input by the operator stored in memory during the configuration stage (step 1010 of FIG. 34). Thus, with all the variables retrieved from memory, the application rate may be derived using the above equation (the "Derived AR"). The Derived AR may then be compared at step 1124 to the desired application rate retrieved from memory and input during the configuration stage (e.g., based on a prescription map).

If the Derived AR matches the desired application rate (within a predetermined acceptable tolerance), no adjustment to the speed of the electric motor 216 (and thus the auger 210 coupled thereto) is necessary and the calibration process 1100 may be ended. If the Derived AR does not match the desired application rate (within a predetermined acceptable tolerance) the speed of the electric motor 216 (and thus the auger 210 coupled thereto) may be increased or decreased to achieve the desired application rate. At step 1126, the auger speed required to achieve the desired application may be derived based on the same equation above, but this time solving for auger speed (AS) rather than application rate (AR) as represented below.

$$AS = \frac{(AR \times W)}{\left(\sum MPR \text{ Values}\right) \times GS \times C}$$

The controller 510 may be programmed with the above equation to automatically calculate or derive the auger speed to achieve the desired application rate using the sum of the MPR Values from step 1118 retrieved from memory and the desired application rate (AR), the ground speed (GS) and applicator implement width (W) input during the configuration state (step 1010 of FIG. 34) and retrieved from memory 114. At step 1128, once the derived auger speed is calculated at step 1126, the controller may be programmed to automatically set the auger motor speed to achieve the derived auger speed. Alternatively, the controller may display the derived auger speed to the operator on the display device 530 and the operator may set the auger motor speed to match the derived auger speed via the GUI 532 or 512.

After adjusting the auger motor speed at step 1128, a second calibration cycle may be repeated by selecting a verify calibration selection via the GUI 532 or 512. The verify calibration process may begin at step 1114 because it should be appreciated that auger 210 will already be fully loaded with product from the initial calibration cycle so the load auger step 1110 is not necessary. Likewise, the stop auger step 1112 is not necessary when performing the calibration verification process because the auger 210 was previously stopped after completing step 1114 in the initial calibration cycle (i.e., after the present number of auger revolutions was completed).

Once the modular metering system is calibrated, the controller 510 may automatically adjust the rotational speed of the auger motor 216 based on the above or similar equations to match the desired application rate as the ground speed of the applicator implement 1 varies or as the applicator implement 1 passes over prescription map boundaries having different application rates. For example, it should also be appreciated that because each meter module 200 has its own auger 210 and auger motor 216, each meter module 200 or group of meter modules 200 may be associated with one or more row units on the applicator implement 1. Thus, if the applicator implement 1 turns within a field resulting in the outermost row units away from the direction of the turn traveling at a greater ground speed than the innermost row units toward the direction of the turn, the controller 510 may command the auger motors 216 of the meter modules 200 associated with the outermost row units to rotate at a greater speed so as to meter more product to maintain an adequate supply of product through the distribution lines feeding the outermost row units that will require more product to maintain the desired application rate at their greater speed. Likewise, the controller 510 may command the auger motors 216 of the meter modules associated with the innermost row units to rotate at a slower speed to meter less product so as to not overload the distribution lines feeding the innermost row units that will require less product to maintain the desired application rate at their slower speed. Similarly, as different row units across the width of the applicator implement 1 pass over prescription map boundaries within a field having different application rates, the controller 510 may command the auger motors 216 of the meter modules 200 associated with the respective row units to increase or decrease in speed to ensure the amount of product being metered into the distribution lines is adequate without starving or overloading the distribution lines feeding the different row units applying product at differing application rates.

It should also be appreciated that one advantage of the modular metering system 100 and the calibration system and process 1100 described above and utilizing the automated capture structure 266, load cells 274, 276 and a single or minimal number of auger revolutions, is that it produces a sample of product for calibration purposes that is very small (approximately 1 pound or 454 grams by weight or 4 cups by volume) while still producing accurate measurements for the calibration. This small sample size is easily dispensed and distributed through the air tubes 64 and distribution lines of the applicator implement without concern of overfilling the distribution lines. This is a significant advantage over current commercially available air carts which produce collection samples in excess of 20 pounds of product which must be collected in collection bags that are physically attached to the metering systems, then removed, weighed, and dumped back into the tanks of the air carts as described in the Background above.

It should also be appreciated that the entire calibration process 1100 described above is performed by the operator from the cab of the tractor by simply selecting the calibration selection via the GUI 532 of the Display Device 530 or the GUI 512 of the controller 510 to initiate the steps of the calibration process. Thus, the calibration process 1100 for the modular metering system 100 is much quicker, more efficient and requires no physical effort, unlike calibration processes for other air carts on the market, which require multiple manual and physical steps as described in the Background section of this disclosure.

Figure 36:
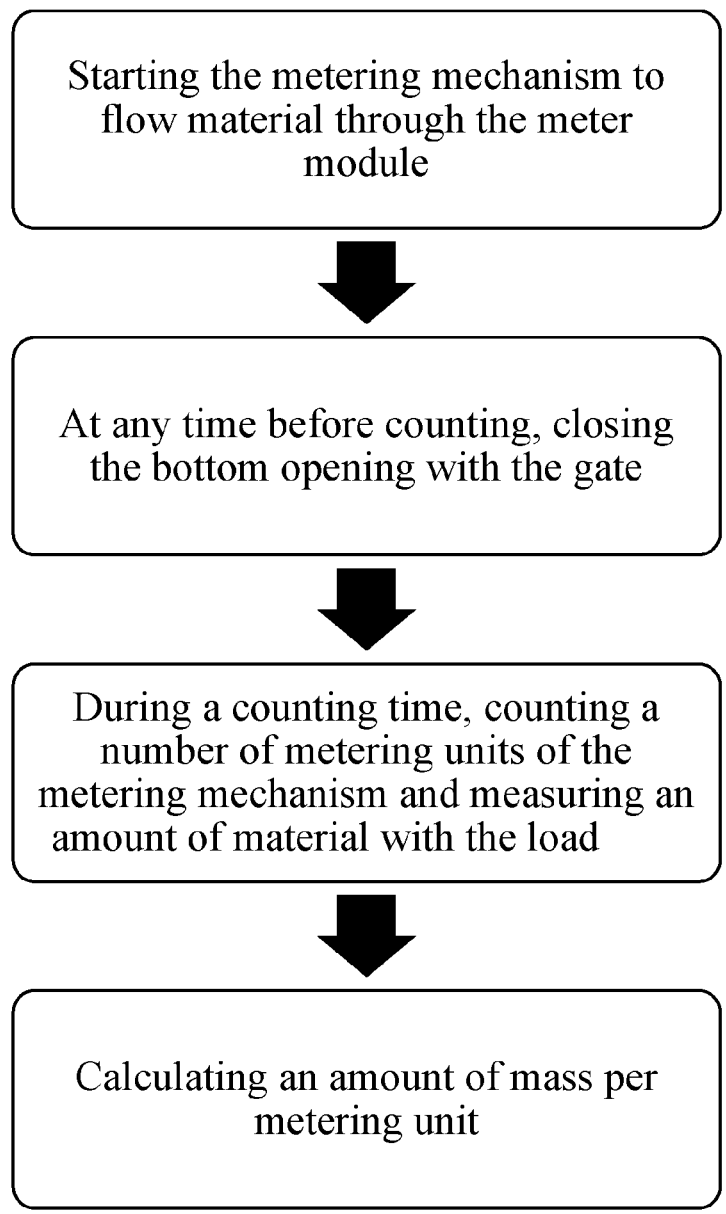
FIG. 36 is a flow chart of a process for calibrating the modular metering system.

In another calibration method, the meter module 200 can be closed by bottom plate 264 to close bottom opening 208. Metering mechanism 210 is started to allow material to flow through meter module 200. Bottom plate 264 can be closed after a steady state of flow into meter module 200 is obtained. This can be with bottom plate 264 open or closed while steady state is reached. Bottom plate 264 only needs to be closed before counting starts. During a counting time, the number of metering units of the metering mechanism 210 are counted. In the case where the metering mechanism is an auger, the number of revolutions is counted. If the metering mechanism 210 is another structure, it is the number of units. For example, if metering mechanism 210 is a wheel, it is the number of revolutions of the wheel. While counting the metering units, load cell 274 on bottom plate 264 measures a starting mass and an ending mass for material accumulating on bottom plate 264. Alternatively, internal structure 260 with load cell 276 is used to capture material, and load cell 276 measures a starting mass and an ending mass of material in internal structure 260. The mass per measuring unit is then calculated by dividing the mass by the number of metering units. This process is illustrated in FIG. 36.

EXAMPLES

The following are non-limiting examples.

Example 1—An air cart for delivering product to an applicator implement, the air cart having a forward direction of travel, the air cart comprising: a wheeled frame supporting a tank containing the product; an air system supported by the wheeled frame, the air system including a fan, an air tube bank and a plurality of air tubes, the air tube bank including a plurality of air tube modules disposed laterally adjacent to one another, each air tube module in communication with at least one of the plurality of air tubes; a modular metering system including a metering bank disposed below the tank and above the air tube bank, the metering bank including a plurality of meter modules disposed laterally adjacent to one another, each of the plurality of meter modules including: a main housing having a meter housing portion and a lower chamber portion, the meter housing portion having a top opening through which the product from the tank enters the main housing, the meter housing portion including an outlet in communication with the lower chamber portion, the lower chamber portion having a bottom opening, the bottom opening in communication with a corresponding one of the air tube modules; a metering mechanism rotatably disposed within the meter housing portion, the metering mechanism rotatable about a longitudinal axis disposed substantially parallel to the forward direction of travel; an electric motor operably coupled to rotate the metering mechanism about the longitudinal axis; a control system having a controller, the controller in signal communication with the electric motor and the fan; whereby as the metering mechanism rotates about the longitudinal axis, the metering mechanism meters the product into the lower chamber portion, the metered product exits the lower chamber portion through the bottom opening into a corresponding one of the air tube modules, the fan blows the metered product through the at least one air tube in communication with the corresponding one of the air tube modules.

Example 2—the air cart of Example 1, wherein each of the plurality of meter modules is individually removable from the metering bank.

Example 3—the air cart of Example 1, wherein the metering mechanism is removable from one end of the meter housing portion.

Example 4—the air cart of Example 1, wherein the metering bank includes a plurality of slide gates, each of the plurality of slide gates is disposed above the top opening of a corresponding one of the plurality of meter modules, each of the plurality of slide gates is movable between a closed position and an open position, wherein in the closed position the slide gate prevents the product from flowing into from the tank into the top opening of the corresponding one of the plurality of meter modules and in the open position the slide gate permits the product to flow from the tank into the top opening of the corresponding one of the plurality of meter modules.

Example 5—the air cart of Example 1, wherein the metering mechanism is an auger, the auger having an auger shaft, the auger shaft coaxial with the longitudinal axis, the auger having auger flights winding around the auger shaft, the auger flights oriented on the auger shaft to push the product entering the top opening toward the outlet as the auger rotates about the longitudinal axis.

Example 6—the air cart of Example 5, wherein each of the plurality of meter modules further includes: a flip gate pivotally disposed in the meter housing portion between an end of the auger flights and the outlet, the flip gate pivotally movable between a down position and an up position, whereby in the down position the flip gate is angled downwardly permitting the metered product to pass through the outlet into the lower chamber portion, and whereby in the up position, the flip gate is angled upwardly to prevent the product within the auger housing from passing through the outlet into the lower chamber.

Example 7—the air cart of Example 6, wherein the flip gate is coupled to the auger shaft by a linkage, such that reverse rotation of the auger shaft causes the flip gate to move from the down position to the up position.

Example 8—the air cart of Example 1, wherein the lower chamber portion of each of the plurality of meter module includes internal structure to direct the metered product through the lower chamber portion toward the bottom opening.

Example 9—the air cart of Example 8, wherein the internal structure includes a funnel structure having an open bottom end.

Example 10—the air cart of Example 9, wherein the internal structure further includes a capture structure.

Example 11—the air cart of Example 10, wherein the capture structure is movable between a dump position and a capture position, wherein in the dump position the capture structure directs the metered product toward the bottom opening, and wherein in the capture position, the capture structure closes off the open bottom end of the funnel structure so as to capture the metered product.

Example 12—the air cart of Example 11, wherein each of the plurality of meter modules further includes an actuator, the actuator configured to move the capture structure between the dump position and the capture position.

Example 13—the air cart of Example 11, wherein each of the plurality of meter modules further includes a load cell configured to weigh the metered product captured by the capture structure in the capture position.

Example 14—the air cart of Example 12, wherein the load cell is disposed on a bottom plate of the capture structure.

Example 15—the air cart of Example 13, wherein the load cell supports the funnel structure.

Example 16—the air cart of Example 1, wherein each of the plurality of meter modules further includes: a flow sensor disposed within the lower chamber portion, the flow sensor in signal communication with the controller, the flow sensor configured to generate a signal indicative of the metered product passing through the lower chamber portion before exiting through the bottom opening.

Example 17—the air cart of Example 12, wherein each of the plurality of meter modules further includes: a flow sensor disposed within the lower chamber portion, the flow sensor in signal communication with the controller, the flow sensor configured to generate a signal indicative of the metered product passing through the lower chamber portion before exiting through the bottom opening.

Example 18—the air cart of Example 16, wherein the flow sensor is selected from the group consisting of: optical sensors, piezoelectric sensors, microphone sensors, electromagnetic energy sensors, or particle sensors.

Example 19—the air cart of Example 17, wherein the flow sensor includes an instrumented bottom plate of the capture structure, whereby the instrumented plate detects whether product is flowing over an upper surface of the instrumented plate in the dump position.

Example 20—the air cart of Example 1, wherein each of the plurality of air tube modules includes an upper air tube coupler and a lower air tube coupler, the upper air tube coupler including a center passage and outer passages, the center passage in communication with a first one of the plurality of air tubes, the outer passages in communication with the lower air tube coupler, the lower air tube coupler in communication with a second one of the plurality of air tubes disposed below the first one of the plurality of air tubes.

Example 21—the air cart of Example 20, wherein the metering bank further includes: a diverter gate module disposed between the bottom opening of each meter module and the corresponding one of the plurality of air tube modules, the diverter gate module including diverter gates movable between a first position and a second position, wherein in the first position, the diverter gates close the center passage of the upper air tube coupler and the outer passages of the upper air tube coupler are open to allow the metered product to flow into to the lower air tube coupler, and wherein in the second position, the diverter gates close the outer passages of the upper air tube coupler and the center passage of the upper air tube coupler is open to allow the metered product to flow into the upper air tube coupler.

Example 22—the air cart of Example 21, wherein the diverter gates are moved between the first position and the second position by a diverter gate actuator.

Example 23—A modular metering system for metering product, the modular metering system comprising: a plurality of meter modules disposed laterally adjacent to one another in a metering bank, each of the plurality of meter modules including: a main housing having a meter housing portion and a lower chamber portion, the meter housing portion having a top opening through which the product from the tank enters the main housing, the meter housing portion including an outlet in communication with the lower chamber portion, the lower chamber portion having a bottom opening, the bottom opening in communication with a corresponding one of the air tube modules; a metering mechanism rotatably disposed within the meter housing portion, the metering mechanism rotatable about a longitudinal axis; an electric motor operably coupled to rotate the metering mechanism about the longitudinal axis; whereby as the metering mechanism rotates about the longitudinal axis, the metering mechanism meters the product into the lower chamber portion, the metered product exits the lower chamber portion through the bottom opening.

Example 24—the modular metering system of Example 23, wherein each of the plurality of meter modules is individually removable from the metering bank.

Example 25—the modular metering system of Example 23, wherein the metering mechanism is removable from one end of the meter housing portion.

Example 26—the modular metering system of Example 23, wherein the metering bank includes a plurality of slide gates, each of the plurality of slide gates is disposed above the top opening of a corresponding one of the plurality of meter modules, each of the plurality of slide gates is movable between a closed position and an open position, wherein in the closed position the slide gate prevents the product from flowing into the top opening of the corresponding one of the plurality of meter modules and in the open position the slide gate permits the product to flow into the top opening of the corresponding one of the plurality of meter modules.

Example 27—the modular metering system of Example 23, wherein the metering mechanism is an auger, the auger having an auger shaft, the auger shaft coaxial with the longitudinal axis, the auger having auger flights winding around the auger shaft, the auger flights oriented on the auger shaft to push the product entering the top opening toward the outlet as the auger rotates about the longitudinal axis.

Example 28—the modular metering system of Example 27, wherein each of the plurality of meter modules further includes: a flip gate pivotally disposed in the meter housing portion between an end of the auger flights and the outlet, the flip gate pivotally movable between a down position and an up position, whereby in the down position the flip gate is angled downwardly permitting the metered product to pass through the outlet into the lower chamber portion, and whereby in the up position, the flip gate is angled upwardly to prevent the product within the auger housing from passing through the outlet into the lower chamber.

Example 29—the modular metering system of Example 28, wherein the flip gate is coupled to the auger shaft by a linkage, such that reverse rotation of the auger shaft causes the flip gate to move from the down position to the up position.

Example 30—the modular metering system of Example 23, wherein the lower chamber portion of each of the plurality of meter module includes internal structure to direct the metered product through the lower chamber portion toward the bottom opening.

Example 31—the modular metering system of Example 30, wherein the internal structure includes a funnel structure having an open bottom end.

Example 32—the modular metering system of Example 31, wherein the internal structure further includes a capture structure.

Example 33—the modular metering system of Example 32, wherein the capture structure is movable between a dump position and a capture position, wherein in the dump position the capture structure directs the metered product toward the bottom opening, and wherein in the capture position, the capture structure closes off the open bottom end of the funnel structure so as to capture the metered product.

Example 34—the modular metering system of Example 33, wherein each of the plurality of meter modules further includes an actuator, the actuator configured to move the capture structure between the dump position and the capture position.

Example 35—the modular metering system of Example 34, wherein each of the plurality of meter modules further includes a load cell configured to weigh the metered product captured by the capture structure in the capture position.

Example 36—the modular metering system of Example 35, wherein the load cell is disposed on a bottom plate of the capture structure.

Example 37—the modular metering system of Example 36, wherein the load cell supports the funnel structure.

Example 38—the modular metering system of Example 23, wherein each of the plurality of meter modules further includes: a flow sensor disposed within the lower chamber portion, the flow sensor configured to generate a signal indicative of the metered product passing through the lower chamber portion before exiting through the bottom opening.

Example 39—the modular metering system of Example 34, wherein each of the plurality of meter modules further includes: a flow sensor disposed within the lower chamber portion, the flow sensor configured to generate a signal indicative of the metered product passing through the lower chamber portion before exiting through the bottom opening.

Example 40—the modular metering system of Example 38, wherein the flow sensor is selected from the group consisting of: optical sensors, piezoelectric sensors, microphone sensors, electromagnetic energy sensors, or particle sensors.

Example 41—the modular metering system of Example 39, wherein the flow sensor includes an instrumented bottom plate of the capture structure, whereby the instrumented plate detects whether product is flowing over an upper surface of the instrumented plate in the dump position.

Example 42—the modular metering system of Example 23, wherein the metering bank further includes: a diverter gate module disposed below the bottom opening of each meter module, the diverter gate module including diverter gates movable between a first position and a second position, wherein in the first position, the diverter gates direct the metered product outwardly, and wherein in the second position, the diverter gates direct the product inwardly.

Example 43—the modular metering system of Example 42, wherein the diverter gates are moved between the first position and the second position by a diverter gate actuator.

Example 44—A meter module for metering a product, the meter module comprising: a main housing having a meter housing portion and a lower chamber portion, the meter housing portion having a top opening through which the product from the tank enters the main housing, the meter housing portion including an outlet in communication with the lower chamber portion, the lower chamber portion having a bottom opening, the bottom opening in communication with a corresponding one of the air tube modules; a metering mechanism rotatably disposed within the meter housing portion, the metering mechanism rotatable about a longitudinal axis; an electric motor operably coupled to rotate the metering mechanism about the longitudinal axis; whereby as the metering mechanism rotates about the longitudinal axis, the metering mechanism meters the product into the lower chamber portion, the metered product exits the lower chamber portion through the bottom opening.

Example 45—the meter module of Example 44, wherein the metering mechanism is removable from one end of the meter housing portion.

Example 46—the meter module of Example 44, wherein the metering mechanism is an auger, the auger having an auger shaft, the auger shaft coaxial with the longitudinal axis, the auger having auger flights winding around the auger shaft, the auger flights oriented on the auger shaft to push the product entering the top opening toward the outlet as the auger rotates about the longitudinal axis.

Example 47—the meter module of Example 46, wherein each of the plurality of meter modules further includes: a flip gate pivotally disposed in the meter housing portion between an end of the auger flights and the outlet, the flip gate pivotally movable between a down position and an up position, whereby in the down position the flip gate is angled downwardly permitting the metered product to pass through the outlet into the lower chamber portion, and whereby in the up position, the flip gate is angled upwardly to prevent the product within the auger housing from passing through the outlet into the lower chamber.

Example 48—the meter module of Example 47, wherein the flip gate is coupled to the auger shaft by a linkage, such that reverse rotation of the auger shaft causes the flip gate to move from the down position to the up position.

Example 49—the meter module of Example 44, wherein the lower chamber portion includes internal structure to direct the metered product through the lower chamber portion toward the bottom opening.

Example 50—the meter module of Example 49, wherein the internal structure includes a funnel structure having an open bottom end.

Example 51—the meter module of Example 50, wherein the internal structure further includes a capture structure.

Example 52—the meter module of Example 51, wherein the capture structure is movable between a dump position and a capture position, wherein in the dump position the capture structure directs the metered product toward the bottom opening, and wherein in the capture position, the capture structure closes off the open bottom end of the funnel structure so as to capture the metered product.

Example 53—the meter module of Example 52, wherein each of the plurality of meter modules further includes an actuator, the actuator configured to move the capture structure between the dump position and the capture position.

Example 54—the meter module of Example 53, wherein each of the plurality of meter modules further includes a load cell configured to weigh the metered product captured by the capture structure in the capture position.

Example 55—the meter module of Example 54, wherein the load cell is disposed on a bottom plate of the capture structure.

Example 56—the meter module of Example 55, wherein the load cell supports the funnel structure.

Example 57—the meter module of Example 44, wherein each of the plurality of meter modules further includes: a flow sensor disposed within the lower chamber portion, the flow sensor configured to generate a signal indicative of the metered product passing through the lower chamber portion before exiting through the bottom opening.

Example 58—the meter module of Example 53, wherein each of the plurality of meter modules further includes: a flow sensor disposed within the lower chamber portion, the flow sensor configured to generate a signal indicative of the metered product passing through the lower chamber portion before exiting through the bottom opening.

Example 59—the meter module of Example 57, wherein the flow sensor is selected from the group consisting of: optical sensors, piezoelectric sensors, microphone sensors, electromagnetic energy sensors, or particle sensors.

Example 60—the meter module of Example 58, wherein the flow sensor includes an instrumented bottom plate of the capture structure, whereby the instrumented plate detects whether product is flowing over an upper surface of the instrumented plate in the dump position.

Example 61—A method of calibrating a plurality of meter modules in a metering bank, each of the plurality of meter modules having an auger in communication with a supply of product to metered, the auger driven by an electric motor, each of the plurality of meter modules having an actuator coupled to a capture structure, the electric motor and actuator in signal communication with a controller, the method comprising: for each of the plurality of meter modules, via the controller: generating a load auger command signal, the load auger command signal driving the electric motor to cause the auger to rotate at a predetermined rotational speed until the auger is fully loaded with the product, the load auger command signal actuating the actuator to move the sample collection structure to a dump position, whereby in the dump position the product metered by the auger is discharged through a bottom opening in the meter module; (ii) generating a stop auger command signal upon the auger being fully loaded, the stop auger command signal stopping the electric motor driving the auger; (iii) generating a capture command signal, the capture command signal actuating the actuator to cause the capture structure to move to a capture position, upon the capture structure moving to the capture position, generating a drive auger command signal to drive the electric motor at a preset rotational speed for a designated number of auger revolutions, whereby the capture structure captures the product augured by the auger during the designated number of auger revolutions, the capture structure instrumented with a load cell, the load cell generating a signal magnitude in proportion to a mass of the product captured by the capture structure while in the capture position; (iv) receiving the generated signal magnitude and correlating the generated signal magnitude with a known mass to obtain a derived mass value of the product captured by the capture structure while in the capture position; (v) calculating a mass per auger revolution (MPR) value by dividing the derived mass value by the designated number of auger revolutions; (vi) storing the MPR value in memory; (vii) generating a dump command signal, the dump command signal actuating the actuator coupled to the capture structure to cause the capture structure to move to the dump position, whereby in the dump position the product captured in the capture structure is discharged through the bottom opening in the meter module; (b) via the controller, summing the stored MPR value for each of the plurality of meter modules; (ii) calculating a derived application rate based on the MPR value sum; (iii) comparing the derived application rate to the desired application rate; (iv) determining if the derived application rate matches the desired application rate, whereby if the derived application rate does not match the desired application rate, calculating a derived auger speed based on the MPR value sum and the desired application rate; (v) adjusting the rotational speed of the electric motor for each of the plurality of meter modules based on the derived auger speed.

Example 62—the method of Example 61, further comprising: verifying whether the derived auger speed achieves the desired application rate by repeating steps (a)(iii) through (b)(v).

Example 63—A meter module for an air cart, comprising: a main housing having a meter housing portion and a lower chamber portion, the meter housing portion having a top opening through which product enters the main housing, the meter housing portion including an outlet in communication with the lower chamber portion, the lower chamber portion having a bottom opening; a metering mechanism rotatably disposed within the meter housing portion, the metering mechanism rotatable about a longitudinal axis; an electric motor operably coupled to rotate the metering mechanism about the longitudinal axis; a flip gate pivotally disposed in the meter housing portion between an end of the metering mechanism and the outlet, the flip gate pivotally movable between a down position and an up position, whereby in the down position the flip gate is angled downwardly permitting product to pass through the outlet into the lower chamber portion, and whereby in the up position, the flip gate is angled upwardly to prevent product within the meter housing from passing through the outlet into the lower chamber.

Example 64—the meter module of Example 63, wherein the flip gate is coupled to the metering mechanism by a linkage, such that reverse rotation of the metering mechanism causes the flip gate to move from the down position to the up position.

Example 65—the meter module of any of Example 64, wherein the reverse rotation is a one quarter rotation of the metering mechanism.

Example 66—the meter module of any of Examples 63 to 65, wherein the metering mechanism is an auger.

Example 67—A meter module for an air cart, comprising: a main housing having a meter housing portion and a lower chamber portion, the meter housing portion having a top opening through which product enters the main housing, the meter housing portion including an outlet in communication with the lower chamber portion, the lower chamber portion having a bottom opening; a metering mechanism rotatably disposed within the meter housing portion, the metering mechanism rotatable about a longitudinal axis; an electric motor operably coupled to rotate the metering mechanism about the longitudinal axis; wherein the top opening has a wall that is not vertical and is sloped away from the metering mechanism.

Example 68—The meter module of Example 67, wherein the wall is sloped 90° away from the metering module.

Example 69—The meter module of any of Examples 67 or 68, wherein the metering module is an auger.

Example 70—A meter module for an air cart, comprising: a main housing having a meter housing portion and a lower chamber portion, the meter housing portion having a top opening through which product enters the main housing, the meter housing portion including an outlet in communication with the lower chamber portion, the lower chamber portion having a bottom opening; a metering mechanism rotatably disposed within the meter housing portion, the metering mechanism rotatable about a longitudinal axis; an electric motor operably coupled to rotate the metering mechanism about the longitudinal axis; wherein the lower chamber portion further comprises a bottom plate, and the bottom plate has a flow sensor disposed on the bottom plate.

Example 71—A meter module for an air cart, comprising: a main housing having a meter housing portion and a lower chamber portion, the meter housing portion having a top opening through which product enters the main housing, the meter housing portion including an outlet in communication with the lower chamber portion, the lower chamber portion having a bottom opening; a metering mechanism rotatably disposed within the meter housing portion, the metering mechanism rotatable about a longitudinal axis; an electric motor operably coupled to rotate the metering mechanism about the longitudinal axis; wherein the top opening is adjacent to a front of the meter module, a rear of the meter module opposite the front of the meter module, the electric motor is disposed at the rear, and the metering mechanism is disposed forward of the electric motor and extends to the front.

Example 72—The meter module of Example 71, further comprising a front plate disposed at the front, wherein the front plate is removable to remove the metering mechanism without removing the electric motor.

Example 73—The meter module of Example 71 or 72, wherein the metering mechanism is an auger.

Example 74—A meter module for an air cart, comprising: a main housing having a meter housing portion and a lower chamber portion, the meter housing portion having a top opening through which product enters the main housing, the meter housing portion including an outlet in communication with the lower chamber portion, the lower chamber portion having a bottom opening; a metering mechanism rotatably disposed within the meter housing portion, the metering mechanism rotatable about a longitudinal axis; an electric motor operably coupled to rotate the metering mechanism about the longitudinal axis; wherein the lower chamber is connected to the main housing via load cells and is movable under weight of product.

Example 75—A method of calibrating a meter module (200; 200A; 200B; 200C) wherein the meter module (200; 200A; 200B; 200C) comprises: an opening (204); a bottom opening (208); a metering mechanism (210) disposed in the meter module (200; 200A; 200B; 200C); a bottom plate (264) to selectively open and close the bottom opening (208); and a load cell (274; 276) for measuring a mass of material in the meter module (200; 200A; 200B; 200C), the method comprising: starting the metering mechanism (210) to flow material through the meter module (200; 200A; 200B; 200C); at any time before counting, closing the bottom opening (208) with the bottom plate (264); during a counting time, counting a number of metering units of the metering mechanism and measuring an amount of material with the load cell (274; 276); and calculating an amount of mass per metering unit.

Example 76—the method of Example 75, wherein the metering mechanism (210) is an auger (210).

Example 77—the method of Example 76, wherein the metering units are a number of turns of the auger (210).

Example 78—the method of any of Examples 75 to 77, wherein the load cell (274) is disposed to measure a load on the bottom plate (264).

Example 79—the method of any of Examples 75 to 77 further comprising an internal structure (260), and the load cell (276) is disposed to measure a load on the internal structure (260).

Example 101—An air cart (10) for delivering product to an applicator implement (1), the air cart (10) having a forward direction of travel (11), the air cart (10) comprising: a wheeled frame (12) supporting a tank (40) containing the product; an air system (60) supported by the wheeled frame (12), the air system (60) including an air tube bank (310), the air tube bank (310) including a plurality of air tube modules (300) disposed laterally adjacent to one another, each air tube module (300) in communication with at least one of a plurality of air tubes (64), each of the plurality of air tubes (64) in communication with a blower (62) producing an air stream through each of the plurality of air tubes (64); a modular metering system (100) (100) including a metering bank (110) disposed below the tank (40) and above the air tube bank (310), the metering bank (110) including a plurality of meter modules (200; 200A; 200B; 200C) disposed laterally adjacent to one another, each of the plurality of meter modules (200; 200A; 200B; 200C) including: a main housing (202) having a meter housing portion (203) and a lower chamber portion (205), the meter housing portion (203) having a top opening (204) through which the product from the tank (40) enters the meter housing portion (203), the meter housing portion (203) including an outlet (206) in communication with the lower chamber portion (205), the lower chamber portion (205) having a bottom opening (208), the bottom opening (208) in communication with a corresponding one of the air tube modules (300); a metering mechanism (210) rotatably disposed within the meter housing portion (203), the metering mechanism (210) rotatable about a longitudinal axis (211) disposed generally parallel to the forward direction of travel (11); an electric motor (216) configured to drive rotation of the metering mechanism (210) about the longitudinal axis (211); a control system (500) having a controller (510), the controller (510) configured to control the electric motor (216) and the blower (62); whereby as the metering mechanism (210) rotates about the longitudinal axis (211), the metering mechanism (210) meters the product into the lower chamber portion (205), the metered product exits the lower chamber portion (205) through the bottom opening (208) into a corresponding one of the air tube modules (300), the air stream carries the metered product through the at least one air tube (64) in communication with the corresponding one of the air tube modules (300).

Example 102—the air cart (10) of Example 101, wherein each of the plurality of meter modules (200; 200A; 200B; 200C) is individually removable from the metering bank (110).

Example 103—the air cart (10) of Example 102, wherein the metering mechanism (210) is removable from one end of the meter housing portion (203).

Example 104—the air cart (10) of Example 102, wherein the metering bank (110) includes a plurality of slide gates (160), each of the plurality of slide gates (160) is disposed above the top opening (204) of a corresponding one of the plurality of meter modules (200; 200A; 200B; 200C), each of the plurality of slide gates (160) is movable between a closed position and an open position, wherein in the closed position, the slide gate (160) prevents the product from flowing from the tank (40) into the top opening (204) of the corresponding one of the plurality of meter modules (200; 200A; 200B; 200C) and wherein in the open position, the product flows from the tank (40) into the top opening (204) of the corresponding one of the plurality of meter modules (200; 200A; 200B; 200C).

Example 105—the air cart (10) of Example 101, wherein the metering mechanism (210) is an auger (210), the auger (210) having an auger shaft (214), the auger shaft (214) coaxial with the longitudinal axis (211), the auger (210) having auger flights (212) winding around the auger shaft (214), the auger flights (212) oriented on the auger shaft (214) to push the product entering the top opening (204) toward the outlet (206) as the auger (210) rotates about the longitudinal axis (211).

Example 106—the air cart (10) of Example 101, wherein the metering mechanism (210) is a fluted metering roll.

Example 107—the air cart (10) of Example 101, wherein each of the plurality of meter modules (200; 200A; 200B; 200C) further includes: a flip gate (240) pivotally disposed in the meter housing portion (203), the flip gate (240) pivotally movable between a down position and an up position, whereby in the down position the product within the meter housing portion (203) is capable of passing through the outlet (206) into the lower chamber portion (205), and whereby in the up position, the product within the meter housing portion (203) is prevented from passing through the outlet (206) into the lower chamber.

Example 108—the air cart (10) of Example 107, wherein the flip gate (240) is coupled to the metering mechanism (210) by a linkage, such that reverse rotation of the metering mechanism (210) causes the flip gate (240) to move from the down position to the up position.

Example 109—the air cart (10) of Example 101, wherein the lower chamber portion (205) of each of the plurality of meter modules (200; 200A; 200B; 200C) includes internal structure (260) to direct the metered product through the lower chamber portion (205) toward the bottom opening (208).

Example 110—the air cart (10) of Example 109, wherein the internal structure (260) includes a funnel structure (265) having an open bottom end.

Example 111—the air cart (10) of Example 110, wherein the internal structure (260) further includes a capture structure (266).

Example 112—the air cart (10) of Example 111, wherein the capture structure (266) is movable between a dump position and a capture position, wherein in the dump position the capture structure (266) directs the metered product toward the bottom opening (208), and wherein in the capture position, the capture structure (266) closes off the open bottom end of the funnel structure (265) so as to capture the metered product.

Example 113—the air cart (10) of Example 112, wherein each of the plurality of meter modules (200; 200A; 200B; 200C) further includes an actuator (270) configured to move the capture structure (266) between the dump position and the capture position.

Example 114—the air cart (10) of Example 113, wherein each of the plurality of meter modules (200; 200A; 200B; 200C) further includes a load cell (274; 276) configured to weigh the metered product captured by the capture structure (266) in the capture position.

Example 115—the air cart (10) of Example 114, wherein the load cell (274) is disposed on a bottom plate (264) of the capture structure (266).

Example 116—the air cart (10) of Example 114, wherein the load cell (276) supports the funnel structure (265).

Example 117—the air cart (10) of Example 101, wherein each of the plurality of meter modules (200; 200A; 200B; 200C) further includes: a flow sensor (272) disposed within the lower chamber portion (205), the flow sensor (272) in signal communication with the controller (510), the flow sensor (272) configured to generate a signal indicative of the metered product passing through the lower chamber portion (205) before exiting through the bottom opening (208).

Example 118—the air cart (10) of Example 117, wherein the flow sensor (272) is selected from the group consisting of: optical sensors, piezoelectric sensors, microphone sensors, electromagnetic energy sensors, and particle sensors.

Example 119—the air cart (10) of Example 113, wherein each of the plurality of meter modules (200; 200A; 200B; 200C) further includes: a flow sensor (272) disposed within the lower chamber portion (205), the flow sensor (272) in signal communication with the controller (510), the flow sensor (272) configured to generate a signal indicative of the metered product passing through the lower chamber portion (205) before exiting through the bottom opening (208).

Example 120—the air cart (10) of Example 119, wherein the flow sensor (272) is selected from the group consisting of: optical sensors, piezoelectric sensors, microphone sensors, electromagnetic energy sensors, and particle sensors.

Example 121—the air cart (10) of Example 119, wherein the flow sensor (272) includes an instrumented bottom plate (264) of the capture structure (266), whereby the instrumented bottom plate (264) detects whether product is flowing over an upper surface (276) of the instrumented bottom plate (264) in the dump position.

Example 122—the air cart (10) of Example 101, wherein each of the plurality of air tube modules (300) includes an upper air tube coupler (301) and a lower air tube coupler (302), the upper air tube coupler (301) in communication with a first one of the plurality of air tubes (64), the lower air tube coupler (302) in communication with a second one of the plurality of air tubes (64) disposed below the first one of the plurality of air tubes (64).

Example 123—the air cart (10) of Example 122, wherein the metering bank (110) further includes: a diverter gate module (400) disposed between the bottom opening (208) of each one of the plurality of meter modules (200; 200A; 200B; 200C) and the corresponding one of the plurality of air tube modules (300), the diverter gate module (400) operable to divert the metered product exiting the bottom opening (208) into one of the upper air tube coupler (301) and the lower air tube coupler (302) of the corresponding one of the plurality of air tube modules (300).

Example 124—the air cart (10) of Example 123, wherein the upper air tube coupler (301) includes a center passage (306) and outer passages (307), the center passage (306) in communication with the first one of the plurality of air tubes (64), the outer passages (307) in communication with the lower air tube coupler (302), and wherein the diverter gate module (400) includes diverter gates (420) movable between a first position and a second position, wherein in the first position, the diverter gates (420) close the center passage (306) of the upper air tube coupler (301) and the outer passages (307) of the upper air tube coupler (301) are open to allow the metered product to flow into the lower air tube coupler (302), and wherein in the second position, the diverter gates (420) close the outer passages (307) of the upper air tube coupler (301) and the center passage (306) of the upper air tube coupler (301) is open to allow the metered product to flow into the upper air tube coupler (301).

Example 125—the air cart (10) of Example 124, further including a diverter gate actuator (430) configured to move the diverter gates (420) between the first position and the second position.

Example 201—A method of calibrating a metering system (100), the metering system (100) including a plurality of meter modules (200; 200A; 200B; 200C), each of the plurality of meter modules (200; 200A; 200B; 200C) having an auger (210) in communication with a product, the auger (210) driven by an electric motor (216), each of the plurality of meter modules (200; 200A; 200B; 200C) having an actuator (270) coupled to a capture structure (266), the electric motor (216) and actuator (270) in signal communication with a controller (510), the method comprising: (a) for each of the plurality of meter modules (200; 200A; 200B; 200C): (i) actuating the electric motor (216) to drive the auger (210) until the auger (210) is fully loaded with the product from the product supply; (ii) stopping rotation of the fully loaded auger (210); (iii) discharging a metered quantity of the product from the fully loaded auger (210) by actuating the electric motor (216) to drive the fully loaded auger (210) at a predetermined rotational speed for a predetermined number of auger revolutions; (iv) capturing the discharged metered quantity of the product with the capture structure (266), the capture structure (266) instrumented with a load cell (274; 276), the load cell (274; 276) generating a signal magnitude in proportion to a mass of the discharged metered quantity of the product captured by the capture structure (266); (b) the controller (510): (i) receiving the generated signal magnitude of each of the plurality of the plurality of meter modules (200; 200A; 200B; 200C), and correlates each of the generated signal magnitudes; (ii) calculating a mass per auger revolution (MPR) value for each of the plurality of meter modules (200; 200A; 200B; 200C) by dividing the derived mass value by the designated number of auger revolutions of each of the plurality of meter modules (200; 200A; 200B; 200C); (iii) storing in memory the MPR value of each of the plurality of meter modules (200; 200A; 200B; 200C); (iv) summing the stored MPR value of each of the plurality of meter modules (200; 200A; 200B; 200C); (v) calculating a derived application rate of the metering bank (110) based on the sum of the MPR values of each of the plurality of meter modules (200; 200A; 200B; 200C); (vi) comparing the derived application rate of the metering bank (110) to a desired application rate; (vii) determining if the derived application rate of the metering bank (110) matches the desired application rate; (viii) if the derived application rate of the metering bank (110) does not match the desired application rate, calculating a derived auger speed based on the sum of the MPR values and the desired application rate; (ix) adjusting the rotational speed of the electric motor (216) for each of the plurality of meter modules (200; 200A; 200B; 200C) based on the derived auger speed.

Example 202—the method of Example 201, wherein the controller (510) generates a load auger command signal to cause the electric motor (216) to actuate to drive the auger (210) pursuant to step (a)(i).

Example 203—the method of Example 203, wherein the load auger command signal actuates the actuator (270) to move the capture structure (266) to a dump position, whereby in the dump position the product metered by the auger (210) is discharged through a bottom opening (208) in the meter module (200; 200A; 200B; 200C).

Example 204—the method of Example 204, wherein the controller (510) generates a stop auger command signal to cause the electric motor (216) to stop driving the auger (210) pursuant to step (a)(ii) after a predetermined time period or a predetermined number of revolutions of the auger (210).

Example 205—the method of Example 205, wherein after the stop auger command signal, the controller (510) generating a capture command signal, the capture command signal actuating the actuator (270) to cause the capture structure (266) to move to a capture position to capture the discharged metered quantity of the product pursuant to step (a)(iii).

Example 206—the method of Example 206, wherein, upon the capture structure (266) moving to the capture position, the controller (510) generating a drive auger command signal causing the electric motor (216) to drive the auger (210) at the predetermined rotational speed for the predetermined number of auger revolutions to discharge the metered quantity of the product pursuant to step (a)(iii).

Example 207—the method of Example 201, wherein at any time after the controller (510) receives the generated signal magnitude of each of the plurality of meter modules (200; 200A; 200B; 200C), the controller (510) generates a dump command signal for each of the plurality of meter modules (200; 200A; 200B; 200C), the dump command signal actuating the actuator (270) coupled to the capture structure (266) to cause the capture structure (266) of each of the plurality of meter modules (200; 200A; 200B; 200C) to move to the dump position, whereby in the dump position the product captured in the capture structure (266) of each of the plurality of meter modules (200; 200A; 200B; 200C) is discharged through the bottom opening (208) in each of the plurality of meter modules (200; 200A; 200B; 200C).

Example 208—the method of Example 207, further comprising: after the product is discharged from the capture structure (266) pursuant to Example 7, repeating steps (a) through (b)(ix) until the derived application rate approximates the desired application rate.

Example 301—A meter module (200; 200A; 200B; 200C) for metering a product in communication with the meter module (200; 200A; 200B; 200C), the meter module (200; 200A; 200B; 200C) comprising: a main housing (202) having a meter housing portion (203) and a lower chamber portion (205), the meter housing portion (203) having a top opening (204) through which the product enters the meter housing portion (203), the meter housing portion (203) including an outlet (206) in communication with the lower chamber portion (205), the lower chamber portion (205) having a bottom opening (208); a metering mechanism (210) disposed within the meter housing portion (203), the metering mechanism (210) rotatable about a longitudinal axis (211); an electric motor (216) operably coupled to the metering mechanism (210) to drive rotation of the metering mechanism (210) about the longitudinal axis (211); whereby as the metering mechanism (210) rotates about the longitudinal axis (211), the metering mechanism (210) meters the product into the lower chamber portion (205), the metered product exits the lower chamber portion (205) through the bottom opening (208).

Example 302—the meter module (200; 200A; 200B; 200C) of Example 1, wherein the metering mechanism (210) is removable from one end of the meter housing portion (203).

Example 303—the meter module (200; 200A; 200B; 200C) of Example 301, wherein the top opening (204) is at a first end of the meter housing portion (203) and the outlet (206) is at a second end of the meter housing portion (203).

Example 304—the meter module (200; 200A; 200B; 200C) of Example 303, wherein the electric motor (216) is supported in the main housing (202) portion proximate the second end and wherein the metering mechanism (210) is configured to decouple from the electric motor (216) such that the metering mechanism (210) is removable from the first end of the meter housing portion (203) while the electric motor (216) remains supported in the main housing (202) portion.

Example 305—the meter module (200; 200A; 200B; 200C) of Example 301, wherein the metering mechanism (210) is an auger (210), the auger (210) having an auger shaft (214), the auger shaft (214) coaxial with the longitudinal axis (211), the auger (210) having auger flights (212) winding around the auger shaft (214), the auger flights (212) oriented on the auger shaft (214) to push the product entering the top opening (204) toward the outlet (206) as the auger (210) rotates about the longitudinal axis (211).

Example 306—the meter module (200; 200A; 200B; 200C) of Example 301, wherein the metering mechanism (210) is a fluted metering roll.

Example 307—the meter module (200; 200A; 200B; 200C) of Example 305, further comprising:
a flip gate (240) pivotally disposed in the meter housing portion (203), the flip gate (240) pivotally movable between a down position and an up position, whereby in the down position the metered product passes over the flip gate (240) and through the outlet (206) into the lower chamber portion (205), and whereby in the up position, the product within the meter housing portion (203) is obstructed by the flip gate (240) from passing through the outlet (206) into the lower chamber.

Example 308—the meter module (200; 200A; 200B; 200C) of Example 307, wherein the flip gate (240) is coupled to the metering mechanism (210) by a linkage, such that reverse rotation of the metering mechanism (210) causes the flip gate (240) to move from the down position to the up position.

Example 309—the meter module (200; 200A; 200B; 200C) of Example 308, wherein the reverse rotation is a one quarter rotation of the metering mechanism (210).

Example 310—the meter module (200; 200A; 200B; 200C) of Example 301, wherein the lower chamber portion (205) includes internal structure (260) to direct the metered product through the lower chamber portion (205) toward the bottom opening (208).

Example 311—the meter module (200; 200A; 200B; 200C) of Example 310, wherein the internal structure (260) includes a funnel structure (265) having an open bottom end.

Example 312—the meter module (200; 200A; 200B; 200C) of Example 311, wherein the internal structure (260) further includes a capture structure (266).

Example 313—the meter module (200; 200A; 200B; 200C) of Example 312, wherein the capture structure (266) is movable between a dump position and a capture position, wherein in the dump position the capture structure (266) directs the metered product toward the bottom opening (208), and wherein in the capture position, the capture structure (266) closes off the open bottom end of the funnel structure (265) so as to capture the metered product.

Example 314—the meter module (200; 200A; 200B; 200C) of Example 313, further comprising an actuator (270), the actuator (270) configured to move the capture structure (266) between the dump position and the capture position.

Example 315—the meter module (200; 200A; 200B; 200C) of Example 314, further comprising a load cell (274; 276) configured to generate a signal indicative of a mass of the metered product captured by the capture structure (266) in the capture position.

Example 316—the meter module (200; 200A; 200B; 200C) of Example 315, wherein the load cell (274) is disposed on a bottom plate (264) of the capture structure (266).

Example 317—the meter module (200; 200A; 200B; 200C) of Example 315, wherein the load cell (276) supports the funnel structure (265).

Example 318—the meter module (200; 200A; 200B; 200C) of Example 311, further comprising:

a flow sensor (272) disposed within the lower chamber portion (205), the flow sensor (272) configured to generate a signal indicative of the metered product passing through the lower chamber portion (205) before exiting through the bottom opening (208).

Example 319—the meter module (200; 200A; 200B; 200C) of Example 318, wherein the flow sensor (272) is selected from the group consisting of: optical sensors, piezoelectric sensors, microphone sensors, electromagnetic energy sensors, or particle sensors.

Example 320—the meter module (200; 200A; 200B; 200C) of Example 314, further comprising:

a flow sensor (272), the flow sensor (272) configured to generate a signal indicative of the metered product passing through the capture structure (266) before exiting through the bottom opening (208).

Example 321—the meter module (200; 200A; 200B; 200C) of Example 320, wherein the flow sensor (272) is selected from the group consisting of: optical sensors, piezoelectric sensors, microphone sensors, electromagnetic energy sensors, or particle sensors.

Example 322—the meter module (200; 200A; 200B; 200C) of Example 320, wherein the flow sensor (272) includes an instrumented bottom plate (264) of the capture structure (266), whereby the instrumented plate detects whether product is flowing over an upper surface (276) of the instrumented plate in the dump position.

Example 323—the meter module (200; 200A; 200B; 200C) of Example 301, wherein the top opening (204) has a wall that is not vertical and is sloped away from the metering mechanism (210).

Example 324—the meter module (200; 200A; 200B; 200C) of Example 323, wherein the wall is sloped 90° away from the metering mechanism (210).

Example 325—the meter module (200; 200A; 200B; 200C) of Example 23 or 23, wherein the metering mechanism (210) is an auger (210).

Example 401—A metering bank (110) for an air cart (10), the air cart (10) having a forward direction of travel (11), the metering bank (110) in communication with a supply of product within a tank (40) disposed above the metering bank (110), the metering bank (110) comprising: a metering bank (110) frame; a plurality of meter modules (200; 200A; 200B; 200C) disposed laterally adjacent to one another in the metering bank (110) frame, each of the plurality of meter modules (200; 200A; 200B; 200C) individually removable from the metering bank (110) frame in a direction generally parallel with the forward direction of travel (11) of the air cart (10), each of the plurality of meter modules (200; 200A; 200B; 200C) including a metering mechanism (210).

Example 402—the metering bank (110) of Example 401, wherein each of the plurality of meter modules (200; 200A; 200B; 200C) further includes: a main housing (202) having a meter housing portion (203) and a lower chamber portion (205), the meter housing portion (203) having a top opening (204) through which the product from the tank (40) enters the meter housing portion (203), the meter housing portion (203) including an outlet (206) in communication with the lower chamber portion (205), the lower chamber portion (205) having a bottom opening (208); wherein the metering mechanism (210) is rotatably disposed within the meter housing portion (203); an electric motor (216) configured to drive rotation of the metering mechanism (210) within the meter housing portion (203).

Example 403—the metering bank (110) of Example 402, wherein the metering mechanism (210) rotates within the meter housing portion (203) about a longitudinal axis (211) generally parallel with the forward direction of travel (11) of the air cart (10).

Example 404—the metering bank (110) of Example 403, wherein the metering mechanism (210) is removable from one end of the meter housing portion (203).

Example 405—the metering bank (110) of Example 402, further comprising: a plurality of slide gates (160), each of the plurality of slide gates (160) disposed above the top opening (204) of a corresponding one of the plurality of meter modules (200; 200A; 200B; 200C), each of the plurality of slide gates (160) movable between a closed position and an open position, wherein in the closed position the slide gate (160) prevents the product from flowing into the top opening (204) of the corresponding one of the plurality of meter modules (200; 200A; 200B; 200C) and wherein in the open position the product flows into the top opening (204) of the corresponding one of the plurality of meter modules (200; 200A; 200B; 200C).

Example 406—the metering bank (110) of Example 403, wherein the metering mechanism (210) is an auger (210), the auger (210) having an auger shaft (214), the auger shaft (214) coaxial with the longitudinal axis (211), the auger (210) having auger flights (212) winding around the auger shaft (214), the auger flights (212) oriented on the auger shaft (214) to push the product entering the top opening (204) toward the outlet (206) as the auger (210) rotates about the longitudinal axis (211).

Example 407—the metering bank (110) of Example 403, wherein the metering mechanism (210) is a fluted metering roll.

Example 408—the metering bank (110) of Example 402, wherein each of the plurality of meter modules (200; 200A; 200B; 200C) further includes: a flip gate (240) pivotally disposed in the meter housing portion (203), the flip gate (240) pivotally movable between a down position and an up position, whereby in the down position the product within the meter housing portion (203) is capable of passing through the outlet (206) into the lower chamber portion (205), and whereby in the up position, the product within the meter housing portion (203) is prevented from passing through the outlet (206) into the lower chamber.

Example 409—the metering bank (110) of Example 408, wherein the flip gate (240) is coupled to the metering mechanism (210) by a linkage, such that reverse rotation of the metering mechanism (210) causes the flip gate (240) to move from the down position to the up position.

Example 410—the metering bank (110) of Example 402, wherein the lower chamber portion (205) of each of the plurality of meter modules (200; 200A; 200B; 200C) includes internal structure (260) to direct the metered product through the lower chamber portion (205) toward the bottom opening (208).

Example 411—the metering bank (110) of Example 410, wherein the internal structure (260) includes a funnel structure (265) having an open bottom end.

Example 412—the metering bank (110) of Example 411, wherein the internal structure (260) further includes a capture structure (266).

Example 413—the metering bank (110) of Example 412, wherein the capture structure (266) is movable between a dump position and a capture position, wherein in the dump position the capture structure (266) directs the metered product toward the bottom opening (208), and wherein in the capture position, the capture structure (266) closes off the open bottom end of the funnel structure (265) so as to capture the metered product.

Example 414—the metering bank (110) of Example 413, wherein each of the plurality of meter modules (200; 200A; 200B; 200C) further includes an actuator (270) configured to move the capture structure (266) between the dump position and the capture position.

Example 415—the metering bank (110) of Example 414, wherein each of the plurality of meter modules (200; 200A; 200B; 200C) further includes a load cell (274; 276) configured to weigh the metered product captured by the capture structure (266) in the capture position.

Example 416—the metering bank (110) of Example 415, wherein the load cell (274) is disposed on a bottom plate (264) of the capture structure (266).

Example 417—the metering bank (110) of Example 415, wherein the load cell (276) supports the funnel structure (265).

Example 418—the metering bank (110) of Example 402, wherein each of the plurality of meter modules (200; 200A; 200B; 200C) further includes: a flow sensor (272) disposed within the lower chamber portion (205), the flow sensor (272) configured to generate a signal indicative of the metered product passing through the lower chamber portion (205) before exiting through the bottom opening (208).

Example 419—the metering bank (110) of Example 418, wherein the flow sensor (272) is selected from the group consisting of: optical sensors, piezoelectric sensors, microphone sensors, electromagnetic energy sensors, and particle sensors.

Example 420—the metering bank (110) of Example 414, wherein each of the plurality of meter modules (200; 200A; 200B; 200C) further includes: a flow sensor (272) disposed within the lower chamber portion (205), the flow sensor (272) configured to generate a signal indicative of the metered product passing through the lower chamber portion (205) before exiting through the bottom opening (208).

Example 421—the metering bank (110) of Example 420, wherein the flow sensor (272) is selected from the group consisting of: optical sensors, piezoelectric sensors, microphone sensors, electromagnetic energy sensors, and particle sensors.

Example 422—the metering bank (110) of Example 420, wherein the flow sensor (272) includes an instrumented bottom plate (264) of the capture structure (266), whereby the instrumented plate detects whether product is flowing over an upper surface (276) of the instrumented plate in the dump position.

Example 423—the metering bank (110) of Example 402, further comprising: a diverter gate module (400) disposed below the bottom opening (208) of each one of the plurality of meter modules (200; 200A; 200B; 200C), the diverter gate module (400) operable to divert the metered product exiting the bottom opening (208) laterally inwardly and laterally outwardly with respect to the longitudinal axis (211).

Example 424—the metering bank (110) of Example 423, wherein the diverter gate module (400) includes diverter gates (420) movable between a first position and a second position, wherein in the first position, the diverter gates (420) direct the metered product laterally outwardly with respect to the longitudinal axis (211), and wherein in the second position, the diverter gates (420) direct the metered product laterally inwardly with respect to the longitudinal axis (211).

Example 425—the metering bank (110) of Example 424, further including a diverter gate actuator (430) configured to move the diverter gates (420) between the first position and the second position.

The foregoing description and drawings are intended to be illustrative and not restrictive. Various modifications to the embodiments and to the general principles and features of the modular metering system and meter modules, and processes described herein will be apparent to those of skill in the art. Thus, the disclosure should be accorded the widest scope consistent with the appended claims and the full scope of the equivalents to which such claims are entitled.

The invention claimed is:

1. A method of calibrating a meter module for an air cart, the meter module being one of a plurality of meter modules disposed within a metering bank below a hopper filled with a product, each one of the plurality of meter modules being individually removable as a singular unit from the metering bank in a direction generally parallel with a forward direction of travel of the air cart, each one of the plurality of meter modules comprising:

a unitary structure including an upper meter housing portion and a lower chamber portion, the upper meter housing portion having a top opening through which the product in the hopper enters the upper meter housing portion, the lower chamber portion disposed below the upper meter housing portion, the lower chamber portion including a bottom opening in communication with an air tube disposed below the lower chamber portion through which an air stream passes;

a meter disposed within the upper meter housing portion;

an electric motor disposed within the unitary structure and coupled to the meter, the electric motor driving rotation of the meter to sequentially discharge metered product units into the lower chamber portion;

a receptacle disposed within the lower chamber portion;

an actuator coupled to the receptacle to move the receptacle between a capture position and a dump position, wherein, in the capture position, the receptacle captures the metered product units sequentially discharged by the meter into the lower chamber portion, wherein, in the dump position, the metered product units captured within the receptacle are released from the receptacle; and a load cell;

wherein the unitary structure within which the meter and the electric motor are disposed, defines the singular unit individually removable from the metering bank in the direction generally parallel with the forward direction of travel of the air cart, the method comprising:

actuating the electric motor to drive rotation of the meter to cause the meter to begin sequentially discharging the metered product units into the lower chamber portion;

moving the receptacle from the dump position to the capture position;

initiating a counting period, wherein, during the counting period, the receptacle in the capture position captures the metered product units sequentially discharged by the meter into the lower chamber portion;

counting each rotation of the meter during the counting period to determine a metered unit count;

terminating the counting period;

via the load cell, determining a measured mass by measuring a mass of the metered product units captured by the receptacle during the counting period;

determining a mass per unit value by dividing the measured mass by the metered unit count; and moving the receptacle from the capture position to the dump position to release the metered product units captured within the receptacle, the released metered product units passing through the bottom opening of the lower chamber portion and into the air stream passing through the air tube.

2. The method of claim 1, wherein the meter is an auger and wherein one rotation of the auger corresponds to one of the metered product units.

3. The method of claim 2, wherein the meter is a fluted metering roll and wherein one rotation of the fluted metering roll corresponds to one of the metered product units.

4. The method of claim 1, wherein the receptacle includes a bottom plate pivotally supported within the lower chamber portion above the bottom opening, the actuator pivoting the bottom plate between the capture position in which the bottom plate is pivoted to cover bottom opening and the dump position in which the bottom plate is pivoted to uncover the bottom opening and wherein the bottom plate is instrumented with the load cell.

5. The method of claim 1, wherein the receptacle includes:

a funnel with an open bottom;

a bottom plate pivotally supported from the funnel; and wherein the actuator is supported from the funnel;

whereby the actuator pivots the bottom plate between the capture position in which the bottom plate is pivoted to cover the open bottom end of the funnel and the dump position in which the bottom plate is pivoted to uncover the open bottom end of the funnel; and wherein the funnel structure is supported by the load cell.

* * * * *